US009047785B2

(12) United States Patent
Chaniotakis et al.

(10) Patent No.: US 9,047,785 B2
(45) Date of Patent: Jun. 2, 2015

(54) INTEGRATION OF AN E-BOOK E-REPORT WITH DATA COLLECTION AND CONTROL DEVICES USING APIS THAT OPERATE WITHIN A BROWSER

(71) Applicant: Ergopedia, Inc., Cambridge, MA (US)

(72) Inventors: Emmanouil A. Chaniotakis, Belmont, MA (US); Thomas C. Ahlborn-Hsu, Belmont, MA (US)

(73) Assignee: ERGOPEDIA, INC., Cambridge, MA (US)

( * ) Notice: Subject to any disclaimer, the term of this patent is extended or adjusted under 35 U.S.C. 154(b) by 0 days.

(21) Appl. No.: 14/329,186

(22) Filed: Jul. 11, 2014

(65) Prior Publication Data
US 2014/0322695 A1    Oct. 30, 2014

Related U.S. Application Data

(63) Continuation of application No. 14/209,048, filed on Mar. 13, 2014.

(60) Provisional application No. 61/778,941, filed on Mar. 13, 2013.

(51) Int. Cl.
G09B 7/06 (2006.01)
G06F 3/0483 (2013.01)
G09B 5/08 (2006.01)

(52) U.S. Cl.
CPC .............. *G09B 7/06* (2013.01); *G06F 3/0483* (2013.01); *G09B 5/08* (2013.01)

(58) Field of Classification Search
CPC ................................. G09B 5/00; G06F 9/541
See application file for complete search history.

(56) References Cited

U.S. PATENT DOCUMENTS

2008/0211768 A1* 9/2008 Breen et al. ................... 345/157
2012/0308988 A1* 12/2012 Discenzo ........................ 435/3

OTHER PUBLICATIONS

Alam, K., "Towards Diverse Media Augmented E-Book Reader Platform" (2012), pp. 1-85 [retrieved from https://www.ruor.uottawa.ca/bitstream/10393/22884/1/Alam_Kazi_Masudul_2012_thesis.pdf].*
Restivo, M.T.; Gomes, F.; Fatima, M.; Gabriel, J.; Mendes, A., "Measurement: Concepts, Methods and Practice within an Electronic Book" (Sep. 11-13, 2008), pp. 1-6 [retrieved from http://www.cnl.sk/~jakab/2008%20ICETA%20-%20organizacne/Prispevky/Restivo_Almeida_Chouzal_Mendes_Lopes/Restivo%20Teresa_iceta2008_e_book.pdf].*
Gabriel, J.; Restivo, M., "Hands-on Using On-line Engineering: The Trend to Better Solutions" (Nov. 3-5, 2009), 3rd IEEE International Conference on E-Learning in Industrial Electronics, pp. 64-68 [retrieved from http://ieeexplore.ieee.org/stamp/stamp.jsp?tp=&arnumber=5413210].*
Lohr, M., "iPads as Mobile Laboratories in Science Teaching e-Learning Scenarios using iPads and Sensors" (Oct. 23, 2012),Proceedings of the European Conference LINQ 2012, pp. 124-133 [retrieved from http://www.learning-innovations.eu/sites/learning-innovations.eu/files/2012/LINQ_2012_Proceedings.pdf#page=126].*

(Continued)

*Primary Examiner* — Brian W Wathen
(74) *Attorney, Agent, or Firm* — GTC Law Group LLP & Affiliates

(57) ABSTRACT

An educational electronic book (e-Book) facility that may be suitable for use in public school classrooms and many other environments may be based on an encapsulated HTML technology to facilitate complete interactive operation without use or risks associated with an external network connection, such as the Internet.

16 Claims, 31 Drawing Sheets

(56) References Cited

OTHER PUBLICATIONS

Morrow, R., "Bluetooth Operation and Use" (2002), The McGraw-Hill Companies, Inc., pp. 19-24 and 413-424.*

Lohr, M., "iPads as Mobile Laboratories in Science Teaching—e-Learning Scenarios using iPads and Sensors" (Oct. 23, 2012), presentation presented at the LINQ 2012, pp. 1-20 [retrieved from http://www.learning-innovations.eu/sites/learning-innovations.eu/files/presentations/1/Paper_05_Lohr_iPads_as_Mobile_Laboratories.pdf].*

* cited by examiner

Which of the following does not help solve the equation:

$$A + B = CD$$

2602

A: $\dfrac{A+B}{C} = D$    2604A

INTEGRATION OF AN E-BOOK E-REPORT WITH DATA COLLECTION AND CONTROL DEVICES USING APIS THAT OPERATE WITHIN A BROWSER

CROSS-REFERENCE TO RELATED APPLICATIONS

This application is a continuation of U.S. Ser. No. 14/209,048 filed Mar. 13, 2014 that is incorporated herein by reference in its entirety and that claims the benefit of the following provisional U.S. patent application, which is hereby incorporated by reference in its entirety: provisional U.S. patent application 61/778,941 filed Mar. 13, 2013.

FIELD

This disclosure relates to the field of education, and more particularly to improved methods and systems for educational electronic books.

BACKGROUND

Interactive electronic books are increasingly used in educational environments. Such books may benefit from capabilities similar to those used for developing, displaying, updating, and otherwise managing Internet content; however, many educational environments prohibit or strictly limit Internet access, such as to avoid malware and to prevent students from accessing inappropriate content. A need exists for electronic books with improved features while allowing educational environments to maintain their policies with respect to Internet access. A need also exists for enabling interactions between electronic books and various other devices or systems that may be present in a classroom, such as devices used for scientific experiments. A need also exists for enabling customized and automatic assessment of students' understanding of material presented in interactive electronic books regardless of network access.

SUMMARY

The present disclosure provides an electronic book residing on a computing device configured for communicating directly with an external hardware device. The electronic book includes an interface to a communication API of the computing device; a communications channel that facilitates communication via the interface with an external device; and an enabled web browser send protocol translator adapted to translate commands and data in the electronic book into a series of external device-recognizable signals.

In an example, the electronic book further includes a receive protocol interpreter for interpreting external device signals into data that is suitable for use by the electronic book. The electronic book also includes a communication function that is adapted to apply the send protocol translator and the receive protocol interpreter and to communicate with the external device via the communication channel. The electronic book further includes further a local data storage access capability that is adapted to at least one of read data for handling with the send protocol translator and write data to which the receive protocol interpreter has been applied.

In an example, the external device is selected from the group consisting of a mechanical hardware device, a remote-controlled vehicle, a robot, a scientific demonstration device, a remote-controlled camera, and a remote-controlled sensor.

In an example, the local data storage access capability is capable of interfacing with data storage capabilities on the host computing device. The data storage capabilities on the host computing device include permanent data storage capabilities.

In an example, the communication API includes a keyboard API. The communication API is provided by a standard system software configuration of the computing device.

In an example, the receive protocol includes interpreting keystroke data into at least one of data from the external device and electronic book action commands associated with the data from the external device.

The present disclosure provides an encapsulated HTML electronic book configured for operating within a web browser on a computing device and capable of communicating with one or more external devices independent of a networking capability of the computing device. The encapsulated HTML electronic book includes an interface to one or more communication APIs that are available on the computing device; a plurality of communications channels that facilitate communication via the interface with external devices; a send protocol translator adapted to translate commands and data into a series of external device recognizable signals for sending to at least one external device via a transmit communication channel of the plurality of communication channels; a receive protocol interpreter applied to data received via a receive communication channel of the plurality of communication channels, the receive protocol interpreter for interpreting external device signals into data that is suitable for use by the electronic book; and a local data storage access capability that is adapted to at least one of read data for handling with the send protocol translator and write data to which the receive protocol interpreter has been applied.

In an example, one of the one or more communication APIs includes a keyboard API. Further, the receive communication channel interfaces with the keyboard API.

In an example, the receive protocol interpreter includes interpreting keystroke data into at least one of data from the external device and commands for the electronic book to act on the data from the external device.

In an example, one of the one or more communication APIs includes an audio out API. Further, the send communication channel interfaces with the audio out API.

In an example, the send protocol translator includes translating commands and data for the external device into a series of square waves at a plurality of frequencies.

The present disclosure provides a method for communication of an electronic book and a remote device. The method includes operating an electronic book within a web browser of a computing device. A portion of the electronic book is adapted to receive information from devices that remotely connect to the computing device. The method further includes configuring at least one communication channel between the electronic book and a remote device via a standard communication interface of the computing device; and sending information from the electronic book via a communication channel to at least one of the remotely connected devices.

In an example, the method further includes receiving information via a communication channel from the at least one of the remote devices.

In an example, the standard communication interface includes a keyboard API. Further, the remote device is adapted to receive and interpret commands from the electronic book.

In an example, the method further includes storing data based on the commands so that the received data is accessible to a portion of the electronic book operating within the web browser.

In an example, the electronic book includes encapsulated HTML, which facilitates operating the electronic book in the web browser isolated from external network capabilities of the computing device. Further, the devices that remotely connect to the computing device are adapted to communicate using a standard keyboard API protocol. Also, the devices that remotely connect to the computing device are adapted to measure at least one of temperature, voltage, light color (spectro-photometry), presence of light, current, PH, conductivity, vibration, motion, power, friction, spring tension, and wheel rotation.

The present disclosure provides a data acquisition device adapted to communicate with an electronic book running in a web browser on a host computing device, independent of a networking capability of the host computing device. The data acquisition device includes device receive protocol interpreter adapted for interpreting communications received from the host computing device into commands and data suitable for use by the data acquisition device; at least one real-world sensor; a send protocol translator adapted to translate at least sensor data into a series of communication API compatible data signals; and a communication function that is adapted to apply the send protocol translator and the receive protocol interpreter to facilitate communicating between the electronic device and the computing device.

In an example, the at least one real-world sensor facilitates acquiring data representative of tangible phenomena.

The present disclosure provides a system that includes an electronic object operating on a computing device. The electronic object adapted to communicate using a keyboard application programming interface of the computing device. The system also includes an interface function of the electronic object for interpreting the data received from an external device that is adapted to transmit data by mimicking keyboard entries via the keyboard application programming interface into at least one of an instruction and a data item.

In an example, the electronic object is an electronic book. Further, the electronic book includes encapsulated HTML that operates independent of external networks accessible via the computing device.

In an example, the keyboard application programming interface handles wireless communication between the external device and the computing device. The wireless communication interface is a BLUETOOTH interface. Further, the interface function includes JAVASCRIPT.

The present disclosure provides a system that includes a non-keyboard device adapted to communicate data to a computing device by mimicking keyboard entries of a keyboard API. The non-keyboard device is selected from the group consisting of a mechanical hardware device, a remote-controlled vehicle, a robot, a scientific demonstration device, a remote-controlled camera, and a remote-controlled sensor.

The present disclosure provides a system that includes an electronic object for operating within a web browser executing on a computing device. The electronic object adapted to communicate with a keyboard application programming interface of the computing device. The system further includes a dataset including electronic object instructions indexed by keyboard data values; and an interface function of the electronic object for interpreting the data received from the external device via the keyboard application programming interface into at least one of an instruction derived from the dataset and a data item.

The present disclosure provides a system that includes an electronic object for operating within a web browser executing on a computing device. The electronic object adapted to communicate with an audio output application programming interface of the computing device. The system further includes an external device adapted to receive audio data via an audio interface of the computing device from the audio application programming interface. The external device interprets the audio to generate device function commands and function command data. The system also includes an interface function of the electronic object for generating data that is suitable for sending to the audio output application programming interface, wherein the data facilitates audio rendering of device function commands and function command data.

In an example, the electronic object is an electronic book. The electronic book includes encapsulated HTML, such that it is able to be isolated from external networks while operating on a browser.

In an example, the audio interface is a wireless interface between the external device and the computing device. The wireless interface is a BLUETOOTH interface.

In an example, the interface function includes java script. Further, the device function commands and function command data are rendered as square waves of different frequencies.

The present disclosure provides method for interfacing an electronic book extant within an enabled web browser on a computing device and a remote data collection device in the absence of a network environment. The method includes establishing a short range wireless connection between the computing device and the remote data collection device; transforming commands and data to be sent from the electronic book to the remote device into a format compatible with standard computing device APIs; receiving data from the computing device on the remote data collection device; and translating data received on the remote data collection device into commands and data for the remote data collection device.

The present disclosure provides an electronic book that includes a set of encapsulated HTML instructions for presenting an interactive electronic object within an enabled web browser that is executing on a computing device. All content referenced by the HTML instructions is encapsulated together with the HTML instructions. Further, all content may be accessed using the web browser without recourse to network resources.

The present disclosure provides system that includes an electronic book operating within a web browser executing on a computing device and a plurality of remote data collection devices. The plurality of remote data collection devices is adapted to transmit collected data by mimicking the output from a standard computer I/O device. The remote data collection devices transmit data in conformance with standard computer application interfaces. The plurality of remote data collection devices is further adapted receive and interpret data transmitted using standard computer I/O protocols into device function commands.

In an example, the remote data collection devices are further adapted to communicate with the computing device via BLUETOOTH wireless communication.

In an example, the electronic book is adapted to communicate with an application programming interface of the computing device for receiving the collected data of the remote data collection devices via BLUETOOTH wireless communication. Also, the electronic book is adapted to communicate with an application programming interface of the computing device for sending at least remote data collection device functions via an interface of the computing device to the remote data collection devices. Additionally, the electronic book interprets communications from the remote data collection devices into commands for processing the data and data values to be processed based on the commands.

The present disclosure provides a system that includes an electronic book operating within a web browser executing on a computing device. The electronic book sending and receiving data using standard computer I/O protocols of the computing device. Further, the electronic book is adapted to communicate with a plurality of remote data collection devices that are adapted to transmit collected data by mimicking the output from a standard computer I/O device, and wherein the remote data collection devices transmit data in conformance with standard computer application interfaces, and receive and interpret data transmitted using standard computer I/O protocols into device function commands.

In an example, the remote data collection devices are further adapted to communicate with the computing device via BLUETOOTH wireless communication.

In an example, the electronic book is adapted to communicate with an application programming interface of the computing device for receiving the collected data of the remote data collection devices via BLUETOOTH wireless communication. Further, the electronic book is adapted to communicate with an application programming interface of the computing device for sending at least remote data collection device functions via an interface of the computing device to the remote data collection devices. Also, the electronic book interprets communications from the remote data collection devices into commands for processing the data and data values to be processed based on the commands.

The present disclosure provides a system that includes a plurality of remote data collection devices adapted to transmit collected data to an electronic book by mimicking the output from a standard computer I/O device. The remote data collection devices transmit data in conformance with standard computer application interfaces. The plurality of remote data collection devices further adapted to receive and interpret data from the electronic book transmitted using standard computer I/O protocols into device function commands.

In an example, the remote data collection devices are further adapted to communicate with the computing device via BLUETOOTH wireless communication.

In an example, the electronic book is adapted to communicate with an application programming interface of the computing device for receiving the collected data of the remote data collection devices via BLUETOOTH wireless communication. Further, the electronic book is adapted to communicate with an application programming interface of the computing device for sending at least remote data collection device functions via an interface of the computing device to the remote data collection devices. Also, the electronic book interprets communications from the remote data collection devices into commands for processing the data and data values to be processed based on the commands.

The present disclosure provides a method for integrating an electronic book and with remote data collection devices. The method includes operating an electronic book within a web browser of a computing device; and communicating via BLUETOOTH between the computing device and a plurality of remote data collection devices adapted to transmit collected data by mimicking key entries from a keyboard via an interface to a keyboard application programming interface of the computing device. The remote data collection devices transmit data without requiring an operative keyboard, and receive and interpret audio data into device function commands. The method further includes communicating between the electronic book and the keyboard application programming interface of the computing device to facilitate receiving the collected data of the remote data collection devices; communicating from the electronic book via an audio application programming interface of the computing device remote data collection device functions via an audio interface of the computing device to the remote data collection devices; and interpreting key entries from the remote data collection devices into commands for processing the data and data values to be processed based on the commands.

In an example, the electronic book includes an electronic report. The electronic book includes educational content. Also, the electronic book facilitates operation of a business function.

In an example, the remote data collection devices are deployed in a manufacturing environment.

The present disclosure provides a system for automatically populating experimental data reports. The system includes a remote data collection device adapted to receive and interpret data transmitted using standard computer I/O protocols; transmit collected data by mimicking the output of a standard computer I/O device; and communicate with the computing device via BLUETOOTH wireless communication. The system also includes an electronic book operating within a web browser executing on a computing device. The electronic book includes an application programming interface capability for receiving the collected data of the remote data collection devices; and a report populating capability adapted to automatically populate an experimental data report with the collected data received from the remote data collection device.

In an example, the data report includes industrial testing data. Alternatively, the data report includes an educational experiment. Further, the data report includes manufacturing data.

The present disclosure provides a system that includes a microcontroller-enabled external device adapted to transmit data mimicking keyboard key entries to a keyboard interface of a computing device; an electronic data structure; and a data structure interface function for executing on the microcontroller that combines data structure manipulation commands with external device data to produce a sequence of keyboard mimicking key entries that, when interpreted by the computing device, facilitate manipulating content of the electronic data structure.

In an example, the microcontroller-enabled device transmits the data via the keyboard interface to a keyboard application programming interface executing on a computing device. Further, the external device transmits the data without the external device requiring a keyboard.

The present disclosure provides a method for automatically populating an electronic data structure in an electronic book operating within a web browser executing on a computing device with data from an external data acquisition device. The method includes acquiring data representative of physical phenomena using an external data acquisition device; transforming the acquired data and intended position into a series of keyboard key entries according to a translation protocol; interpreting the keyboard key entries on the computing device as data for an intended position in an electronic data structure in accordance with a predefined data entry format; and populating the intended position in the electronic data structure with the data according to a predetermined format.

In an example, the method further includes storing the electronic data structure using a local data storage access capability. Further, the keyboard key entries are transmitted to the computing device using a Bluetooth protocol.

The present disclosure provides a method for automatically populating an electronic data structure in an electronic book operating within a web browser executing on a computing device with data from an external data acquisition device. The method includes receiving a sequence of keyboard key entries. The keyboard key entries includes data representative of physical phenomena acquired with a data acquisition device and intended position data for the physical phenomena data, from a keyboard application programming interface on a computing device. The method also includes interpreting the received keyboard key entries to determine the data and corresponding intended position; and populating an entry in an electronic data structure with the data to comply with a predetermined data structure format based on the corresponding intended position.

In an example, the intended position is a position that is relative to an intended position corresponding to a data value previously received in the sequence of keyboard key entries. Also, the intended position is defined relative to an intended position of an immediately preceding data value in the sequence of keyboard key entries.

In an example, the predetermined data structure format may be one of a table and a report.

In an example, the intended position in the keyboard key data entries identifies a table cell position. Further, the intended position in the keyboard key data entries identifies row and column information. Also, an intended position in the keyboard key data entries identifies an intended initial position for a plurality of physical phenomenon representative data values.

In an example, the plurality of physical phenomenon representative data values are transmitted sequentially in the keyboard key entry data. Further, the intended position for a plurality of physical phenomena transmitted sequentially is sequential columns in a common row.

The present disclosure provides an electronic book that includes a set of encapsulated HTML instructions for presenting an interactive electronic object that is capable of modifying its presentation based on user interaction within a web browser that is executing on a computing device. The HTML instructions are configured as encapsulated HTML that accepts user input, provides visual and audio output, is capable of accepting data from external devices via an application programming interface of the computing device, and has access to temporary and permanent data storage, while having no direct access to data files, network resources, or application software operating on the computing device other than a web browser capable of executing the encapsulated HTML.

In an example, the electronic object is an electronic book including encapsulated HTML that is adapted to be isolated from network resources.

In an example, modification of presentation includes presenting more or less information associated with a presented portion of the electronic object. The presented portion of the electronic object is a paragraph of the object. Alternatively, modification of presentation includes presenting more or less information in response to a user interaction. Additionally, modification of presentation includes presenting more or less information for a topic associated with a user accessible feature.

The present disclosure provides an electronic that includes a set of encapsulated HTML instructions for presenting an interactive electronic object within a web browser that is executing on a computing device. The HTML instructions are adapted to perform, in response to user input, one or more of access, search, annotate, and interact with external devices. Also, the HTML instructions are configured as encapsulated HTML that accepts user input, provides visual and audio output, is capable of accepting data from external devices via an application programming interface of the computing device, and has access to temporary and permanent data storage, while having no direct access to data files, network resources, or application software operating on the computing device other than a web browser capable of executing the encapsulated HTML.

The present disclosure provides a system for presenting an interactive textbook. The system includes an electronic object for operating within a web browser executing on a computing device. The electronic object adapted to execute HTML instructions in an encapsulated HTML file. The encapsulated HTML that does not include links to any data files external to the encapsulated HTML file.

The present disclosure provides an electronic book that includes a set of encapsulated HTML instructions for presenting an interactive electronic book within a web browser that is executing on a computing device. The HTML instructions configured as encapsulated HTML that operates without access to network resources or application software operating on the computing device other than an enabled web browser. The electronic book also includes a search function of the encapsulated HTML that facilitates searching the context of the electronic book by emulating aspects of a network-based search engine.

The present disclosure provides a method thr searching an encapsulated HTML electronic book that is isolated from network resources and application software other than an enabled web browser of a computing device. The method includes accessing a search table within the encapsulated HTML electronic book, the search table including keywords and links to locations in the encapsulated electronic Book; operating the electronic book within the enabled web browser wherein a portion of the electronic book is adapted to present relevant portions of the search table in response to a user entering a portion of a keyword; and in response to a user selection of a presented portion of the search table, presenting a portion of the electronic book that corresponds to the linked location.

The present disclosure provides a searchable electronic book that includes a set of encapsulated HTML instructions for presenting an interactive electronic book within a web browser that is executing on a computing device; a predefined search table wherein the predefined search table includes keywords and links to content in the electronic book wherein the content may include one or more of animations, video, audio, interactive content and text; a search function operating within the web browser adapted to present relevant portions of the predefined search table in response to a user entering a portion of a keyword; and a navigation function operating within the web browser adapted to present, in response to a user selection of a keyword, a portion of the electronic book that corresponds to a linked location.

The present disclosure provides a method of serving an electronic book as an encapsulated HTML website. The method includes transferring a single file that includes all content required for operating an interactive electronic book within a web browser to a computing device. The single file includes HTML instructions configured as encapsulated HTML and accepts user input, provides visual and audio output, is capable of accepting data from external devices via a keyboard programming interface of the computing device, and has access to temporary and permanent data storage, while having no direct access to any other data files, network resources, or application software operating on the computing device other than an enabled web browser.

The present disclosure provides an interactive electronic book adapted to operate within a web browser on a computing device with no access to external data files or network resources. The interactive electronic book includes a single file wherein the file includes instructions configured as encapsulated HTML, and all content required for operating the interactive electronic book.

In an example, the browser is one of INTERNET EXPLORER (IE), SAFARI, FIREFOX, and GOOGLE CHROME. Further, the instructions include one of HTML-5, JavaScript, and XML. Also, the instructions includes support for receiving and processing user input, providing visual and audio output, accepting data from external devices, and accessing temporary and permanent data storage.

The present disclosure provides an electronic book that includes a set of encapsulated HTML instructions for operating an interactive electronic book within a web browser that is executing on a computing device. The HTML instructions configured as encapsulated HTML that accepts user input, provides visual and audio output, is capable of accepting data from external devices via a keyboard programming interface of the computing device, and has access to temporary and permanent data storage, while having no direct access to network resources or application software operating on the computing device other than an enabled web browser. Also, the HTML instructions include an expiration function that compares an expiration date/time value that is accessible within the encapsulated HTML with a current date/time value that is accessible via the web browser and causes the electronic book to limit operation to an expired operating mode if the expiration date/time has passed.

The present disclosure provides a method for expiring an electronic book consisting of encapsulated HTML operating within a web browser that is executing on a computing device, a function of the electronic book is adapted to prevent access to a portion of the electronic Book upon expiration. The method includes configuring an expiration date/time in the electronic book in a manner accessible from within the web browser; comparing a current date/time with the stored expiration date/time; and limiting operation of the electronic book if the current date/time is later than the expiration date/time.

In an example, the expiration date is one of end of loan, end of term, and end of trial period. Further, limiting operation of the electronic book may include one or more of limiting access to assessment tools, limiting access to a portion of the interactive content and limiting the ability to interact with remote data acquisition devices.

The present disclosure provides a method that includes operating an encapsulated HTML-based electronic book within a web browser of a computing device. A portion of the electronic book is adapted to facilitate performing interactive experiments including receiving information from an external device via a keyboard application programming interface of the computing device; interpreting the received information into commands for processing the information and data to be processed based on the commands; and transmitting information to the external device via an audio output application programming interface of the computing device; and updating the interactive experiments via the web browser of the computing device based on the interpreted received information, the transmitted information, and a current state of the interactive experiments.

The present disclosure provides an electronic book running in a web browser on a host computer that is capable of performing interactive experiments with external data acquisition devices independent of a networking capability of a host computing device. The electronic book includes an interface to one or more communication APIs that are available on the host computing device; a communication channel that facilitates communication via the interface with a data acquisition device; an electronic book send protocol translator adapted to translate experimental commands and data into a series of data acquisition device-recognizable signals; an electronic book receive protocol interpreter adapted to interpret received information into commands for processing the information and data to be processed based on the commands; a portion of the electronic book adapted to update the interactive experiments via the web browser of the computing device based on the interpreted received information, the transmitted information, and a current state of the interactive experiments; and a local data storage access capability that is adapted to at least one of read data for handling with the electronic book send protocol translator and write data to which the electronic book receive protocol interpreter has been applied.

The present disclosure provides a system for performing interactive experiments. The system includes an electronic book running in a web browser on a host computing device independent of a networking capability of a host computing device. The host computing device includes an interface to one or more communication APIs that are available on the host computing device; a communication channel that facilitates communication via the interface with a data acquisition device; an electronic book send protocol translator adapted to translate experimental commands and data into a series of data acquisition device-recognizable signals; an electronic book receive protocol interpreter adapted to interpret received information into commands for processing the information and data to be processed based on the commands; and a portion of the electronic book adapted to updating the interactive experiments via the web browser of the computing device based on the interpreted received information, the transmitted information, and a current state of the interactive experiments. The system also includes a data acquisition device that includes a sensor adapted to acquiring data representative of physical phenomena; a device communication channel adapted that facilitates communication with the host computing device; a device receive protocol interpreter adapted to interpret of data acquisition device recognizable signals received by the device communication channel into a series of commands for acquiring sensor data and parameters to modify the commands; and a device send protocol translator adapted to translate the acquired sensor data into a series of commands and data to be communicated using the device communication channel.

In an example, the device communication channel mimics a keyboard API.

The present disclosure provides an electronic book that includes a set of encapsulated HTML, instructions for presenting an interactive electronic book within a web browser that is executing on a computing device. The HTML instructions configured as encapsulated HTML accessible by a web browser that does not require access to network resources. The encapsulated HTML is adapted to facilitate navigation within the electronic book including one or more of graphical icons representing a plurality of locations with the electronic book, navigation bars, links, and search functionality.

The present disclosure provides an electronic book that includes a set of encapsulated HTML instructions for presenting an interactive electronic book within a web browser that is executing on a computing device. The HTML, instructions configured as encapsulated HTML accessible by a web browser that does not require access to network resources. The encapsulated HTML, is created using one or more of paragraph-by-paragraph linking in a linked database and chapter-based compilation for presentation in a web browser.

In an example, the encapsulated HTML is created using JavaScript. Alternatively, the encapsulated HTML is created using PHP scripts.

The present disclosure provides a system for creating an encapsulated electronic book to be run in a web browser. The system includes a paragraph database including paragraphs associated with the electronic book; a compilation table including a hierarchy of chapters of the electronic book and their corresponding paragraphs; and code adapted to interact with the compilation table and paragraph database and generate the encapsulated electronic book.

In an example, the paragraph database includes a linked database wherein the links are based on a preferred flow of paragraphs. Further, the code is one of a PHP script and MySQL. Also, the encapsulated electronic book may be written as one of HTML, HTML-5, and XML.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. The HTML instructions direct the web browser to present a user accessible feature that facilitates presenting varying quantities of information for a selected topic without requiring access to external network resources.

The present disclosure provides an expansion capable electronic book that includes a set of encapsulated HTML instructions for presenting an interactive electronic book within a web browser that is executing on a computing device independent of a networking capability of the host computing device. The set of encapsulated HTML instructions includes a plurality of topical paragraphs having varying levels of detail; a user interface adapted to facilitate user access to paragraph detail presentation commands; and a content expansion feature adapted to display one or more of the varying levels of detail in response to the user access to the paragraph detail presentation commands.

In an example, the paragraph detail presentation commands may facilitate access to the varying levels of detail hierarchically. Further, the varying levels of detail of the topical paragraphs may be organized hierarchically to facilitate user access to further levels of detail.

In an example, a first topical paragraph and a second topical paragraph of the plurality of topical paragraphs include different levels of detail of a common topic. The first topical paragraph facilitates presentation of a more detailed version of the second topical paragraph. Further, a topical paragraph may be presented as a portion of a webpage.

The present disclosure provides a method of content expansion of an electronic book. The method includes storing a plurality of topical paragraphs having varying levels of detail for a particular topic in a paragraph database; providing a user interface adapted to facilitate user access to paragraph detail presentation commands; and providing a content expansion capability that accesses the paragraph database and facilitates display of a topical paragraph based on the user access to the paragraph detail presentation commands. The electronic book consists of encapsulated HTML instructions that are suitable for running within a web browser on a computing device independently of a networking capability of the computing device.

In an example, user access to the paragraph detail presentation commands that indicates a user desire to view more detail causes the content expansion capability to select a topical paragraph from the paragraph database that includes greater detail that an initially selected topical paragraph.

In an example, the initially selected topical paragraph is a default topical paragraph. Also, the initially selected topical paragraph is a currently selected topical paragraph.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. Also, the HTML instructions access a persistent data storage feature provided via the web browser. Further, the HTML instructions that access the persistent data storage feature are adapted to facilitate storage and retrieval, across sessions of the electronic book, of one or more of notes, page markers, unique assessment questions and answers, and experimental data.

In an example, the persistent data storage feature includes access to local storage on the computing device. Also, the persistent data storage feature includes a cookie.

In an example, the HTML instructions that access the persistent data storage feature cause content of a data file that includes a portion of the electronic book to be modified to facilitate the storage across sessions of the electronic book.

The present disclosure provides a method of storing results of an electronic book use-session. The method includes processing a set of encapsulated HTML instructions for presenting an interactive electronic book within an enabled web browser that does not require access to network resources; and accessing a persistent data storage feature provided via the web browser with the HTML instructions to facilitate storage and retrieval, across use-sessions of the electronic book, of notes, page markers, unique assessment questions and answers, and experimental data.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. Also, the HTML instructions are adapted to generate assignments derived from at least one of a question stem, independent stem variables having a range of values, dependent stem variables, a correct answer, and distractors.

In an example, precision can be specified for the independent and dependent stem variables. Further, the dependent stem variables are calculated as a function of one or more of the independent stem variables.

The present disclosure provides system for generating unique assessment questions within an encapsulated electronic book. The electronic book includes a user interface for the entry of base assessment questions including options for entering two or more assessment options selected from the list consisting of: question type, level of difficulty, question stem, independent variables, independent variable value range, independent variable value precision, dependent variables, functions for determining dependent variables, relationships between a dependent variable and more independent variables, distractors, a correct answer and explanations; a portion of an HTML encapsulated electronic book adapted to generate unique assessment questions including generating random values for the independent variables; calculating values for dependent variables; identifying a subset of distractors; calculating a correct answer value; and providing a unique assessment question for a base assessment question stem including the generated values of the independent variables, the calculated values of the dependent variables, the correct answer value, and the subset of distractors.

In an example, the random values are within the independent variable value range. Also, calculating values for the dependent variables are based on generated values of the independent variables. Additionally, including calculating answer values for the set of distractor values.

In an example, the answer values for the set of distractor values is based on at least one of the values for the independent variables and the values for the dependent variables. The system further includes storing the generated, calculated, and identified data for the unique assessment question in an HTML table within the electronic book.

The present disclosure provides a system for generating unique assessment questions within an encapsulated HTML electronic book. The electronic book includes a storage facility for storing base assessment questions, question type, level of difficulty, question stem, independent variables, independent variable value range, independent variable value precision, dependent variables, functions for determining dependent variables, relationships between a dependent variable and more independent variables, distractors, a correct answer and explanations; and a question generation engine adapted to generate unique questions by performing question preparation steps including identifying a question stem; generating random values for accessed independent variables; calculating values for dependent variables; determining a subset of distractors; calculating a correct answer value; storing the generated, calculated, and determined data in the storage; and associating the stored generated, calculated, and determined data with the identified question stem.

In an example, the storage is an HTML table within the electronic book. Also, the system includes presenting to a user of the electronic book a unique assessment question for a particular question stem including the generated values of the independent variables, the calculated values of the dependent variables, the correct answer value, and the subset of distractors that are associated with the particular question stem.

The present disclosure provides a problem description language that includes a problem syntax having a formula stem field that represents a resolvable relationship between formula variables and formula solution, a plurality of formula variable type options, a plurality of formula dependency options, and a formula solution field. The problem description language also includes variable value distribution rules and distractor preparation rules.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. The HTML instructions include a problem description language for generating unique assignments derived from at least one of a question stem, independent stem variables having a range of values, dependent stem variables, a correct answer, and distracters.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. Also, the HTML instructions include a problem description language for generating unique assignments with at least one of common tags, variables and distractors.

The present disclosure provides an electronic book that includes a set of encapsulated HTML instructions for presenting an interactive electronic book within a web browser that is executing on a computing device. The HTML instructions configured as encapsulated HTML accessible that does not require access to network resources. Further, the HTML instructions facilitate user annotation of portions of content presented via the web browser, the user annotation including tags, margin notes, page markers, text highlighter and a commenter.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. Also, the HTML instructions include an annotator function that interacts with an annotator language of the encapsulated HTML that facilitates storing user notes and linking the user notes to a section of the electronic book.

The present disclosure provides a system for annotating an electronic book. The system includes an electronic book configured as encapsulated HTML running in an enabled web browser on a host computing device; a user interface adapted to allow the generation of one or more of margin notes, text highlighter, commentator and tags; an annotation language for defining annotation elements including type of annotation, data, and links to active locations in the encapsulated electronic book; a local permanent data storage access function adapted to at least one of read annotation elements and store annotation elements; and a portion of the electronic book adapted to access the stored annotation elements and present them in context with the content of the electronic book.

In an example, the annotation language includes the HTML 5 tagging scheme. Further, the local permanent data storage may include data storage on the computing device. Also, the stored annotation elements may be presented in a pop-up window.

The present disclosure provides an electronic book that includes a set of encapsulated HTML instructions for presenting an interactive electronic book within a web browser that is executing on a computing device. The HTML instructions configured as encapsulated HTML accessible by a web browser that does not require access to network resources. The HTML instructions include an assessment capability to facilitate student assessment of an assignment based on automatically comparing student responses with correct responses for the assignment.

The present disclosure provides a system for automatic assessment of student understanding. The system includes an assessment database including a plurality of assessment questions and corresponding correct answers; a user interface adapted to facilitate presenting assessment questions and receiving user responses; and a response verification feature adapted to compare the user responses to specific questions with the corresponding correct answers. The assessment database, the user interface, and the response verification feature are in an electronic book that is configured as encapsulated HTML adapted for running in an enabled web browser on a host computing device.

In an example, the assessment questions include one of more of numeric multiple choice, vocabulary multiple choice and gridded answer choices.

In an example, the user interface conditionally presents the assessment questions to the user at one or more of predetermined locations within the electronic book. Also, the user interface conditionally presents the assessment questions in response to at least one of input from the user and a request from a teacher.

In an example, a request from a teacher may be received via email as an encapsulated HTML file.

In an example, the response verification feature facilitates feedback of the assessment results to the user. The feedback of an incorrect assessment result is accompanied by one or more of additional information, references and links to relevant pages in the electronic book for review and related questions.

In an example, the system also includes an assessment results storage capability for storing student-specific assessment results. The stored assessment results include the assessment question, the correct answer and the user's response to the assessment question.

In an example, the system also includes including a means to share the assessment result. The assessment result may be shared using one of a removable storage medium such as a USB stick and email.

In an example, the assessment questions may include one or more of image, animation and video multiple choice. Also, the assessment questions may be understood and answered independent of reading ability.

The present disclosure provides an electronic book that includes a set of encapsulated HTML instructions for presenting an interactive electronic book within a web browser that is executing on a computing device. The HTML instructions configured as encapsulated HTML that is accessible by a web browser without access to network resources. Also, the HTML instructions include an assessment capability that facilitates machine-scorable measures of student learning through presenting at least one of visual, graphical and interactive methods to assess student understanding of a curriculum, the assessment capability further facilitating identifying at least one of a next study topic, a review topic, and an assessment adjustment parameter for subsequent assessing student understanding.

The present disclosure provides an electronic book that includes a set of encapsulated HTML instructions for presenting an interactive electronic book within a web browser that is executing on a computing device. The HTML instructions configured as encapsulated HTML that is accessible by a web browser without access to network resources. Also, the HTML instructions include an assessment capability that facilitates machine-scorable measures of student learning through presenting at least one of visual, graphical and interactive methods to assess student understanding of a curriculum, wherein the assessment includes interactive simulation of multiple outcomes of at least one of a problem-solving step and a problem within the curriculum.

The present disclosure provides a system for assessing student's conceptual understanding of subject matter without the student reading to preform the assessment. The system includes graphical representations of a plurality of concept simulations portraying both realistic and unrealistic results; a user interface adapted to facilitate presenting visual representations of a concept simulation, a realistic result and at least one non-realistic result to a user and recording the user's selection of one of the realistic result and the at least one non-realistic result; and a user selection verification feature adapted to compare the user's selection with the realistic result, wherein the graphical representations, user interface, and user selection feature are contained in an electronic book configured as encapsulated HTML adapted for running in a web browser on a computing device.

The present disclosure provides an electronic book that includes a set of encapsulated HTML instructions for presenting an interactive electronic book within a web browser that is executing on a computing device. The HTML instructions configured as encapsulated that is accessible by a web browser without access to network resources. The HTML instructions include an assessment capability that facilitates machine-scorable measures of student learning through presenting a sequence of steps in a reasoning chain where there is an error in one of the steps of the reasoning chain; a user interface adapted to facilitate presenting visual representations of the sequence of steps in the reasoning chain and recording a user's selection of a step in the sequence of steps that purportedly indicates the step with the error; and a user selection verification feature to verify if the user's selection is a correct answer.

In an example, the sequence of steps is presented as one of an image, an animation and a video. Alternatively, the sequence of steps is presented in such as way as to be understood and answerable independent of a user's reading ability.

The present disclosure provides a system for assessing a student's conceptual understanding of subject matter without the student reading to preform the assessment. The system includes a set of encapsulated HTML instructions for presenting an interactive electronic book within a web browser that is executing on a computing device, the HTML instructions configured as encapsulated HTML that is accessible by a web browser without access to network resources. The HTML instructions include an assessment capability that facilitates machine-scorable measures of student learning through presenting a sequence of steps in a reasoning chain where there is an error in one of the steps of the reasoning chain; a user interface adapted to facilitate presenting visual representations of the sequence of steps in the reasoning chain and recording a user's selection of a step in the sequence of steps that purportedly indicates the step with the error; and a user selection verification feature to verify if the user's selection is a correct answer.

In an example, the presentation may be one of an image, an animation and a video. Also, the sequence of steps may presented in such as way as to be understood and selected independent of reading ability.

The present disclosure provides a method for assessing a student's conceptual understanding of subject matter without the student reading to preform the assessment. The method includes operating an encapsulated HTML-based electronic book within a web browser of a computing device; presenting visual representations of the sequence of steps in the reasoning chain; recording a user's selection of a step in the sequence of steps that purportedly indicates the step with the error; and verifying if the user's selection is a correct answer.

The present disclosure provides an electronic book that includes a set of encapsulated HTML instructions for presenting an interactive electronic book within a web browser that is executing on a computing device. The HTML instructions configured as encapsulated HTML that is accessible by a web browser without access to network resources or software. Also, the HTML instructions facilitate operating an interactive equation solver that includes giving options, showing results, and tracking a user's path to a solution.

In an example, the interactive problem solver counts the number of user moves required to arrive at a solution. Further, the interactive problem solver compares the user's path to a solution to at least one alternative path to the solution.

The present disclosure provides a method for assessing a student's conceptual understanding of subject matter. The method includes presenting a plurality of solution steps for a presented problem having a correct solution; recording a user's selection of one of the solution steps; displaying a new expression based on applying the selected solution step to the presented problem, including an option to redisplay the presented problem; repeating the recording and displaying steps until the new presented expression includes the correct solution; counting the selections made by the user; and determining a measure of a user's understanding of the subject matter based on at least one of the total count of selections made by the user to present the correct answer, the path followed by the user to present the correct answer, and the number of incorrect solution steps selected by the user.

In an example, the problem involves a mathematical expression. Also, the problem is at least one of solving an equation, comparing expressions and simplifying an expression. Further, the method is presented in such as way as to be understood and actionable by the user independent of reading ability.

The present disclosure provides an electronic book that includes a set of encapsulated HTML instructions for presenting an interactive electronic book within a web browser that is executing on a computing device. The HTML instructions configured as encapsulated HTML that is accessible by a web browser without access to network resources. Further, the HTML instructions facilitate operating an interactive simulation of a physical experiment.

The present disclosure provides an electronic book that includes a set of encapsulated HTML instructions for operating an interactive electronic book within a computing device-based web browser. The set of encapsulated HTML instructions configured as encapsulated HTML that is accessible by a web browser without access to network resources. The HTML instructions facilitate operating an interactive simulation of a goal-oriented physical experiment. Also, the HTML instructions includes a user interface adapted to display the simulation and accept user inputs representative of real world experimental adjustments; and a portion of the electronic book adapted to track one or more of the user's achievement of a goal and the number of trials to achieve goal.

The present disclosure provides a method of assessing a student's conceptual understanding of subject matter. The method includes presenting in an HTML encapsulated electronic book user interface a simulation of a real-world experiment having a predetermined goal; accepting user inputs representative of real world experimental adjustments; and tracking one or more of the user's achievement of the goal and number of trials by the user to achieve the goal.

The present disclosure provides an electronic book that includes a set of encapsulated HTML instructions for operating an interactive electronic book within a computing device-based web browser. The HTML instructions configured as encapsulated HTML that is accessible by a web browser without access to network resources. Also, the HTML instructions include automated assessment capabilities that facilitate sending student-specific customized assignments with encrypted answer keys to remote computing devices to facilitate automated grading remotely from the classroom while ensuring that the teacher and the student receive machine-graded homework.

The present disclosure provides a method for customized remote assessment. The method includes automatically generating a customized assignment; generating an encrypted answer key for the customized assignment; distributing the customized assignment and the encrypted answer key to an electronic book wherein the electronic book includes a set of encapsulated HTML instructions is accessible by a web browser without access to network resources; automatically comparing assessee input to customized assignment based on encrypted answer key to provide an assessment report of assessee assignment activity; facilitating access to the assessment report by the assessee; and communicating the assessee input, assessment report, and at least one of the customized assignment and the encrypted answer key to an assessor.

In an example, distribution of the customized assignment may be accomplished using one or more of email, USB stick, flash drive and mobile data device.

In an example, the method further includes generating a grade based on the comparison of user input to encrypted answer key. The method also includes generating an assessment report including one or more of a grade, customized assignment, user inputs, and comparison of user input to customized assignment. The method further includes distributing assessment report to one or more of user, student, and teacher.

The present disclosure provides a system that includes a set of encapsulated HTML instructions for operating an interactive electronic book within a computing device-based web browser. The set of encapsulated HTML instructions includes a randomized problem generation facility adapted to facilitate instructor selection of student-specific problem difficult level; and an assessment engine that interacts with the randomized problem generation facility to provide assessment tests for each student-specific problem difficulty level that are suitable for automated assessment. The system operates without accessing network resources or application software other than an encapsulated HTML execution enabled web browser.

The present disclosure provides a system that includes a set of encapsulated HTML instructions for operating an interactive electronic book within a computing device-based web browser. The set of encapsulated HTML instructions includes a randomized problem generation facility adapted to facilitate instructor selection of student-specific problem difficulty level; and an assessment engine that interacts with the randomized problem generation facility to provide test questions with different valid outcomes to a plurality of students who share a student-specific problem difficult level. The system operates without accessing network resources or application software other than an encapsulated HTML execution enabled web browser.

The present disclosure provides a system that includes a set of encapsulated HTML instructions for operating an interactive electronic book within a computing device-based web browser. The set of encapsulated HTML instructions includes a randomized problem generation facility adapted to facilitate instructor selection of student-specific problem difficulty level and an assessment engine that interacts with the randomized problem generation facility to provide different tests to a plurality of students who share a student specific problem difficult level. The system operates without accessing network resources or application software other than an encapsulated HTML execution enabled web browser.

In an example, the randomized problems generated may include one or more of numeric multiple choice, vocabulary multiple choice, gridded options, short answer, reasoning chains, simulated physical experiments, interactive equations, and simulations of multiple outcomes. Further, the different levels of difficulty may be based on student level, student standard, student experience, data from prior assessments, key skills of student, and key capabilities of student. Also, the test may dynamically adapt difficulty level based on current performance of student.

The present disclosure provides a system that includes a teacher device on which a teacher can configure randomized tests and observe machine graded assessee response reports; a student device that is remote from the teacher device on which a student can perform an assessment; and an encapsulated HTML assessment module that is configurable to include the randomized test and a corresponding encrypted answer key, the encapsulated HTML assessment module further includes an assessee interface capability for taking the assessment, assessee response storage capabilities, assessee response machine grading capability, and an assessment-complete reporting capability that transmits at least machine graded assessee responses to the teacher device.

BRIEF DESCRIPTION OF THE FIGURES

The invention and the following detailed description of certain embodiments thereof may be understood by reference to the following figures:

FIG. 26 depicts an assessment technique that may enable users to identify an error in a reasoning chain leading to a solution to a problem;

FIG. 31 depicts a graphical icon based interface.

While described herein with reference to various embodiments, it is understood that, in all cases, unless otherwise specified, references to an "embodiment" or "embodiments" refer to one or more exemplary and non-limiting embodiments. Also, it is understood that, in all descriptions herein, unless otherwise specified, even when not explicitly being referenced to an "embodiment" or "embodiments" refer to one or more exemplary and non-limiting embodiments.

DETAILED DESCRIPTION

Figure 1:
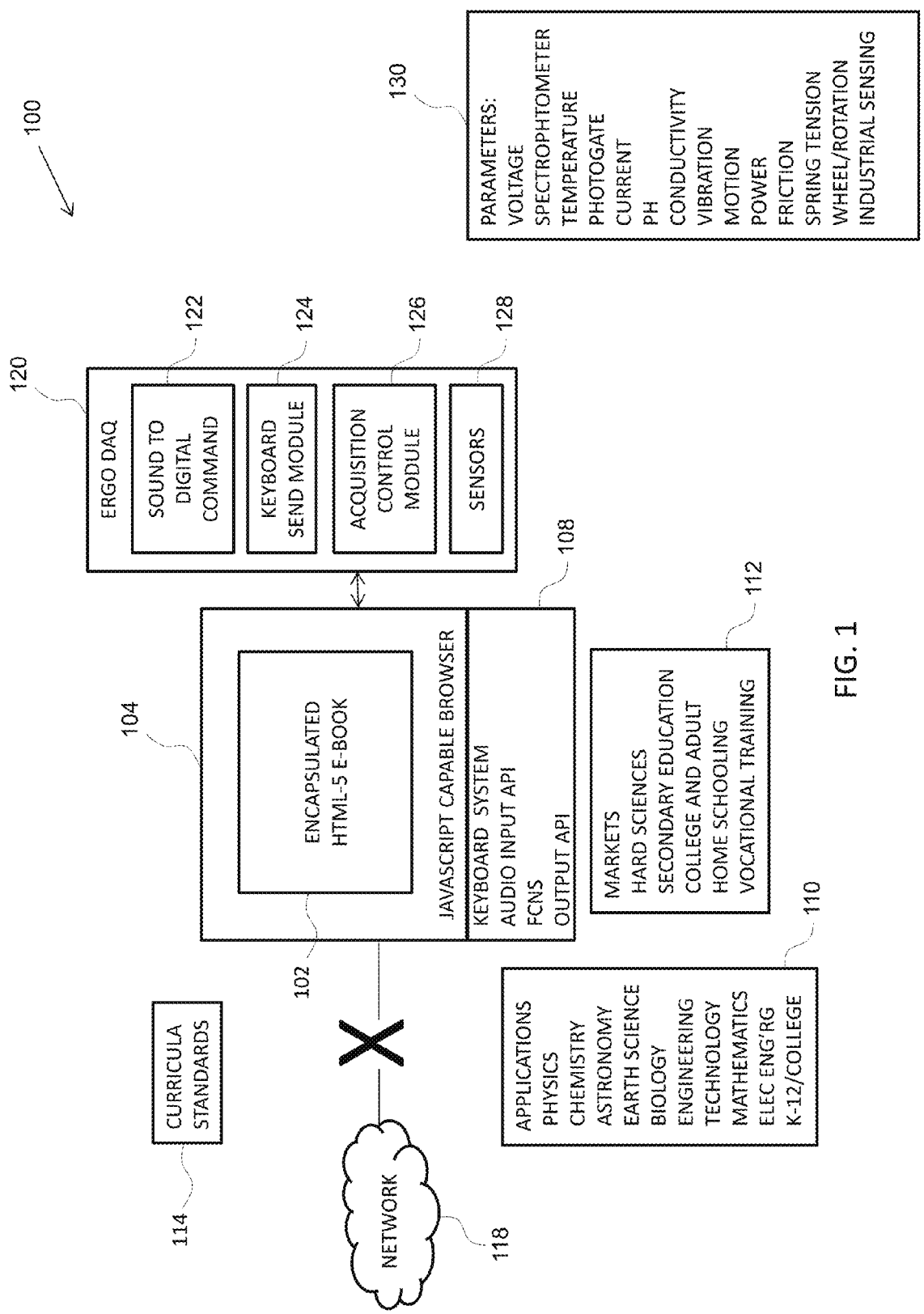
FIG. 1 depicts an educational environment for interactive electronic books that support network-free student use of the electronic books.

FIG. 1 illustrates an embodiment of a system 100 that may be used to facilitate delivery of quality, interactive education capabilities to various users. The system 100 may comprise an e-Book 102 that may be developed using an encapsulated HTML technology to replace or enhance existing physical books with an interactive e-Book and provide an interactive experience of learning to the users. The encapsulated e-Book 102 may be configured to operate using a browser 104 such as INTERNET EXPLORER (IE), SAFARI, FIREFOX, GOOGLE CHROME, and other commonly available browsers. The browser 104 may include features of HTML-5, JavaScript, XML and other languages to enable the operation of the encapsulated e-Book 102. As illustrated in FIG. 1, the browser 104 is a JavaScript enabled browser that may assist the encapsulated e-Book 102 to communicate with I/O peripheral device interface, operating system functional interface, and other application programming interfaces (API) 108 of the system 100.

The encapsulated e-Book 102 may be used in a wide range of applications 110 to provide the interactive experience of learning to the users. The applications 110 may include subjects such as physics, chemistry, astronomy, earth science, biology, engineering, technology, mathematics, electrical engineering, robotics, and the like, in environments such as K-12, college, continuing education, professional development, and the like. In addition, various markets 112 such as hard science educational and/or assessment markets, secondary education, college and adult education, home schooling, vocational training, and many others may benefit from a fully functioning encapsulated e-Book 102.

The encapsulated e-Book 102 may be based on and/or may enforce curricula standards 114 by applying such a set of standards throughout the lifetime of the e-Book without being subject to external influences or potential corruption due to an external network connection such as an external network 118. As shown in FIG. 1, the encapsulated e-Book 102 may be configured to operate isolated from the external network 118 and provide various network-like features to facilitate interactive learning without accessing the external network 118. However, in embodiments, the encapsulated e-Book may operate on a computer device having network access without accessing the network or without facilitating access to the network by a user from within the encapsulated e-Book. In embodiments, the encapsulated e-Book may provide for the communication of encapsulated HTML files, such as assignments, grading records, reports, and the like, over an external network without enabling a user accessing the e-Book to access the network from within the e-Book. Although the specification refers to embodiments of an encapsulated e-Book without network access, it should be understood that the embodiments also comprise those configurations described above such as: where the computing device may have network access which is unavailable to the encapsulated e-Book; where there is a means to share encapsulated HTML files for purposes of assessment, grading, and the like; and the like.

The encapsulated e-Book 102 may be configured to communicate with one or more data acquisition devices 120 to enable the users to perform tangible, real-world experiments while accessing the content of the encapsulated e-Book 102 for a particular topic. In an example, the user may access a chapter adapted to include concepts associated with velocity and acceleration measurements. The encapsulated e-Book 102 may communicate with a data acquisition device 120 to acquire data associated with motions of a physical object. In an example, the data acquisition device 120 may be configured to include a sound to digital command module 122, a keyboard send module 124, acquisition control module 126 and a plurality of sensors 128.

The encapsulated e-Book 102 may be configured to communicate with the data acquisition device 120 using various APIs 108 of the computing device that are accessible to the enabled browser 104. The encapsulated e-Book 102 may function without requiring installation of additional software, databases, applications and the like to facilitate interaction with the data acquisition device 120. In an illustrative example, the encapsulated e-Book 102 may be configured to interact with a data acquisition device 120 using an audio output or keyboard input API accessible by the enabled browser 104. Accordingly, the sound to digital command module 122 of the data acquisition device 120 may be configured to convert an audio output transmitted by the encapsulated e-Book 102 to commands for the acquisition control module 126 which may be configured to control the process of data acquisition from a plurality of sensors 128 based on received commands.

The plurality of sensors 128 may be configured to determine values associated with physical phenomena parameters 130 such as voltage, light color (spectro-photometry), temperature, photogate, current, PH, conductivity, vibration, motion, power, friction, spring tension, wheel rotation, industrial sensing, and the like. In an illustrative example, the user may be interested in the measurement of temperature of an article e.g., a physical rod, while accessing the content of the encapsulated e-Book 102. Accordingly, the encapsulated e-Book 102 may provide instructions to the data acquisition device 120 to determine the temperature of the article using a temperature sensor selected from the plurality of sensors 128. As discussed, the instructions may be provided in the form of an audio output signal generated using the audio out API of the computing device and may comprise the duration for which temperature of the article needs to be determined. The acquisition control module 126 may control the acquisition of the data from the temperature sensor in accordance with the instructions received from the encapsulated e-Book 102. The data acquisition device 120 may be configured to transmit the acquired data back to the encapsulated e-Book 102 using the keyboard send module 124.

Further, the keyboard send module 124 may enable the data acquisition device 120 to be considered a keyboard device by the encapsulated e-Book 102. In other words, the encapsulated e-Book 102 perceives the output of the data acquisition device 120 as the output of a normal keyboard. Accordingly, the encapsulated e-Book 102 may utilize the keyboard API that is accessible to the browser 104 to receive the data sent by the data acquisition device 120 as a series of key strokes, interpret the key strokes according to a receive protocol interpreter, and display the acquired temperature data to the user. The encapsulated e-Book 102 may request and receive data from the data acquisition device 120 without the installation of additional software for enabling communication with the data acquisition device 120.

A system directed towards integrating the e-Book technology described herein with external hardware may facilitate direct communication between the external hardware and an encapsulated e-Book executing within an enabled web browser on a computing device. The system may facilitate two-way communication between said computer and a functional device, such as a device that measures something (e.g., measuring temperature, etc.) that may be part of a lesson or other function of the encapsulated e-Book. There may be many types of functional devices that don't require interaction with each other, but do facilitate uploading data to a computer for use by an encapsulated e-Book and the like.

An educational encapsulated e-Book of the present disclosure may operate within an enabled browser of a computer, such as a laptop, desktop, handheld device, tablet, and the like where the computer may not include an operating network interface. Such a computer may be configured, either physically or logically, so that access to network communication is limited or non-existent for programs operating on the computer. This may effectively isolate the encapsulated e-Book or computer from the Internet while providing a rich interactive educational experience to facilitate support of various educational system objectives regarding student security, privacy, and the like.

An e-Book enabled computer device may comprise a Bluetooth interface that conventionally may be used to communicate between the computer device and I/O peripherals such as keyboards, pointing user interface devices, audio devices, and the like. The computing device of the educational e-Book may be configured in proximity to other "smart" devices, such as digital to analog converters, sensors, and the like to facilitate communicating via Bluetooth or similar short-range wireless connection. In particular the educational e-Book may leverage standard Bluetooth interfaces e.g. a Bluetooth keyboard interface) that may be available via conventional system functionality (e.g. Bluetooth keyboard API) to establish communication between the computer and a "smart" peripheral that is suitable for educational experimentation, laboratory use, manufacturing-related operations, and the like. in an example, a peripheral device, such as an analog to digital converter (ADC), may be configured with a Bluetooth interface and may be capable of operating a protocol such that the ADC looks as if it were a keyboard to the linked computing device of the encapsulated eBook. In this way, when the peripheral communicates with an educational e-Book, operating in a browser on the computer, the communication may occur via the computer's Bluetooth keyboard driver/API.

In embodiments, there may be two-way communication between an e-Book enabled computer and a peripheral device. In embodiments, communication from a peripheral device may be via the keyboard API over the Bluetooth keyboard interface. Likewise a different standard interface, such as an audio output capability (typically for playing music or other audio) may be leveraged so that the computing device of the e-Book may send an audio-like signal over the Bluetooth interface to the peripheral. This additional one-way channel may be combined with the keyboard input interface to facilitate bidirectional communication between the computers, or more particularly between the encapsulated HTML educational e-Book via a web browser, and the peripheral device.

Figure 2:
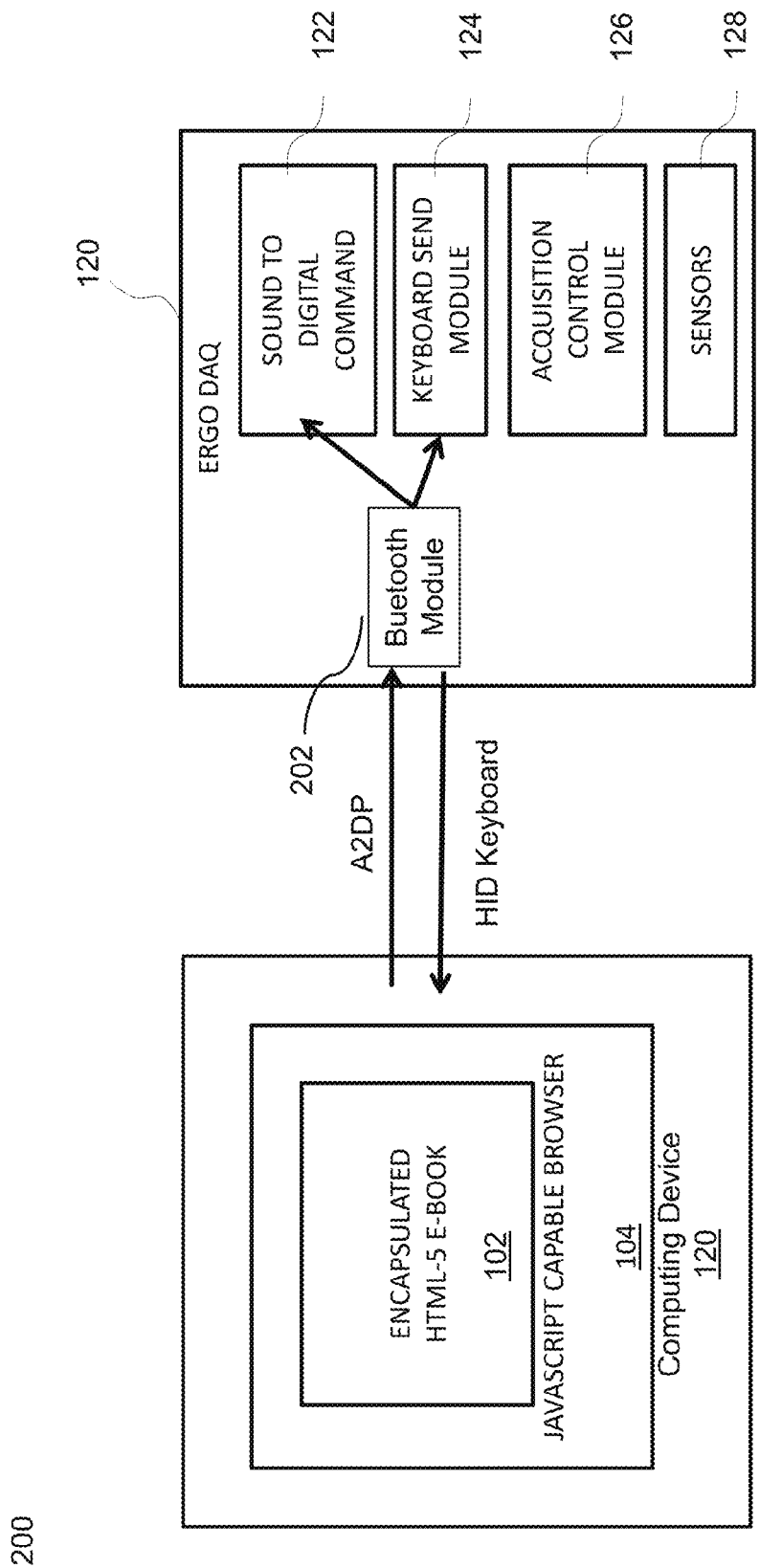
FIG. 2 depicts a computing device running an encapsulated eBook.

Referring to FIG. 2, a flow diagram 200 is shown comprising a computing device running an encapsulated eBook 102 within an enabled browser 104 and a peripheral device 120, an ERGO DAQ, wherein the peripheral device 120 is comprised of a Bluetooth interface 202, a module programed to manage the audio communications 122 received via the Bluetooth interface 202, a module programed to manage the sending of keyboard data 124, an acquisition control module 126 for managing the intended functionality of the peripheral device 120, and one or more sensors 128. In embodiments, the functionality of the peripheral device 120 may be distributed across one or more microcontrollers, programmable ICs, PICs, and the like or combined into a single microcontroller or programmable IC.

In embodiments, the encapsulated eBook 102 may communicate to a peripheral device 120 over an audible output API 108 of the computing device by sending a series of square-wave signals of different frequencies. In one illustrative and non-limiting example, the system may use square-waves of 16 different frequencies for a HEX based communication system where the frequencies may range from 1031 HZ to 2301 HZ. In embodiments, the selection of frequencies to be used may be a function of: the receptive capabilities of the Bluetooth communications interface; achieving an optimum balance of the interactions between desired communication bandwidth, system noise, timer capacity; and the like.

Figure 3:
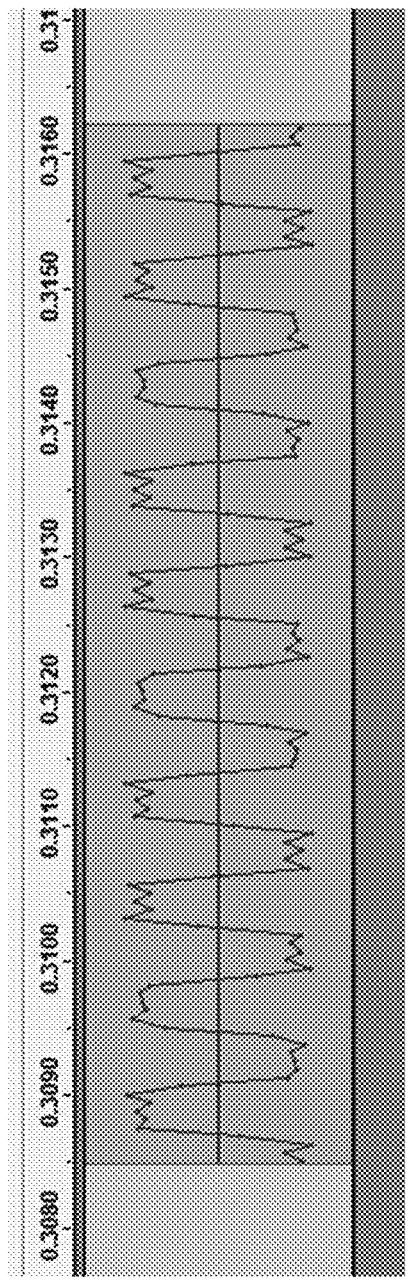
FIG. 3 depicts square-waves of different frequencies of audio files of the encapsulated eBook.

In embodiments, the encapsulated eBook may have a set audio files representative of square-waves of different frequencies, an example of which is shown in FIG. 3. In embodiments, the system may sequentially play the individual square-wave audio files representative of the different frequencies to send commands. However, on some computing devices it may be difficult to play individual audio files in rapid succession. Therefore, in embodiments, the system may store audio clips of sequential combinations of square-waves representative of key commands to be sent. Storing the combined audio clips may result in faster throughput as only a single audio file need be sent to the audio output rather than a series of audio files.

Figure 4:
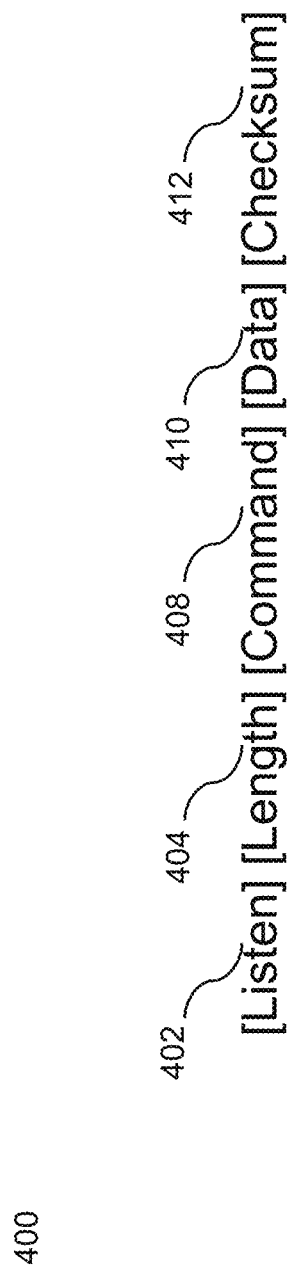
FIG. 4 depicts an example of a communications protocol.

In embodiments, the peripheral device may read the input code at any incoming frequency where each frequency may represent a particular character. In embodiments the system may be interrupt based so no polling is required. A circular buffer may store all incoming data and the incoming data may be accessed sequentially and the incoming message interpreted. In embodiments a binary search tree may be used to distinguish the different frequencies. In embodiments, the binary search tree may be expanded if new frequencies are added to the communication protocol Referring to FIG. 4, an illustrative and non-limiting example of a communications protocol 400 is shown comprising 5 parts: listen 402, length 404, command 408, data 410, and checksum 412. In embodiments listen 402 may comprise a unique frequency that indicates a new batch of data is being sent. In embodiments length 404 may comprise two frequencies or characters indicating the total length of the message to follow comprised of command 408, data 410, and checksum 412. In embodiments command 408 may comprise two frequencies or characters indicating a command to the peripheral device such as: drive x meters; turn in a circle; measure temperature; send data; and the like. In embodiments data 410 may comprise a variable number of frequencies where the length of the data to be sent is based on the associated data for the respective command 408 previously sent. In embodiments checksum 412 may comprise an XOR of all the bits in Listen 402, Length 404, Command 408, and Data 410. In embodiments, there may be an additional frequency representative of repeated characters. In an illustrative and non-limiting example, a sequence AA may be sent as "AA" or "A repeat" using the additional frequency representative of repeated characters.

In embodiments, the encapsulated eBook may receive communications from a peripheral device over the keyboard API. During initialization, the computing device of the encapsulated eBook may be paired with the peripheral device and a keyboard human interface protocol, HID, specified. The keyboard send module 124 may send a series of commands to the Bluetooth module 202 which may then transmit those commands over Bluetooth to the computing device of the encapsulated eBook 102. In embodiments, commands may be sent as UART characters directly from the keyboard send module 124 to the Bluetooth module 202 which will "type" out the pressed keys to the encapsulated eBook. However, this approach may be slower than desired with a maximum throughput of approximately 50 characters/second. In embodiments, a direct HID report method may be used where a single hex command represents the states of up to 6 keys. As an illustrative example, 6 "key down" commands may be sent with a single hex command or 6 "key up" commands may be sent with a single hex command. This approach may enable throughputs approaching 300 characters/second.

In embodiments, the actual data sent to the computing device of the encapsulated e-Book 102 using the keyboard HID represents key presses. This may limit the characters communicated to the number of keys on a standard keyboard. In embodiments, this may result in a base 35 system as there are 26 characters (a-z) and 10 numbers (0-9) totaling 36 characters, which may be used to communicate information. There are other keys on a keyboard. Some of these keys may be reserved for commands; other keys may be unused, as they are not always interpreted in the same manner by different computers and tablets. In illustrative and non-limiting examples: F-keys may work, but on tablets these may default to special functions such as volume control or brightness control; number pad keys may work but some tablets may not support number pad input; the spacebar may be interpreted as a command to scroll down the page rather than a space depending on the browser; and the like.

In embodiments, the communication protocol may change depending on the experiment and the type of peripheral device for reasons such as obtaining the fastest data rate, and the like. In an illustrative and non-limiting example, to send data representative of a sine wave it may be desirable to send data points from 1 to 40,000. This may be done using four characters, a first command character followed by three data characters. In base 35, three data characters are capable of representing from 0 to 46,655. In the example described above, the states of four keys are indicated. However, using the HID direct protocol command signals the state of up to 6 keys with a single command. In embodiments 4 character commands may be sent sequentially and the last 2 characters in each HID direct protocol command wasted. However, this may inefficient. In embodiments it may be desirable to string commands together resulting in a series of three commands of four characters each being spread over two six character HID signals. This may be more efficient. However, the use of the HID protocol may limit the ability to send repeat characters.

A "key down" or "key up" command is sent for six characters at a time. In an illustrative example, if a "key down" command is sent for the six characters ";akl;a" the receiving computing device may "see" only ";akl" as the latter ";a" were already pressed down. In embodiments, the repeating characters may be sent in a subsequent HID signal. However, this may limit the data throughput. In embodiments, an additional five keys (not part of the 36 keys used for the base 35 system) may be used to represent repeat characters such as "repeat $1^{st}$ character in HID command," "repeat second character in HID command", "repeat $3^{rd}$ character in HID command", "repeat $4^{th}$ character in HID command", "repeat $5^{th}$ character in HID command", and the like. In this way full use may be made of the six characters in the HID command.

Figure 5:
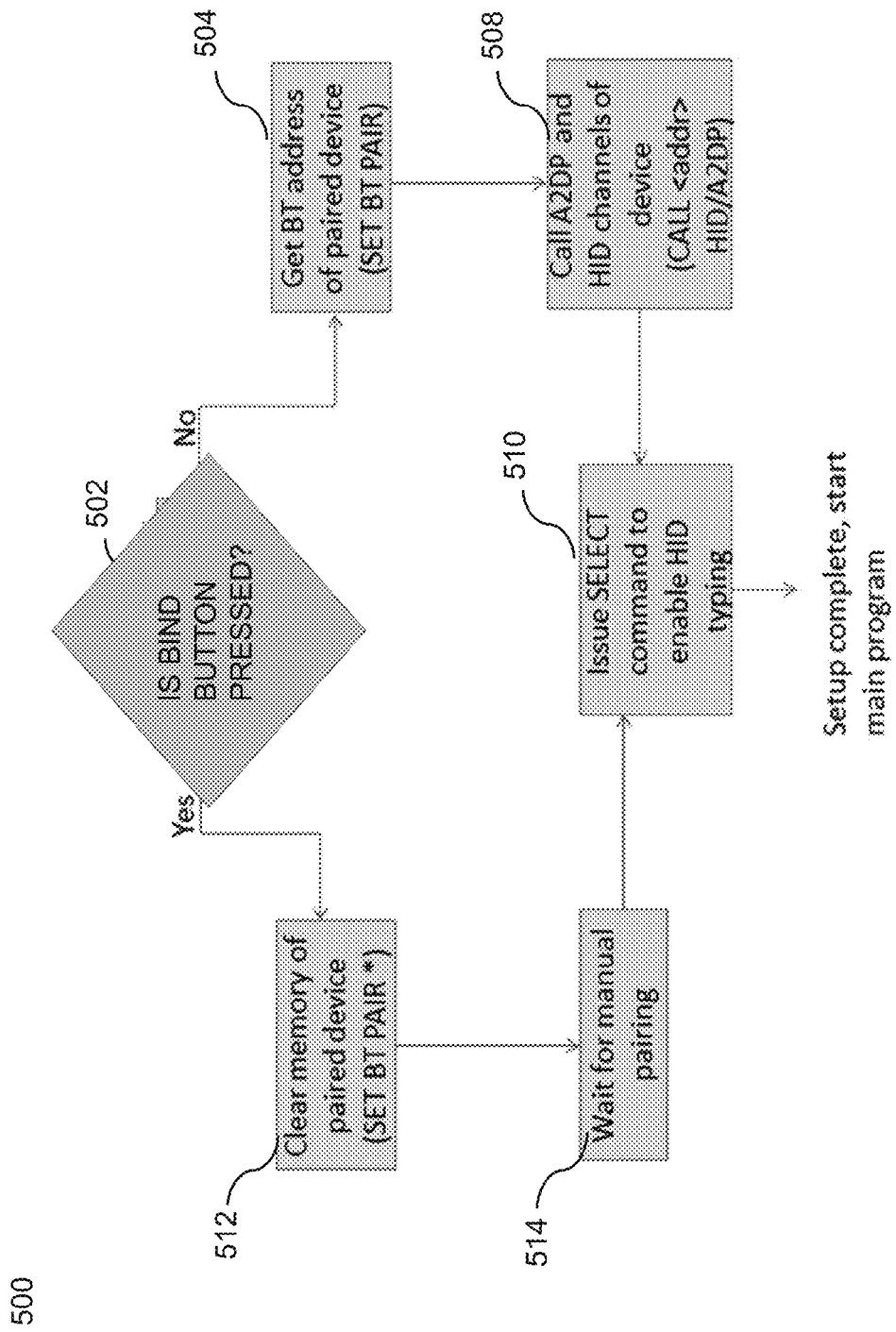
FIG. 5 depicts connection of an e-Book to an external peripheral device, for example using Bluetooth.

In embodiments, it may be desirable for the cook to connect with different external peripheral devices at different points in time, such as to support different experiments, and the like. However, in many of the embodiments described, the connection to the external peripheral device has been made using Bluetooth and standard APIs associated with the computing device of the e-Book. In embodiments, there may be a means to switch the Bluetooth pairing between a plurality of external peripheral devices. Referring to FIG. 5, a high level flow diagram 500 for setting up a Bluetooth connection is shown comprising determine if bind button is pressed 502. Based on a negative answer regarding the hind button being pressed 502, the flow moves through Get BT address of device to be paired 504, Establish A2DP and HID channels of connection with the device 508, and issue "select" command to enable HID typing 510. An affirmative answer to whether the bind button is pressed 502, the memory of the paired device is cleared 512, the system waits for manual pairing 514 and then moves to the issue "select" command to enable HID typing 510. In embodiments, there may be a means to rename the external peripheral device, ErgoBot, to facilitate connecting to the desired device.

By receiving keyboard interface protocol compatible data from an external peripheral and sending audio to an external peripheral via standard interface functionality, an encapsulated HTML or equivalent educational e-Book may communicate directly with peripheral devices, facilitating integration of laboratory experiments, exercises, assignments and the like with the educational e-Book without requiring any software installation and without access to any networking capability.

In an illustrative example, an encapsulated HTML-5, or similar browser compatible file, may comprise Java code, such as JavaScript, that may cause the audio output capability of a computer to send audio (e.g. over a Bluetooth audio output capability of the computer) that may be interpreted, by an external peripheral device that receives the audio, as commands for performing one or more functions, such as reset, sample data, send data, and a wide range of other functions described elsewhere and herein. The external device, which may be a sensor device, may be adapted to receive the audio, interpret the audio to determine commands, and execute the commands. Upon executing a command, the external device may send data (e.g. keystroke compatible data) that may be received by the e-Book operating in the browser (e.g. by a keyboard data receiving java or JavaScript function of the e-Book, and the like). The e-Book may interpret the received keyboard data to extract the sampled data. In an example of keyboard data being provided from the external device, the keyboard data may be individual keystroke data that may represent individual characters of a syntax that may be interpreted by the e-Book. The syntax may include instructions that effectively cause the e-Book to perform actions, such as storing sampled data, processing sampled data, and the like.

Web browsers and other applications on computing devices rely on device drivers and intermediate software, often called Application Programming Interfaces (APIs), to provide connectivity services with other applications, devices, and the like in a computing environment. In particular, web browsers may accept data from a keyboard device through a keyboard API that facilitates sending and receiving data between the web browser and the keyboard device. A keyboard API may be further extended to facilitate communication with a wireless keyboard via a wireless communication interface, such as Bluetooth and the like. Therefore, computing devices that may provide such capability may include tablets or any other device that have a keyboard API and Bluetooth capability.

If an external peripheral device, such as a data collection device or other apparatus, is configured to act like a keyboard (e.g. sending communications using a keyboard API), the external peripheral may communicate with a web browser running on a computer using the computers native support for the keyboard API and without requiring additional software specific to the external device to be installed on the computing device. Because an encapsulated e-Book, or electronic object as described herein, may operate within a web browser, a keyboard API may facilitate communication of data between an external peripheral device and an e-Book using only the native web browser environment of the computer.

However, in embodiments, end-to-end communication between an external peripheral device and an electronic object, such as an encapsulated e-Book operating in a web browser, may require more than emulation of keyboard functionality by the external peripheral device. Referring again to FIG. 1 in an illustrative and non-limiting example, an encapsulated e-Book 102 running in a JavaScript enabled Web Browser 104 may use the application programming interfaces (API) 108 available on the computer to communicate with one or more data acquisition devices 120. In embodiments, a portion of JavaScript in the encapsulated e-Book 102 running in a JavaScript enabled web browser 104 may interface to the keyboard API (one of the application programming interfaces (API) 108 available on the computer) through the browser 104 to communicate with and receive information via the keyboard send module 124 of a data acquisition peripheral device 120. At the same time, another portion of JavaScript in the encapsulated e-Book 102 running in a JavaScript enabled web browser 104 may interface to an audio output API (one of the application programming interfaces (API) 108 available on the computer) through the browser 104 to communicate with the sound to digital command module 122 of the data acquisition peripheral device 120. Non-limiting functional examples may include interpreting commands received by the external device to perform operations (e.g. reset, sample, turn on/off an output, and the like). Likewise keyboard data received by the computer may be interpreted as: commands to perform functions such as storing data, manipulating a spreadsheet table of entries, and the like; streams of data; and the like.

In embodiments, a data acquisition device 120 may be suitable for use in an education environment, such as a public school high school physics/science/engineering class, a college or university science or engineering classroom and the like. In embodiments, the data acquisition device 120 may have no keyboard and yet be adapted to be compatible with any protocol or other requirements of the keyboard API/interface and thus, may communicate with an educational e-Book or other assessment or laboratory functionality operating on a computer via a keyboard API/interface communication pathway. Although emulating a keyboard is one option for sending data from a non-keyboard device over a keyboard API/interface, such an embodiment may be limited to the non-keyboard device appearing to an e-Book or other computer-based functionality as a keyboard. One may overcome these potential limitations by adapting the non-keyboard peripheral device and a companion function within an Encapsulated e-Book on the computer to employ a function-specific receive protocol interpreter while communicating via the keyboard API/interface. In this way, data that may appear as a sequence of keystrokes on a keyboard to the keyboard API/interface may be useable by the e-Book companion function to implement complex control and data protocols.

To the extent that a keyboard API/interface may support two-way communication between a computer and a compatible peripheral device, control and data such as configuration information, setup information, and the like, may be passed from the computer via the keyboard API/interface to a suitably adapted non-keyboard peripheral device. In an example of communication between a non-keyboard device and functionality operating on a computer, an encapsulated e-Book with experimental functionality may be operating within a browser on a computer (e.g. a JavaScript enabled browser). The e-Book may comprise functionality that accesses the keyboard API/interface available on the computer and requests that data be sent, by the keyboard API/interface, to an adapted non-keyboard peripheral connected to the computer that has identified itself to the keyboard API/interface as a keyboard. The data sent may include configuration and/or setup commands and data that the peripheral can receive using the keyboard API/interface protocol. This data may then be interpreted differently by the non-keyboard peripheral compared to a standard keyboard. In this example, the non-keyboard peripheral device may be a temperature sensor peripheral and the command(s) sent from the e-Book may be comprise commands to sample the temperature and send the result over the keyboard API/interface. The peripheral may capture the temperature, prepare and send a sequence of data that appears to the keyboard API/interface as valid keystrokes or other data that complies with the keyboard API/interface protocol. The keyboard API/interface may forward at least a portion of the received data to the e-Book, which may interpret the received data as keystrokes or other information based on the functional protocol established for such communication. One exemplary protocol may include the e-Book receiving a sequence of keystroke data and interpreting a first portion as preamble, a second portion as data, and a third portion as post-amble.

An external device may be adapted to be compatible with an educational e-Book device communication protocol and, as such, may communicate with an electronic object operating in a web browser, such as an educational e-Book and the like, via a variety of communication pathways comprising wireless and wired pathways such as an audio API/interface communication pathway, a USB pathway, a wireless USB pathway, an extended NFC pathway, a firewire pathway, other serial communication pathway, a WIFI pathway, a WIMAX pathway, an HDMI pathway, a VGA pathway, a DVI pathway and the like. To effect this communication, the computer-type system may not require installation of additional or specific software, such as interface drivers or dedicated communication programs to facilitate communication between the educational e-Book and the external device. The e-Book may utilize built-in APIs that enable access to an interface supporting communication with external devices. In an example, external data acquisition devices may be configured and/or programmed to receive a signal over a relevant channel from the system. The relevant channel output signal may be used to communicate commands, data or other information from the educational e-Book to external data acquisition devices. These data acquisition devices may be configured to interpret the commands received over the relevant channel output signal system. Similarly, these external devices may be adapted to generate a response signal that may be sent over the relevant channel to be forwarded by the relevant channel API to the educational e-Book. The response signal may comprise information such as a response to the commands, real-time data such as current time, temperature data, power consumption, kinematics data, and other information. The e-Book may receive the response signal using the relevant channel API and further interpret the received signal using a receive protocol interpreter. An example embodiment is described later herein.

An e-Book in encapsulated HTML form may be operational by a user of a browser-enabled computing device without any means for accessing the Internet or other open networks by the computing device. This no-Internet feature of the e-Book may facilitate security of: the content associated with the e-Book; the computing device resources; other devices connected to or in communication with the computing device; and the like. In embodiments, to facilitate use of and/or deployment of the educational e-Book on a non-networked computer, the e-Book files may be stored on a non-transitory computer readable medium such as compact disc drives, storage disks, USB data stick, and the like. In embodiments, the e-Book may comprise a plurality of heterogeneous content data such as text, multimedia data (i.e., audio or video data), and the like, that may be configured to be stored in a file system of the computer readable medium. By merely directing the computing device's browser to the stored educational e-Book files, users, such as a teacher or student, may not require Internet connectivity to access and fully interact with the content of the e-Book. In an educational e-Book deployment example, an educational institute, such as a school, may facilitate a student's access to the e-Book content by distributing, to the student, a portable data storage medium such as a CD-ROM, an SD card, a USB stick, and the like, on which is stored the e-Book.

In embodiments, it is contemplated that users may browse, view, and buy the CD-ROM, to in effect purchase the e-Book, similar to any other CD-ROM distributed purchase. In embodiments, an educational institution may provide the fully functional e-Book via an intranet system. Such an implementation does not require specialized server configurations or any other custom interventions.

Described elsewhere herein, an encapsulated HTML or the equivalent e-Book that may be operable within a web browser of a computing device with or without any network connections, may also communicate with external devices, such as data acquisition devices. Although educational embodiments of an e-Book are generally described elsewhere herein, the methods and system of a networked or non-networked e-Book communicating with external devices may be equally applied to non-educational environments. In industry there may be many applications (e.g. quality control, production control, environmental testing, and many others) that may be suitable for such an e-Book with external device communication. In addition, both educational and non-educational applications may benefit from integrating an e-Book with an E-Reporting capability when communicating with external devices (e.g. data acquisition devices). By integrating an e-Book with E-Reporting capability and data collection via built-in interface APIs, standalone systems may be created that may facilitate sophisticated user interactions and reporting without requiring complex programs, application installations, licenses, maintenance, and the like. By merely creating an encapsulated HTML website on a storage medium (e.g. a USB memory stick), any computer device with an HTML compliant web browser may be enabled with all of the functionality of the e-Book, E-Report and interface capabilities without any need for software installation, configuration, or network connection.

In embodiments data acquisition devices for commercial applications may be delivered with a USB memory stick or other data storage medium comprising a file system in which an integrated e-Book/E-Report encapsulated website may be stored. In embodiments loading the contents of the USB memory stick or other non-transitory data storage medium into a computing device may enable full operation of the e-Book functionality and communication with the associated data acquisition devices, to provide a specific commercial or industrial purpose or function. In embodiments loading the contents of the USB memory stick or other data storage medium into a computing device may comprise means such as inserting the medium into an appropriate connector, inserting a CD-ROM into a disk drive, and the like.

Figure 6:
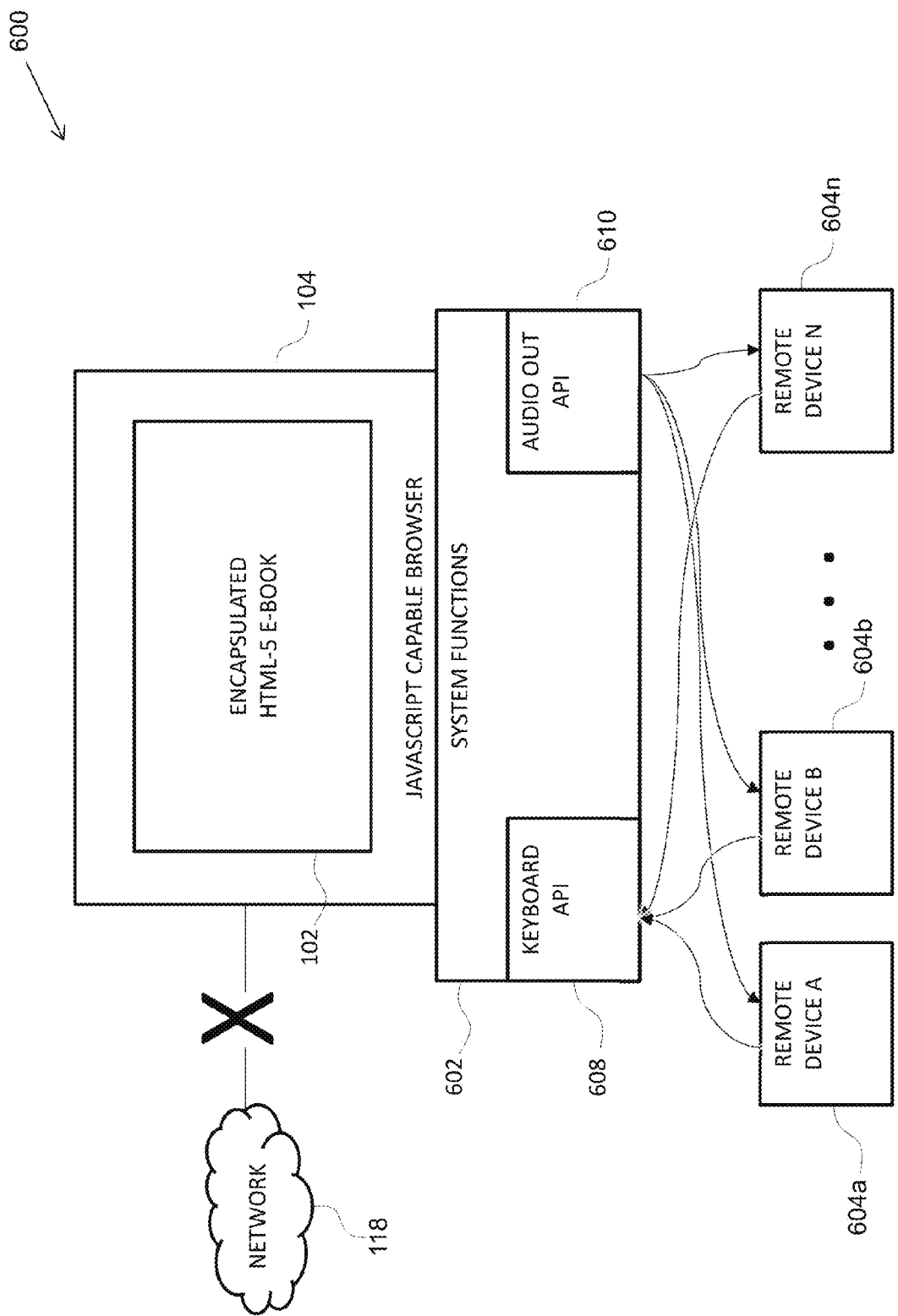
FIG. 6 depicts an e-Book that can talk directly to external hardware devices.

FIG. 6 illustrates an embodiment of a system 600 comprising an encapsulated e-Book 102 configured to communicate directly with a plurality of remote devices to facilitate interactive experiments using the encapsulated e-Book 102 without installation of any additional software, database, application and the like onto the computing device associated with the e-Book 102. The computing device associated with the encapsulated e-Book 102 may comprise one or more system functions and/or APIs 602 which may facilitate the communication of the encapsulated e-Book 102 with a plurality of remote devices such as remote device 604a, remote device 604b through remote device 604n (collectively referred herein to as the remote device 604).

In embodiments, the encapsulated e-Book 102 may be configured to utilize one or more system functions 602 such as a keyboard API 608, an audio output API 610, and the like to communicate with the plurality of the remote devices 604. The encapsulated e-Book 102 of the present disclosure may operate within a browser 104 of a computer, such as a laptop, desktop, handheld device, tablet, and the like, where the computer may not allow the encapsulated e-Book 102 to access the external network 118, thus preventing access to the Internet or other networked resources. The computer comprising the encapsulated e-Book 102 may be configured, either physically or logically, so that no network communication is assessable to programs operating on the computer. This may effectively isolate the computer comprising the encapsulated e-Book 102 from other computers in vicinity of the computer comprising the encapsulated e-Book 102 such as when the computer comprising the encapsulated e-Book 102 is present in a classroom, laboratory, training or testing facility, and the like.

In embodiments, the encapsulated e-Book 102 and its associated computer may be located in proximity to a plurality of remote devices 604, such as digital to analog converter, sensors, "smart" devices, and the like so that the computer comprising the encapsulated e-Book 102 and the plurality of remote devices 604 may communicate via Bluetooth or similar short range wireless connection. In embodiments, the computer comprising the encapsulated e-Book 102 may be configured such that a Bluetooth connection to an external network may not be supported. A Bluetooth interface may be used to communicate between a computer and standard I/O peripherals such as keyboards, pointing user interface devices, audio devices, and the like. In embodiments an encapsulated e-Book 102 may leverage standard Bluetooth interfaces (e.g. a Bluetooth keyboard interface) that may be available via conventional computer system functionality (e.g. the keyboard API 608) to establish communication between the computer and a remote device 604 that is suitable for laboratory or other educational experimentation.

In embodiments, a remote device 604, such as an analog to digital converter (ADC), may be configured with a Bluetooth interface and may be capable of operating a protocol such that the remote device appears to be a standard I/O peripheral device (e.g. the ADC look as if it is a keyboard). In this way, when a remote device 604 communicates with an encapsulated e-Book 102 operating in a browser 104 on a computer, the communication may occur via the computer's Bluetooth keyboard API 608.

In embodiments, two-way communication may occur between a computer and a remote device 604 via the keyboard API 608 if the keyboard API 608 supports sending commands over a Bluetooth keyboard interface. In embodiments, a different standard interface, such as an audio output capability (typically used for playing music or other audio) may be leveraged so that the computer may send an audio-like signal over the Bluetooth interface to a remote device 604. In embodiments the one-way audio output channel may be combined with the keyboard input interface to facilitate bidirectional communication between computers, or more particularly, between an encapsulated e-Book 102 and a remote device 604.

In embodiments, an encapsulated HTML or equivalent educational e-Book 102 may communicate directly with remote devices 604 to facilitate integrating laboratory experiments, exercises, and/or assignments with the encapsulated e-Book 102 by receiving keyboard interface protocol compatible data from the remote device 604 and sending audio to the remote device 604 via standard interface functionality. In this way, bi-directional communication may be accomplished without requiring any software installation and without access to any networking capability such as the external network 118, In embodiments, the encapsulated HTML-5 or similar browser compatible file may include Java code, such as JavaScripts, that may cause the audio output capability of the computer to send audio (e.g. over a Bluetooth audio output capability of the computer) that may be interpreted by the receiving external peripheral device 604 as commands for performing one or more functions, such as reset, sample data, send data, and a wide range of other functions described elsewhere and herein. The external peripheral device 604, which may be a sensor device, may be adapted to perform a minimum of the following steps: (1) receive the audio; (2) interpret the audio to determine commands; (3) and execute the commands. Upon executing a command, the remote peripheral device 604 may send keyboard data (e.g. keystroke data) that may be received by the encapsulated e-Book 102 operating in the browser 104 (e.g. by a peripheral data receiving java or JavaScript function of the e-Book). The encapsulated e-Book 102 may capture and interpret the keyboard data according to an e-Book receive protocol interpreter resulting in a data sample taken by the remote peripheral device 604 being extracted from the keystroke data.

In embodiments, end-to-end communication between a remote peripheral device 604 and an encapsulated e-Book 102 may comprise more than emulating keyboard functionality. In embodiments some portion of JavaScript (e.g. running in the encapsulated e-Book 102) on the computer that interfaces to the keyboard API 608 implements a functional-type protocol that facilitates broader capabilities than simply keyboard data entry and receipt. The functional-type protocol may comprise one or more of: a send protocol translator for translating commands and data to be sent from the electronic book to the remote device; a receive protocol interpreter for extracting commands and data from the key strokes received from the remote device; and the like. In embodiments, some portion of code running on a remote device 604 is compatible with a keyboard, while some other portion implements a functional-type protocol that facilitates broader capabilities than simply keyboard data entry and receipt.

In embodiments, the remote device 604 may be a non-keyboard device that is suitable for use in an educational environment, such as a high school physics class or the like. The remote device 604 may communicate with an educational e-Book or other assessment or laboratory functionality operating on a computer via the keyboard API/interface 608 communication pathway when the non-keyboard remote device 604 is adapted to be compatible with any protocol or other requirements of the keyboard API/interface 608. Although emulating a keyboard is one option for sending data from the remote device 604 over the keyboard API/interface 608, such an embodiment may be limited to the non-keyboard remote device 604 appearing to an e-Book 102 or other computer-based functionality as a keyboard. In embodiments, these potential limitations may be overcome by adapting the non-keyboard remote device 604 to employ a function-specific protocol while communicating via the keyboard API/interface 608. The e-Book may also employ a companion function supporting the function-specific protocol while communicating via the keyboard API/interface 608. In this way, data that may appear as a sequence of keystrokes on a keyboard to the keyboard API/interface 608 may be useable by the companion function on a computer to implement complex control and data protocols.

In embodiments, control and data (e.g. configuration and/or setup information) may be passed from the computer via the keyboard API/interface 608 to a suitably adapted non-keyboard remote device 604. In an illustrative and non-limiting example an encapsulated e-Book 102 with experiment functionality may be operating within a browser 104 on a computer (e.g. a JavaScript enabled browser). The e-Book 102 may comprise functionality that accesses the keyboard API/interface 608 available on the computer. The functionality may request that data be sent by the keyboard API/interface 608 to an adapted non-keyboard remote device 604 that has identified itself to the computer as a keyboard. The computer may then send data such as configuration and/or setup commands and data that the remote device 604 may receive using the keyboard API/interface protocol. The remote device 604 may then interpret the data differently than would a keyboard. In this example, the remote device 604 may be a temperature sensor peripheral and the command(s) sent from the e-Book 102 might be to sample the temperature and send the result to the e-Book 102 over the keyboard API/interface 608. The remote device 604 may capture the temperature, prepare and send a sequence of data that appears to the keyboard API/interface 608 as valid keystrokes (or other data that complies with the keyboard API/interface protocol). The keyboard API/interface 608 may forward at least a portion of the received data to the e-Book 102, which may interpret the received data based on the functional protocol established for such communication. One exemplary protocol may include the e-Book receiving a sequence of keystroke data and interpreting a first portion as preamble, a second portion as temperature data, and a third portion as post-amble.

In embodiments, a remote device 604, adapted to be compatible with an educational e-Book device communication protocol, may communicate with an educational e-Book 102 or the like via one or more of a plurality of wired and wireless communication pathways such as audio API/interface communication pathway (e.g. Bluetooth), a USB pathway, a wireless USB pathway, an extended NFC pathway, a firewire pathway, other serial communication pathway, a WIFI pathway, a WIMAX pathway, an HDMI pathway, a VGA pathway, a DVI pathway, and the like. In embodiments, this communication may be effected without the installation of additional or specific software on the computer, such as interface drivers or dedicated communication programs, to facilitate communication between the educational e-Book 102 and the remote device 604. The encapsulated e-Book 102 may utilize built-in APIs such as the keyboard API 608, the audio out API 610, and the like for at least one of the communication pathways described above to enable communication with such a remote device 604. In an example, a data acquisition remote device 604 may be configured and/or programmed to receive a signal output over a relevant channel from the e-Book 102. The relevant channel output signal may be used by the e-Book 102 to communicate commands, data or other information from the educational e-Book 102 to a remote data acquisition device 604. The data acquisition remote device 604 may be configured to interpret the commands received over the relevant channel output signal system. Similarly, the remote device 604 may be adapted to generate a response signal that may be sent over a relevant channel to be forwarded by the relevant channel API to the educational e-Book. This response signal may include information such as a response to the commands, real-time data such as, current time, temperature data, power consumption, and other information. The e-Book merely receives the response using the relevant channel API and further interprets the received signal. In embodiments the relevant channels may be an audio channels such as audio in and out for the computer or the remote device 604.

In embodiments, the encapsulated e-Book 102 may be operated by a user of a browser-enabled computing device without accessing the Internet or other open networks such as the network 118. The ability of the e-Book 102 to operate without an internet connection may facilitate compliance with educational institution security requirements such as those relating to the content associated with the e-Book 102, the computing device resources, and other devices connected to or in communication with the computing device. In embodiments, the computer may be totally disconnected from the network. In embodiments the e-Book 102 may be encapsulated such that it operates within the confines built into the e-Book 102 such as those that may prevent access to networks, such as the Internet, by the e-Book 102 even if networks may be accessible to the computer on which the e-Book operates. In embodiments encapsulated e-Book 102 may access network resources to perform extended functions described herein, such as sending and receiving assignments to student's home computers, and the like. In embodiments use and/or deployment of the educational e-Book 102 on a non-networked computer may be facilitated by storing the e-Book files on non-transitory computer readable medium such as compact disc drives, storage disks, USB data stick, and the like. In embodiments, the e-Book 102 may comprise one or more of textual and multimedia data (i.e., audio or video data) content that may be configured to be stored in a file system of the computer readable medium. Thus, in this embodiment, a user such as a teacher or student may direct the computing device's browser to the stored educational e-Book files to access and fully interact with the content of the e-Book 102 without requiring Internet connectivity. In an illustrative and non-limiting educational e-Book deployment example, an educational institute, such as a school, may distribute a CD-ROM, or other storage medium, containing the e-Book to students to facilitate their access to the content of the e-Book 102. In embodiments, users may browse, view and buy the CD-ROM to purchase the e-Book similar to any other CD-ROM distributed purchase. Alternatively, an educational institute intranet may be used to deploy the files necessary to operate the e-Book 102 within a browser 104.

Although educational embodiments of an e-Book 102 are generally described elsewhere herein, the methods and system of an e-Book 102 communicating with one or more remote devices 604 may be equally applicable in non-educational environments such as industry, for applications such as quality control, production control, environmental monitoring, environmental testing, and the like. In embodiments, both educational and non-educational applications may benefit from integrating the e-Book with an E-Reporting capability when communicating with the remote devices 604 (e.g. data acquisition devices). By integrating an e-Book with E-Reporting capabilities and data collection via built-in interface APIs, standalone systems may be created that may facilitate sophisticated user interactions and reporting without additional requirements such as complex programs or applications being installed on the computer, additional licenses, maintenance, and the like. In embodiments any computer device with an HTML compliant web browser may be enabled with all of the functionality of an e-Book, E-Report and interface capabilities by an encapsulated HTML website on a storage medium (e.g. a USB memory stick) and without the need for software installation, configuration, or network connection. In embodiments, an e-Book may be configured to be integrated with data acquisition remote devices 604 using APIs that may be operated from within a browser without using browser support APIs. In an illustrative and non-limiting example, a data acquisition remote device 604 may comprise one or more sensors that may be configured to sense one or more parameters, representative of physical phenomena, such as temperature, velocity, acceleration, and other parameters. The e-Book may be configured to interface with the sensors of the remote device using one or more of the APIs supported by the browser (e.g., Internet explorer) used to access the content of the e-Book. In embodiments, access to the Internet may not be needed for the e-Book to access a remote device using the APIs supported by the browser.

In embodiments, data acquisition remote devices 604 for commercial applications may be offered with a USB memory stick or other storage medium, comprising a file system with an integrated e-Book/E-Report encapsulated website. Full operation of the e-Book and interaction with the data acquisition remote device 604 to provide a special purpose commercial or industrial solution may be achieved by accessing the memory stick or other storage medium with the computing device of the e-Book, such as a laptop computer.

In embodiments, similar to those described for accessing an e-Book/E-Report capability over an educational institution intranet, commercial or industrial intranets may be used to configure encapsulated e-Book files on an intranet connected computer to provide special purpose commercial or industrial solutions, and the like.

In embodiments, a data acquisition device may comprise a microcontroller that may provide one-way communication to an e-Book over a communication channel facilitated by a browser enabled API on the computing device such that the data acquisition remote device may report data that is acquired according to a predetermined data structure, such as a table, report, or the like. In embodiments, the browser enabled API may make a standardized connection (e.g. a keyboard input connection) between the data acquisition remote device and the browser operating on the computing device of the e-Book. The microcontroller of the data acquisition remote device may emulate a device that is compatible with the standard API. To accomplish updating of a predetermined data structure, the microcontroller of the data acquisition remote device may be configured to execute a program that provides all data required to properly deposit acquired data into the data structure. In an illustrative and non-limiting example, if the data structure is a formatted table of data entries, the microcontroller program may frame each acquired data value with table cell positioning commands so that the data values will be placed in the appropriate table cells by the e-Book. In this way, a table row that holds cells for an acquired data value and a time of the acquisition may be automatically populated by the data acquisition device by providing cell positioning, acquisition data, and acquisition time in an appropriate order.

In an example, the microcontroller-enabled device may use a keyboard API to communicate the acquired data with a computing device for deposit into the predetermined data-structure. For example, a temperature-measuring device may comprise a microcontroller programmed to measure a temperature and to rely on the keyboard API to transfer the details of the temperature measurement to the report or e-Book.

Figure 7:
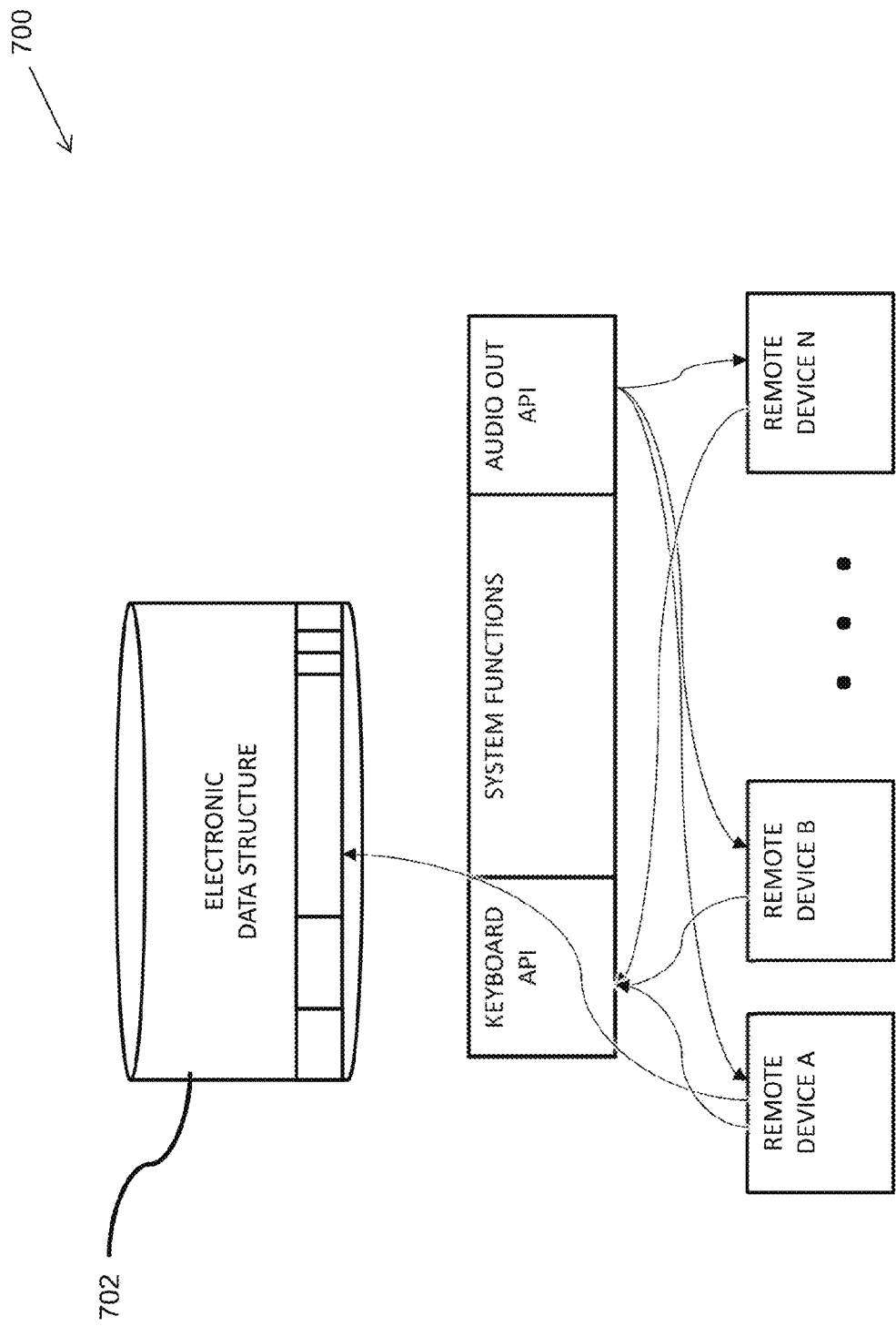
FIG. 7 depicts external hardware devices that connect through a web browser-enabled API to a format-specific report.

Referring to FIG. 7, a partial illustration of an embodiment of a system 700 that may utilize an electronic data structure 702 to store data that may be reported by a plurality of remote devices is shown. In embodiments, a remote device may be a data acquisition device that may include a micro-controller to enable one way communication, over a communication channel facilitated by a browser enabled API of a computing device, to report acquired data in a predetermined data structure, such as a table, report, or the like. In embodiments the micro-controller of the remote device may collect the data obtained from the one or more sensors of the remote device and then may transmit the collected data in a format specific to the requirements of the electronic data structure. Because the browser enabled API merely makes a standardized connection (e.g. a keyboard input connection) between the data acquisition device and a browser operating on the computing device, the microcontroller may emulate a device that is compatible with the API. To accomplish updating of a predetermined data structure, the microcontroller may be configured to execute a program that provides all data required to properly deposit acquired data into the data structure. In an illustrative and non-limiting example, if the data structure is a formatted table of data entries, the microcontroller program of the remote device may transmit each acquired data value with table cell positioning commands so that the data values will be placed in the appropriate cells of the table. In this way, a table row that holds cells comprising an acquired data value and time of acquisition may be automatically populated by the data acquisition device providing cell positioning, acquisition data, and acquisition time in an appropriate order. In an illustrative example, the microcontroller-enabled remote device may use a keyboard API to transmit the acquired data in the predetermined data-structure. In an example, a temperature-measuring device may comprise a microcontroller programmed to measure a temperature and to rely via a keyboard API details of the temperature measurement to a report or e-Book in a predetermined data-structure.

Figure 8:
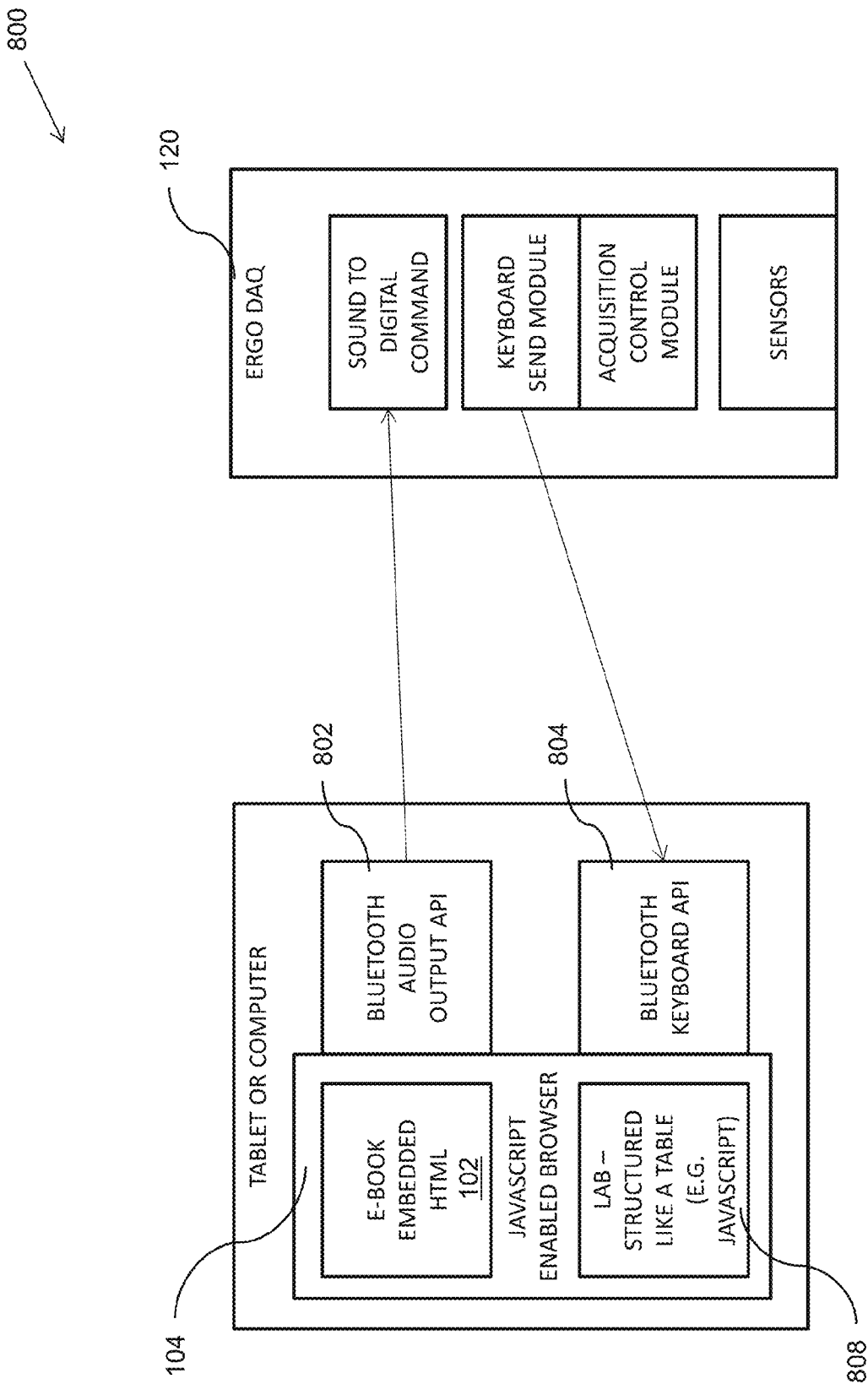
FIG. 8 depicts an ERGODAQ data acquisition device interfacing with an e-Book of a web browser via standard APIs.

Referring to FIG. 8, an illustrative example of a high level system diagram 800 is shown comprising: an electronic book 102 in a web browser 104 capable of accessing system level functions Bluetooth audio output API 802 and Bluetooth keyboard API 804 which may facilitate communication with and a remote device 120 which may provide data for a lab structured as a table 808. FIG. 8 illustrates an embodiment comprising a data acquisition device that may be configured to communicate with a computer or a tablet preloaded with a browser such that the data acquired by the data acquisition device may be stored in a structured form such as a table, database or the like. In embodiments, the data acquisition device may communicate with the encapsulated e-Book over a Bluetooth communication channel wherein the data acquisition device may represent itself as a keyboard device to the computer. Further, the encapsulated e-Book may interpret the data received from the data acquisition device (i.e., a non-keyboard device) using the Bluetooth keyboard API. In an illustrative and non-limiting example, the data acquisition device may be configured to comprise an acquisition control module that may control the functioning of the one or more sensors to retrieve information associated with one or more physical objects. The acquisition control module parses the data received from the sensors, formats the data and transfers the data to a keyboard send module, which transforms the formatted data into a format compatible with the keyboard API data format. As the data from the data acquisition device is communicated to the computer over a Bluetooth communication channel using a Bluetooth keyboard API, the computer Bluetooth keyboard API interprets the data coming from the data acquisition device as keyboard data. In embodiments, a JavaScript enabled browser may comprise a JavaScript that transforms the apparent keyboard data received from the data acquisition device into a table including rows and columns so as to provide structured interactive sensor data to an e-Book user. In an illustrative and non-limiting example, when a user accesses the e-Book to perform velocity measurement related experiments in a lab section of the e-Book a data acquisition device may be instructed to capture velocity measurements of a moving mass over a specified duration of time. The measured velocity data may be stored in the form of a table in which rows may comprise velocity measurement values and columns may identity the time period for different types of masses. The JavaScript enabled browser may access these tables so as to display the results to the user. In embodiments, the encapsulated e-Book may utilize the built in Bluetooth audio out API of the computer system to provide instructions to the data acquisition device where the instructions may comprise commands for the acquisition control module such as collect data from sensors, and the like so that the sensed data may be displayed to the users. In embodiments, a data acquisition device may be configured to comprise a sound to digital command module that may analyze the audio signal as received from the encapsulated e-Book and covert the received audio signal into commands for the acquisition control module.

In embodiments, an e-Book may be adapted to be deployed as an encapsulated HTML set of pages on a computing device and accessed as an electronic object using a browser such as INTERNET EXPLORER, SAFARI, FIREFOX, GOOGLE CHROME, and similar browsers. In embodiments, deploying an e-Book, such as an educational e-Book, as encapsulated HTML, may facilitate users, such as teachers, students, and the like, accessing the educational e-Book without additional client installed software. An encapsulated e-Book may be accessed directly by a user using the web browsers conventionally available as part of a base set of computing device software. In embodiments, the web browsers may facilitate the users in performing functions such as: accessing the content of the e-Book; searching within the e-Book; annotating one or more specific portions of the e-Book; performing real time experiments using data acquisition devices adapted to communicate with the educational e-Book; and other related functions. In an illustrative and non-limiting example of a standalone implementation of an educational system comprising an encapsulated HTML educational e-Book, a non-networked computing device, comprising a set of conventional file system files wherein one or more of the files comprises an educational e-Book, may be deployed in a school setting for use by a student as part of an educational curriculum. A student may access an e-Book for subjects such as physics, chemistry, biology and the like which may be configured as an encapsulated e-Book on the computing devices. A student may access these e-Book subjects using a browser without any networked interaction. In embodiments, an encapsulated e-Book may provide a rich set of features and network-like capabilities to users via a web browser operating the encapsulated e-Book without the computing device of the e-Book having access to the Internet, intranet, or other form of computer-to-computer network. In embodiments, the e-Book, being encapsulated as web browser compatible HTML and stored in its entirety on the computing device, may be accessed and fully operated by users without any client based application software.

In embodiments, an educational e-Book may be made searchable without network access and without requiring client level software beyond a conventional web browser. In embodiment, a user may search any portion of the e-book, including the entirely thereof. In embodiment, a user may be provided access, via the web browser, to a search table associated with an educational e-Book to facilitate searching for one or more keywords. The search table may be accessible through conventional web browser extensions such as XML, JAVASCRIPT, and the like. in embodiments, the search table may comprise the keywords for which the educational eBook may be searched. In embodiment, the educational e-Book may be configured to present relevant results in a web browser window or tab in response to a user entering the one or more keywords into a search keyword entry box and/or selecting a keyword from the search table. in embodiments, the e-Book search capability may be configured to execute one or more search algorithms to find and present keywords in the search table the are similar to an entered keyword. In embodiments the search table may be configured so that a user may select one of a presented set of similar keywords to those entered such that the web browser presents relevant results for the keywords being entered by the user. In an illustrative and non-limiting example, the e-Book may be searched. using the browser wherein the user may begin to enter a search keyword. In response, the browser may list similar or related keyword terms based on the letters typed As more letters in the search keyword are typed the list of presented words may alter to reflect the additional information. This presentation of similar key words may facilitate mitigation of missed items due to keyword entry spelling errors. The user may select which term best matches what the user may he looking for. In an example, the user may select an available keyword from the search result keyword term list which will result in. common misspellings being mitigated.

In embodiments, the present methods and systems may pre-search the entire e-Book and store substantially every possible search term in a table. In embodiments, search capability and presentation of results may reside entirely in standard browser capabilities such as JavaScript and may not require any external communication channel to a server or other networked computer. In a non-limiting example, JavaScript may be used to pre-search the e-Book, file the search results in a format that may be accessed by the web browser, and implement a search function that may allow these terms to be searched without ever using any server-side or client-based application software. Thus, in this example, the user may not have to install either server side or client-installed software. In an example, the encapsulated e-Book may be made web browser compatible by using HTML 5 and other encapsulation-capable languages.

In embodiments, a JavaScript running in the browser may engage the predefined search table. Once a search is performed, the search results may be presented to the user and the search results may comprise only links to portions (e.g. pages) of the e-Book. In embodiments, a link identified by the search may direct the web browser to an entry in the e-Book environment, thereby avoiding any connection to external, potentially pernicious content while searching the e-Book. In embodiments, an e-Book may be built with features to allow the user to search for the relevant keywords without requiring installation of the additional software (such as client-side). In embodiments, the e-Book search capability may comprise keyword-based searching of a plurality of e-Book content such as animations, video, audio, interactive content, text, or any other data. In embodiments, a computing system configured with a search capable e-Book may generate and display search results without requiring any external network connection (e.g. intranet or Internet).

Open e-Book technology leverages access to a network, such as the Internet to provide a content-rich interactive environment. Aspects such as in-line links within an open e-Book may direct a web browser to an external network resource to retrieve more content. Likewise, an open e-Book may be deployed incrementally so that only a portion of the entire e-Book is resident on a computing device. While an incremental approach may facilitate flexible content updating, it also introduces various risks and may result in differences in content when accessing the same reference over time. For many educational, commercial, and industrial environments open e-Book technology presents challenges such as maintaining revision control, ensuring that all students are working with the content that has been approved for the curriculum being taught, and the like. Therefore, serving an e-Book as an encapsulated HTML website that comprises comparable interactivity and richness of content may provide great benefits to environments that cannot readily accommodate open e-Book technology.

The methods and systems described herein for preparing, deploying, using, and updating an encapsulated e-Book which may be accessed through a browser, in the same manner as a website, may deliver most of the benefits of open e-Book technology without any of the risks. In embodiments, use of an encapsulated e-Book may facilitate revision control through control of distribution, thereby facilitating efforts to ensure that different users of an e-Book do not have different versions of the e-Book. In an illustrative and non-limiting example, an e-Book or E-Report which may be used to support commercial quality testing and control processes in a plurality of locations may be updated through controlled processes to facilitate quality measurement techniques remaining consistent across facilities as revisions to the e-Book are made. This type of control may be, challenging with open e-Book technology.

In embodiments, serving an e-Book as an encapsulated HTML website may facilitate any computing device with an up-to-date web browser in accessing the full capabilities and rich interactive content of the e-Book without needing any updating of third-party software or downloading of applications. The encapsulated HTML website of the served e-Book may provide the user with full access to the content and interactivity. In embodiments, the simplicity of using an encapsulated website as the basis for an e-Book system may make device configuration a non-issue for nearly any type of e-Book (e.g. any educational subject, any testing environment, and the like).

In embodiments, an encapsulated e-Book may be configured to comprise an expiration feature that may prevent partial or full access to the e-Book upon expiration. Expiration functionality of an encapsulated e-Book may benefit educational institutions that provide access to educational material while a student's enrollment is in good standing. It may also help reduce licensing costs associated with accessing the e-Book content by allowing a student to license the e-Book for a single semester while the student is taking a course. By combining time-based expiration capabilities with encapsulation, educational institutions may, for example, ensure that all students are accessing a preferred revision of an e-Book without requiring the students or the educational institution to have access to the Internet and all of the risks associated with such access. In addition, encapsulated HTML e-Books may facilitate managing digital rights and costs associated therewith.

In embodiments, an encapsulated e-Book may comprise a search feature to search content associated with the encapsulated e-Book. In embodiments, a search content mirror file comprising tags may be created for the encapsulated e-Book. The tags may comprise one or more searchable keywords. In an illustrative and non-limiting example, a user may search the keywords in the mirror file and receive corresponding links back into relevant sections of the encapsulated e-Book. In embodiments, the mirror file may be a file that only contains tagged text entries corresponding to substantively every item in the encapsulated e-Book. This may result in a very small mirror file as compared to the encapsulated e-Book. In an illustrative example, an encapsulated e-Book may require many gigabytes of storage, whereas the associated mirror file may only require tens or hundreds of kilobytes.

Figure 9:
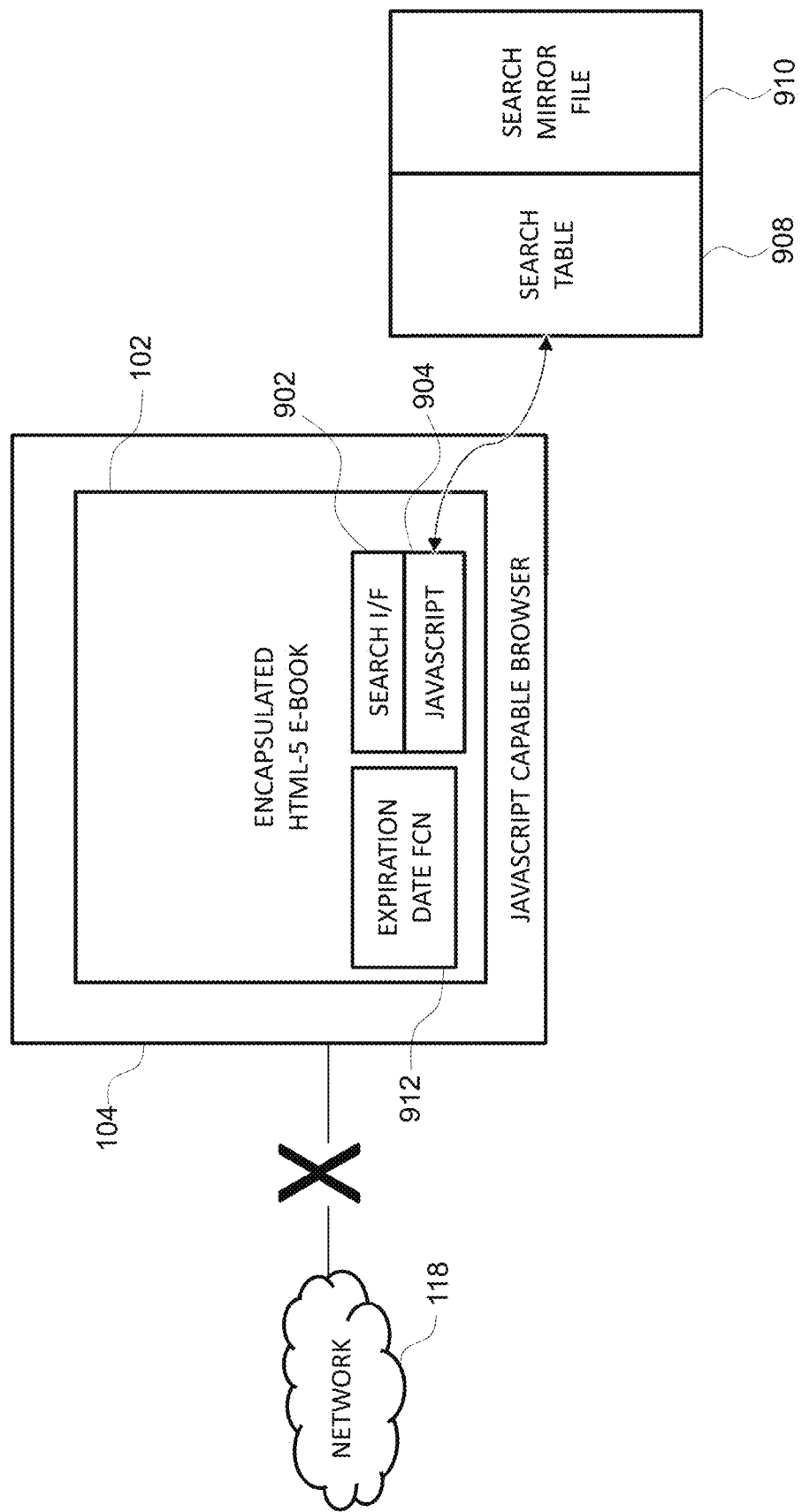
FIG. 9 depicts a network-free search enabled e-Book.

FIG. 9 illustrates an embodiment of the encapsulated e-Book 102 that may comprise a plurality of features to enhance the experience of the users while accessing the content of the encapsulated e-Book 102. As shown, the encapsulated e-Book 102 may be adapted to be deployed as an encapsulated HTML set of pages on a computing device and accessed using a browser such as an INTERNET EXPLORER, SAFARI, FIREFOX, GOOGLE CHROME, and similar browsers. Due at least in part to being deployed as encapsulated HTML, an e-Book, such as an educational e-Book may be deployed so that users, such as a teacher, students, and other users do not require client installed software to access the educational e-Book. In embodiments, a search engine may be embedded in an encapsulated e-Book and/or emulated through the use of the mirror file and search capabilities built into an encapsulated e-Book. The result may be a highly capable search engine for e-Book related content that does not depend on Internet-based search functionality or results. This may provide great benefits to a user of an encapsulated e-Book on a device that is restricted from accessing the Internet.

In embodiments, an encapsulated e-Book 102 may comprise a search function such as search I/F 902 such that the users may perform searches for one or more keywords to intelligently access relevant information within the encapsulated e-Book 102. In embodiments, an encapsulated e-Book 102, such as an educational e-Book, may be searchable without network access and without requiring client level software beyond a conventional web browser. In an illustrative and non-limiting example, a user, such as a student, may search any particular portion of the e-Book, including the entirety thereof.

In embodiments, an encapsulated Book may be searched, by users, for one or more keywords and the users allowed to access a search table 908 associated with the educational e-Book via the web browser. The search table 908 may be accessible through conventional web browser extensions such as XML, JAVASCRIPT, and the like. In embodiments, a search table 908 may be configured to include the keywords for which the educational e-Book may be searched. The educational e-Book may be configured to present relevant results in a web browser window or tab in response to the user entering the one or more keywords into a search keyword entry box, selecting a keyword from the search table 908, or the like. The e-Book search capability may be configured to execute one or more search algorithms to find and present keywords in the search table 908 that are similar to the entered keyword. The search table 908 may be configured so that a user may select one of the presented similar keywords resulting in the web browser 104 presenting relevant results for the keywords being entered by the user, In embodiments, the browser 104 may list out similar or related keywords as soon as a user enters the first letter of a search keyword. The user may select one of the presented terms or continue to enter letters in the search keyword. As the user enters additional letters in the search keyword the search results may be refined accordingly. This look-ahead feature may mitigate search misses due to keyword entry spelling errors. The user may select which term best matches what the user may be looking for. In an example, the user may select an available keyword from the search result keyword term list, which will result in common misspellings being mitigated.

In embodiments, the present methods and systems may pre-search the entire e-Book and store substantially every possible search term in a search table 908. In an example, JavaScript 904 may be used to pre-search the e-Book, file the search results in a format that may be accessed by the web browser 104, and implement a search function that may allow these terms to be searched without ever using any server-side or client-based application software. In the present methods and systems, the user may not have to install either server side or client-installed software. This search capability and presentation of results may reside entirely in the browser (using JavaScripts) and may not require any external communication channel to a server or other networked computer. Thus, the security of the computing device, on which the educational e-Book with search capability is deployed, may be increased, as the encapsulated e-Book does not access the external network 118 when allowing users to access the content. In an example, the encapsulated e-Book may be made web browser compatible by using HTML 5 and other encapsulation-capable languages.

The JavaScript 904 running in the browser 104 may engage the predefined search table 908. Once the search is performed, the search results may be presented to the user where the search results may comprise only links to portions (e.g. pages) of the e-Book. In an illustrative example, the links identified in the search results may direct the web browser only to entries in the e-Book environment, thereby avoiding possible connection to pernicious external content when searching the e-Book. The present methods and systems may not require installation of the additional software (such as client-side) as the e-Book may comprise the features to allow the user to search for the relevant keywords. In addition, the e-Book search capability may be configured to include keyword-based searching of e-Book content associated with animations, video, audio, interactive content, or any other data. A computing system configured with a search capable e-Book may generate and display search results without requiring any external network connection (e.g. intranet or Internet).

In embodiments, the encapsulated e-Book may be configured to include a search feature to search content associated with the encapsulated e-Book using a search mirror file 910. In embodiments, a search content mirror file 910, including tags, may be created for the encapsulated e-Book where the tags may comprise one or more keywords for which the users may search the encapsulated e-Book. In embodiments, the mirror file 910 may be a file that primarily contains tagged text entries that correspond to substantially every item in the encapsulated e-Book. The mirror file 910 may be searchable and very small in size relative to the size of the encapsulated e-Book 102. In an illustrative example, the encapsulated e-Book may be of size in gigabytes whereas the mirror file 910 may be of size in kilobytes. In an example, the mirror file 910 may be searched and corresponding links may link back into the HTML of the encapsulated e-Book.

In embodiments, the encapsulated e-Book 102 may comprise an expiration date function 912 that may cause an automatic expiration of an encapsulated e-Book on the computing device of the user. In embodiments, the expiration date function 912, after the expiry of the expiration duration, may disallow the user from accessing the content of the encapsulated e-Book. In an illustrative example, an encapsulated e-Book may be offered for a limited or full preview to a user interested in purchasing the encapsulated e-Book. The expiration date function 912 may be activated after the after the end of the preview period, thereby disallowing the probable consumer access to the encapsulated e-Book after the preview period.

In embodiments, an encapsulated e-Book may facilitate users in performing one or more interactive, tangible experiments in a plurality of subjects such as physics, chemistry and other subjects while the user has access to the content of the encapsulated e-Book. In an illustrative and non-limiting example, an encapsulated e-Book may comprise interactive science experiments such as providing a user with access to external data acquisition devices capable of measuring parameters (e.g., displacement, velocity, acceleration) related to a moving article while performing interactive experiments. Other interactive experiments may include, but are not limited to, embodying the laws of physics, chemistry, biology, engineering, and the like, using data acquisition devices. In embodiments, an encapsulated e-Book may comprise virtual experiments to facilitate understanding by the users for a particular subject associated with the encapsulated e-Book. In embodiments, real-time data obtained from data acquisition devices may be combined with virtual experiments to provide users with real observation results in addition to theoretical results. An encapsulated e-Book may assist teachers and enhance the quality of education provided to students.

Figure 10:
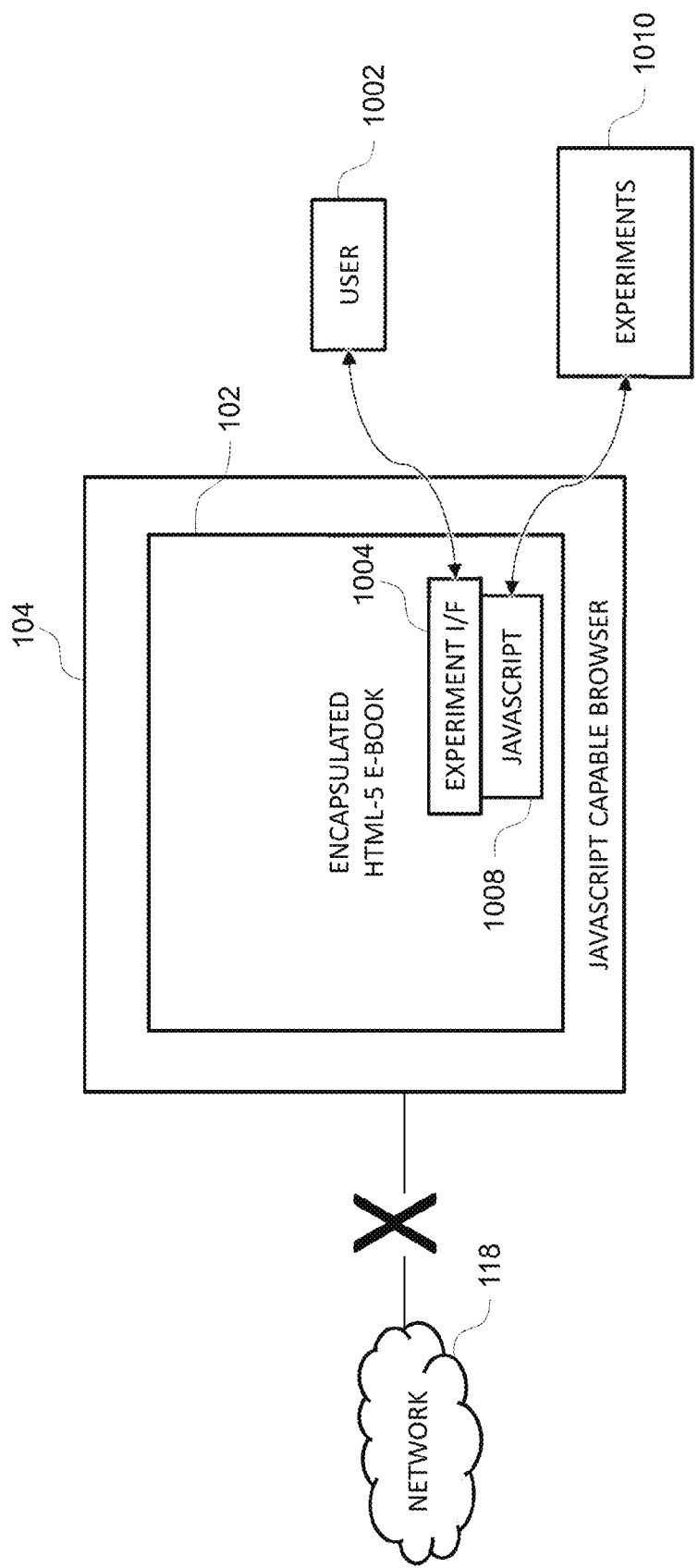
FIG. 10 depicts a network-free experiment integrated e-Book.

FIG. 10 illustrates an embodiment of the encapsulated e-Book 102 where the e-Book may be adapted to provide a user 1002 access to data acquisition devices so as to perform one or more experiments 1010 using an experiment interface 1004 of the encapsulated e-Book 102. In embodiments, an encapsulated e-Book 102 may enable a user 1002 to perform one or more interactive experiments 1010 for a plurality of subjects such as physics, chemistry, engineering and other subjects while the user may access the content of the encapsulated e-Book. The encapsulated e-Book 102 may comprise JavaScript 1008 so that a user 1002 may interact with a plurality of data acquisition devices through the JavaScript 1008 to perform one or more experiments 1010. The JavaScript 1008 may enable one or more communication channels with the data acquisition devices such that the user 1002 may not require installation of additional software or any server side access to perform the experiments 1010.

In an illustrative example, the JavaScript 1008 may enable a user to determine the parameters (e.g., displacement, velocity, acceleration, temperature, and the like) of a moving article while performing interactive experiments 1010. Interactive experiments may include but not limited to, embodying the laws of physics, chemistry, biology, electronics, and the like, using a plurality of data acquisition devices. In embodiments, data acquisition devices such as an oscillator, a friction measurement device, a temperature probe, a spring, a robot wheel and the like may include a plurality of sensors to determine the one or more parameters representative of physical phenomena associated with an experiment 1010. As discussed above, the JavaScript 1008 may provide a communication pathway for establishing a communication channel between the JavaScript enabled browser 104 and the data acquisition devices. In one illustrative and non-limiting example, JavaScript 1008 may enable the user 1002 to provide control instructions such as stop/start collection of data, direct the motion of a moving article, accelerate and/or de-accelerate, and the like to the data acquisition device while performing the experiments 1010. In response, the data acquisition device may collect and communicate data from the various sensors and JavaScript 1008 may display the received data to the user 1002. In embodiments, the JavaScript 1008 may access the standard browser APIs to interact with the data acquisition devices to perform the experiments 1010. As discussed above, the JavaScript 1008 may utilize an audio out API for providing the instructions to the data acquisition device and the data acquisition device may utilize a keyboard API to transmit the data collected from the sensors to the JavaScript over a Bluetooth communication channel.

In embodiments, an encapsulated e-Book may comprise virtual experiments to facilitate users in the understanding of a particular subject associated with the encapsulated e-Book. In embodiments, real-time data obtained from data acquisition devices may be combined with the virtual experiments to provide the user with observation results in addition to theoretical results. In embodiments, JavaScript 1008 may facilitate a user in performing the virtual experiments such as determining the acceleration of a moving article over a period of time. Virtual experiments 1010 may be performed using simple mathematical formulas without considering the practical constraints that may occur when performing the experiments in the real world. In embodiments, JavaScript 1008 may determine the actual acceleration of the moving device using one or more acceleration measurement devices. Accordingly, JavaScript 1008 may be configured to show the results of both the virtual or theoretical experiment and the real time experimental data results to the user 1002. Thus, this embodiment of the encapsulated e-Book 102 may assist teachers and enhance the quality of the education provided to the students, by enabling the students to observe both virtual (i.e., ideal) and real world data.

Figure 29:
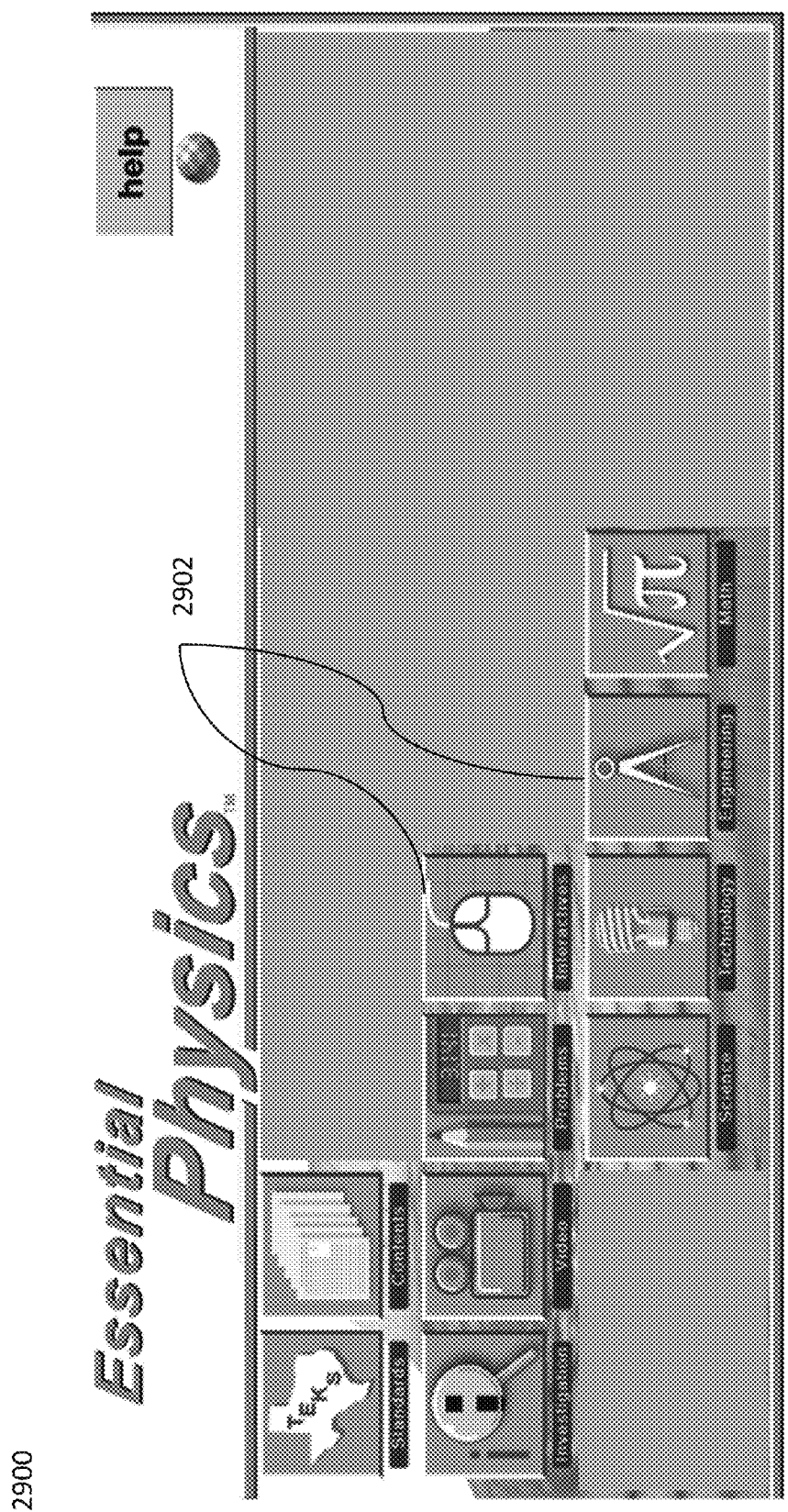
FIG. 29 depicts an example a graphical icon based interface.
Figure 30:
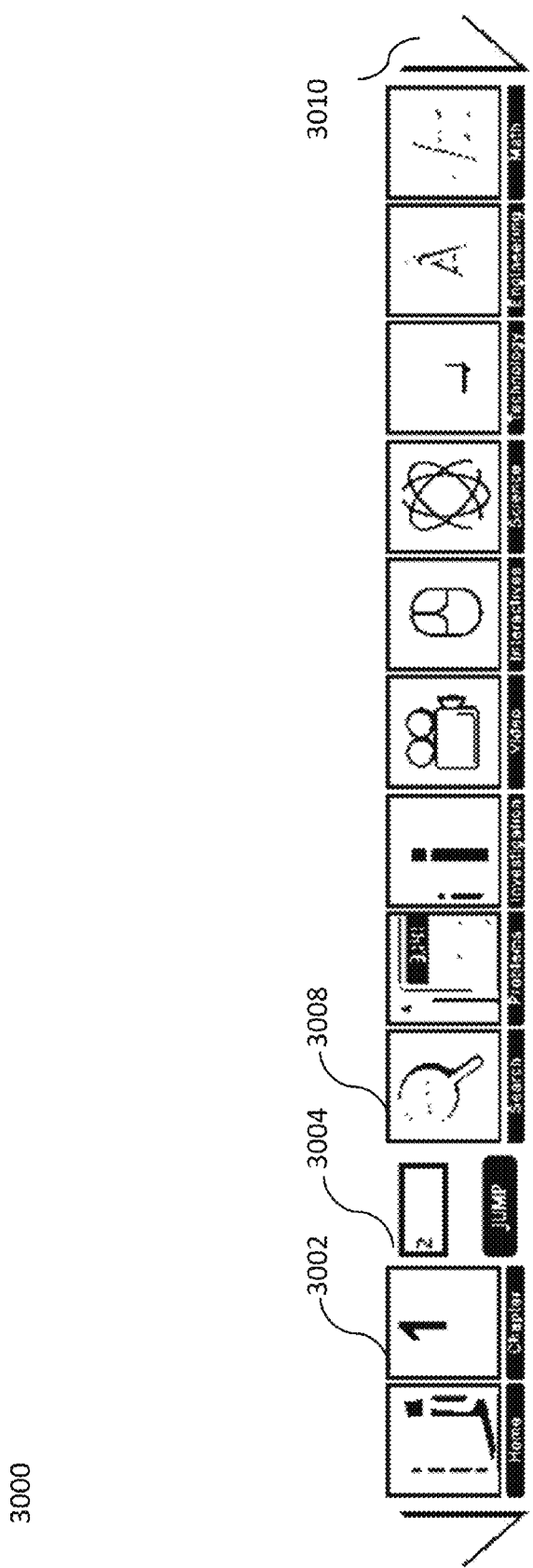
FIG. 30 depicts an example of a navigation bar.

In embodiments, the encapsulated e-Book may be navigated using graphical icons facilitating direct access to different sections of the e-Book such as standards, content, investigation, video, problem sets, "interactives" or experiments, and subject areas such as math, science, technology, engineering, and the like. Referring to FIG. 29, an example of such a graphical icon based interface 2900 is shown comprising a plurality of graphical icons 2902. In embodiments, there may be a navigation bar across the top of the e-Book. Referring to FIG. 30, an illustrative example of such a navigation bar 3000 is shown, facilitating direct access to specific chapters 3002, pages 1304, search functionality 3008, problems, investigation, video, "interactives" or experiments, science, technology, engineering, math, jumping back and forth between previous locations 1310, and the like. In embodiments, search functionality may comprise an index, a glossary, an ability to do key word searches, and the like. In embodiments, there may be linked text which, when selected, may move the browser to a different page in the e-Book.

In embodiments, an encapsulated e-Book may be built by storing one or more paragraphs associated with the encapsulated e-Book in a database, such as a linked database wherein the links may be based on a preferred flow of paragraphs for the e-Book. In embodiments, an encapsulated e-Book may be built using code, such as PHP script, MySQL, and the like, that takes the data from the database, formats it, and writes the encapsulated e-Book in HTML-5 or similar format. The code may process every chapter based on a corresponding entry in an e-Book compilation table for presentation in a web browser.

Figure 11:
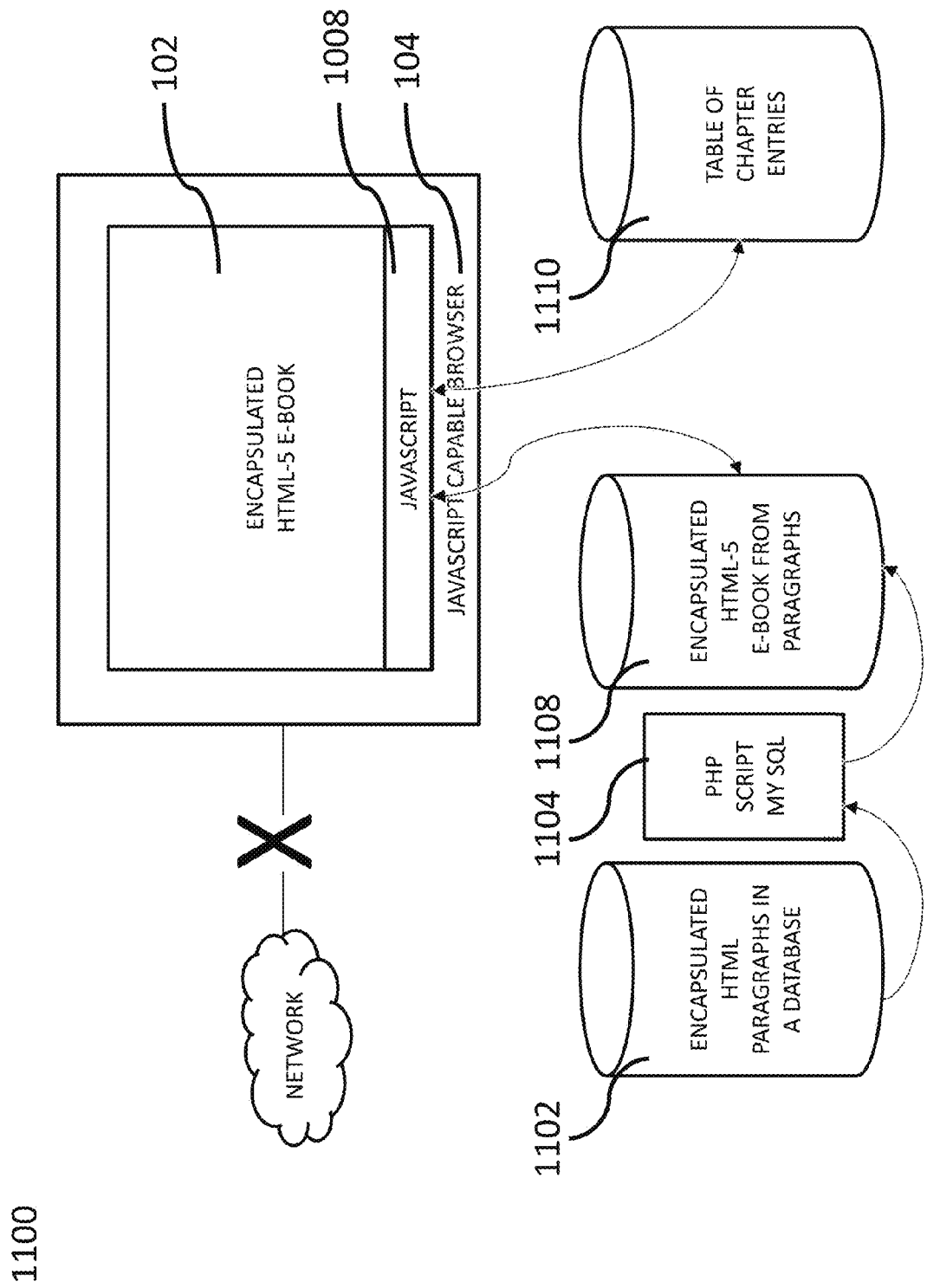
FIG. 11 depicts a database method of encapsulated e-Book preparation.

Referring to FIG. 11, a high level flow diagram 1100 of generating an e-Book 102 is shown comprising paragraphs in a database 1102, code 1104 to transform the paragraphs, an "HTML" representation of an e-Book 1108, and a table of chapter entries 1110. In embodiments, an encapsulated e-Book 102 may be build by recording one or more paragraphs associated with the encapsulated e-Book in a database 1102, such as a linked database wherein the links may be based on a preferred flow of paragraphs for the e-Book. In embodiments, there may be code 1104 that takes the data from the database 1102, formats the data 1104, and writes an "HTML" representation of an encapsulated e-Book 1108 where the "HTML" representation may comprise "HTML", HTML-5, XML, or similar format. In embodiments, the code 1104 may process every chapter based on a corresponding entry in an e-Book compilation table or table of chapter entries 1110 for presentation in a web browser.

As shown in FIG. 11, JavaScript 1008 may access one or more chapter entries associated with the encapsulated e-Book 102 using the compilation table of the e-Book 1110 that may include a hierarchy of the chapters that may be presented to the user when the user accesses the encapsulated e-Book. On identification of a particular chapter from the compilation table 1110, the JavaScript 1008 may access the corresponding paragraphs of the particular chapter using code 1104 such as PHP scripts. In an example, the paragraphs of a particular chapter may be stored in a database, such as a relational database, which may be accessed using code such as PHP scripts which may be used to interface with the database language, such as MYSQL and other similar languages, to access the paragraphs of the particular chapter. In embodiments, JavaScript 1008 may extract the related paragraphs from the database 1102 and formats the paragraph to generate the encapsulated e-Book 102 that may be presented to the user in a web browser available on the computing machine of the user.

An encapsulated e-Book may allow users to access additional information for a topic by providing an option to expand a viewed topical paragraph, presenting more detailed information to the users. In an illustrative example, the encapsulated e-Book may provide action buttons that include "more" or "less" options to display more or less information for the topic. In other words, when the user selects a more option, the encapsulated e-Book may be configured to expand a current topical paragraph or add another topical paragraph that is associated with the topic and thereby allow expansion on the topic.

Figure 12:
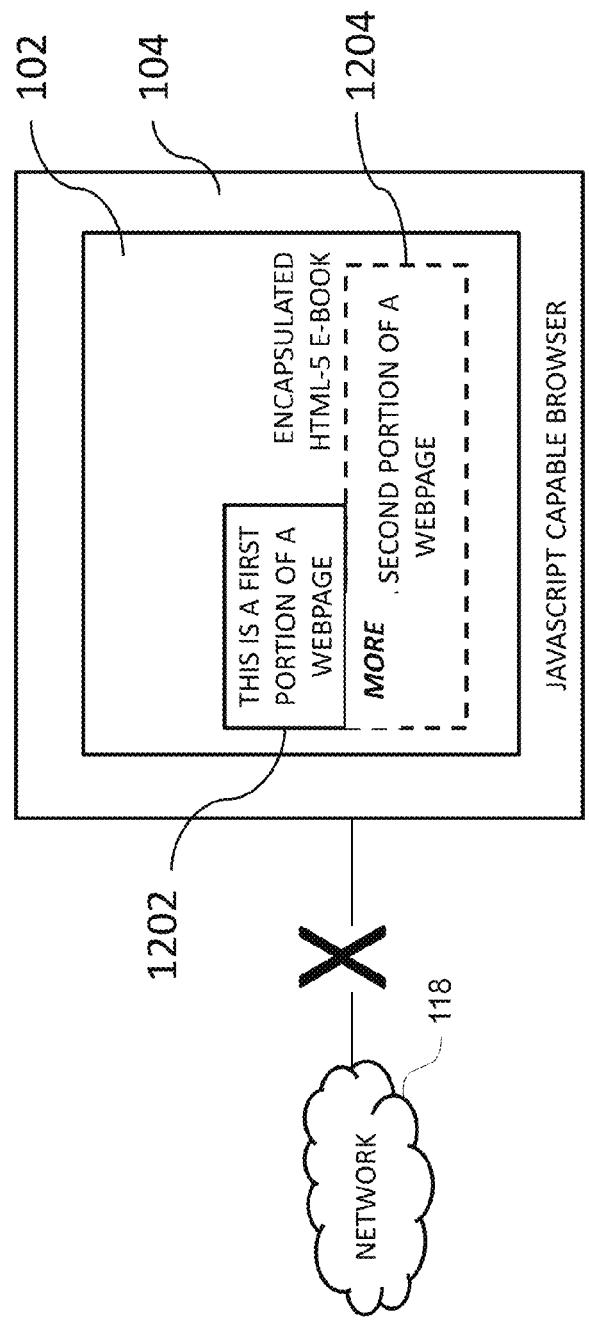
FIG. 12 depicts an expanding paragraphs version of an encapsulated e-Book.

Referring to FIG. 12, an illustrative example 1200 of an encapsulated electronic book 102 is shown having a first portion of a webpage 1202 and a second portion of a webpage 1204 which may provide the user with an option to access additional information on a topic being viewed by the user while accessing the encapsulated e-Book. In an illustrative example, the encapsulated e-Book may provide an option to expand a viewed topical paragraph on a topic, thus presenting more detailed information to the users corresponding to the topic. In embodiments, the encapsulated e-Book may provide the user access to the content associated with a topic such as physics law, chemistry reactions, experimental data, mathematical tools and the like when the user is browsing the encapsulated e-Book to enhance his/her learning. In embodiments, the encapsulated e-Book may initially provide access to only a first portion of a webpage, or topical paragraph, that may be displayed on the browser of the computing device. On determination that the user may be interested in exploring detailed information regarding the topic, the encapsulated e-Book may be adapted to provide access to a second portion of the webpage, or additional topical paragraphs, that may comprise more detailed information corresponding to a topic that may be selected by the user. In embodiments, the encapsulated e-Book may provide action buttons such as "more" or "less" options enabling the display of more or less information related to the topic. In an illustrative example, when a user selects a "more" action button, the encapsulated e-Book may expand a current topical paragraph or add another topical paragraph that is associated with the topic and thereby presenting expanded information on the topic. In embodiments there may be a plurality of levels of expansion and associated action buttons for "more" and/or "less" present on each page comprising expanded information. In this way it may be possible to have a plurality of levels of information on a topic: the "more" or "less" options may be infinitely nested.

In embodiments, an encapsulated e-Book may comprise access to persistent data storage facilitating the storage and retrieval of data such as browser settings, experimental data, notes, and the like associated with a user, a current session of a user, and the like. In embodiments, the data may be maintained in a persistent file, database, and the like that persists after a particular browser session may have ended. In embodiments, the data may be stored on a storage device local to the computer associated with the e-Book. In embodiments, the data may be browser independent. In an illustrative and non-limiting example, a user may retrieve data associated with a previous session and monitor his/her activities over the period of their interactions with the encapsulated e-Book. In an illustrative and non-limiting example, a user may run a tangible experiment in one session and store the captured data. The user may come back in a later session and analyze the captured data.

Figure 31:
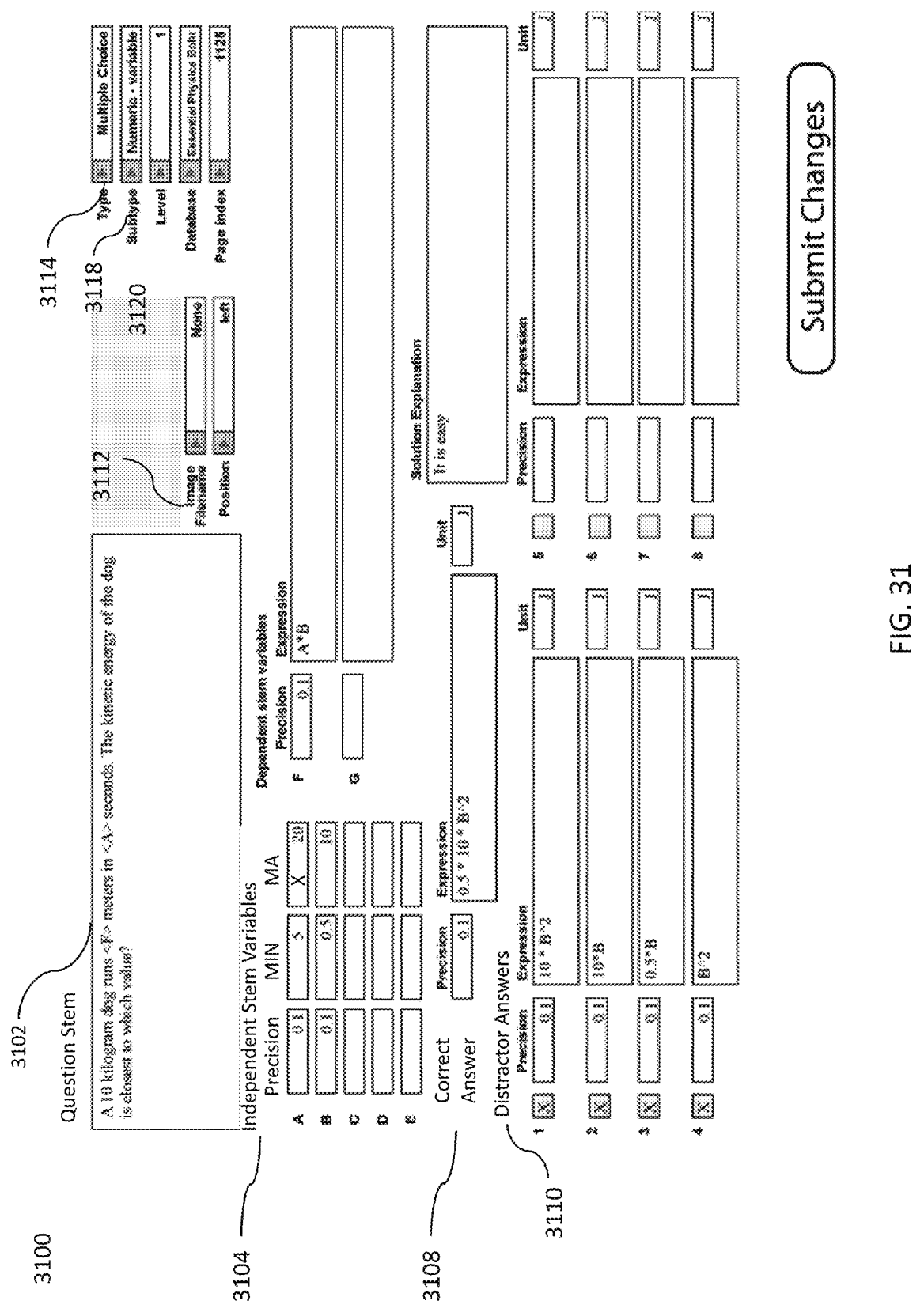

In embodiments, there may be a means to enter assessment questions and answers such as multiple choice questions, vocabulary questions, embedded grid questions, short answers and the like. There may be a means to enter correct answers for a question, distraction answers that are incorrect but may sound plausible, and the like. Referring to FIG. 31, an illustrative example of a user input screen 3100 for the creation of a numeric multiple choice question is shown. An author may enter a question stem 3102 comprising text and variables to describe the question, specify independent variables 3104 and dependent variables 3122. Minimum and maximum values and precision may be specified for independent variables 3104. Dependent variables may be specified as a function of one or more of the independent variables and a precision level. The correct answer 3108 may be entered as a function of the independent and dependent variables. A plurality of distractor answers may be entered as functions of the independent and dependent variables. In embodiments, an author may be required to enter the correct answer and a minimum number of distractor answers. In embodiments, an author may be able to specify a type of questions 3114 such as multiple choice, gridded, short answer, and the like, a subtype of question 3118 such as numeric or vocabulary for multiple choice, level of difficulty 3120, and the like. In embodiments, an author may specify an image 3112 to display in conjunction with the question 3102. In embodiments, an author may provide a solution explanation 3124 which may comprise the correct answer, an explanation of how the correct answer was derived, references to more information on the topic, and the like.

In embodiments, an encapsulated e-Book may be configured to generate different assignments for each user accessing a particular topic. In embodiments, the e-Book may generate unique questions for each user based on randomly generated values for the independent variables where the values are within the range specified. In embodiments, the e-Book may select a subset of the distractor answers to display together with the correct answer as alternative options in the multiple-choice questions. In embodiments, user answers to multiple choice and gridded questions may be automatically assessed or evaluated.

In embodiments, the encapsulated e-Book may be configured to generate different assignments without accessing the server. The encapsulated e-Book may create an HTML table element appropriately structured to create randomized problems and answers for each student and store the data. This capability may enable a teacher to give every student a different assignment for an in-class or homework assignment or test. As a result, whenever a teacher may discuss a particular topic within a classroom, the encapsulated e-Book may be configured to evaluate the students on understanding of the particular topic by providing different questions to the different students.

Figure 13:
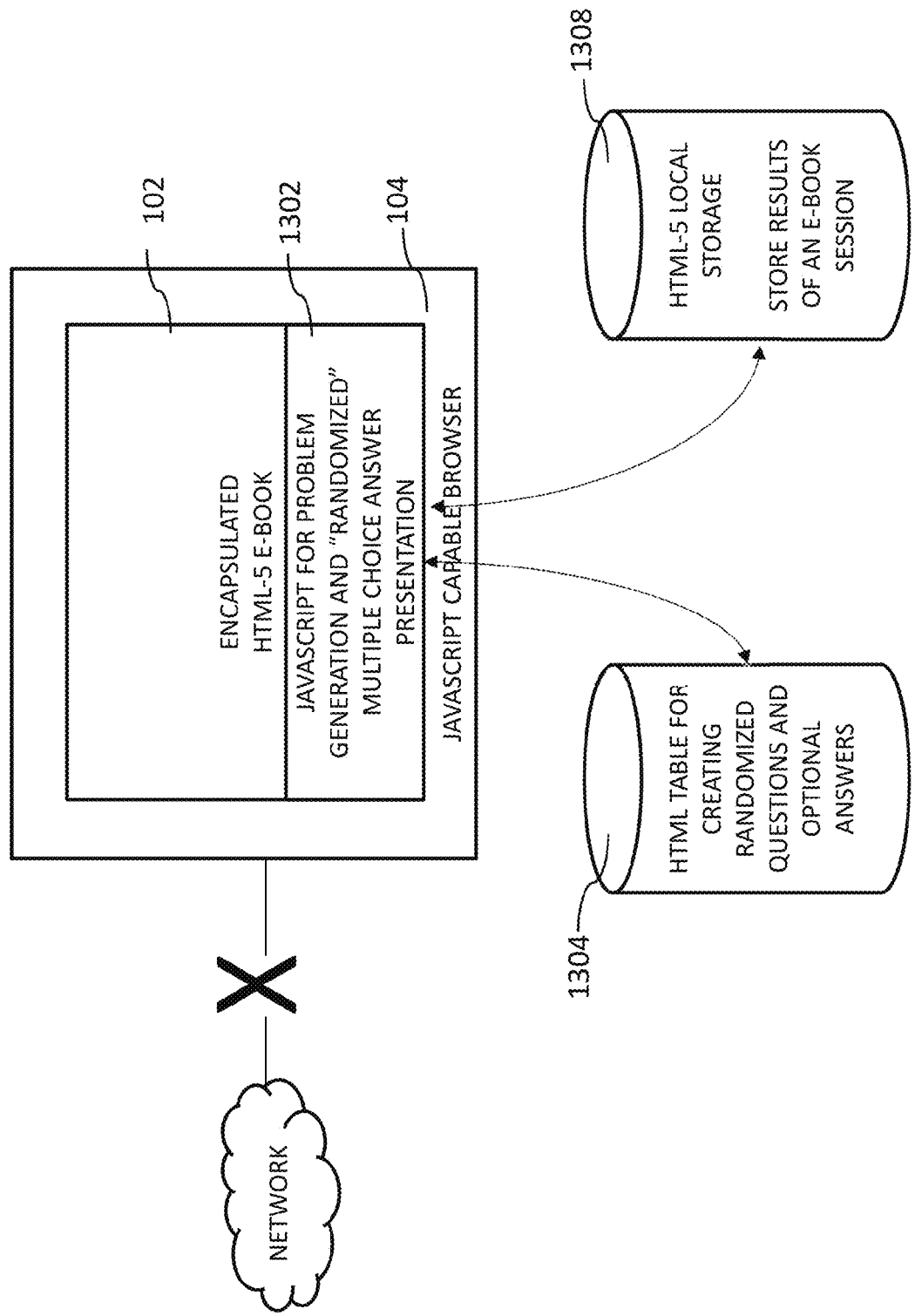
FIG. 13 depicts an e-Book capable of generating randomized testing materials.

FIG. 13 illustrates an embodiment of the encapsulated e-Book 102 that may be configured to track session history of the user when the user may access the content of the encapsulated e-Book 102. In embodiments, an encapsulated e-Book 102 may comprise local, persistent data storage 1308 to facilitate storage of data (e.g., browser, experimental data and others) associated with the current session of the user. In embodiments, JavaScript associated with the e-Book may comprise instructions that may store one or more activities of a user accessing the content of the encapsulated e-Book within a session. The JavaScript may store the results of the activities of the user in persistent local storage 1308 that may be available on the computing device of the user. In embodiments, when the user accesses the content of the encapsulated e-Book, the JavaScript may access the local storage 1308 to retrieve activities of the user from a previous session. The storage of user activities may be beneficial to the user as the user may easily identify the portion of the content that may not have been accessed by the user in the last session. In embodiments, the JavaScript may comprise code to store information such as annotations, markups, experimental data and the like in the local storage 1308 of the computing device. Thus, in this embodiment, a user may retrieve the data associated with a last session to keep a track of his/her activities.

In embodiments, as illustrated in FIG. 13, an encapsulated e-Book may be adapted to generate randomized problems and/or assignments 1302 for different users that may access the same or a similar topic of the e-Book. In embodiments, the encapsulated e-Book may be configured to generate the different assignments without accessing the server. The encapsulated e-Book may create an HTML table 1304 to create randomized problems and answers for each student and store the data in persistent local storage 1308. This capability may enable a teacher to give every student a different assignment for an in-class assignment, a homework assignment, a test, or the like. As a result, whenever a teacher may discuss a particular topic within a classroom, the encapsulated e-Book may be configured to evaluate the students on understanding of the particular topic by providing different questions to different students. In embodiments, the JavaScript 1304 may comprise code that may generate randomized problems for the different users, such as students, and provide corresponding multiple-choice answers to the students such that the teacher may evaluate the students for a given topic by asking different questions to different students. In an example, the JavaScript may be configured to access the HTML table 1304 (as shown in FIG. 13) to retrieve different values that may be given to a variable in the question to generate different questions for the students. Though the student may be tested on similar type of questions, the values of the variables in the questions may be changed so that answers to these questions may vary for each student of the class. In an illustrative example, a teacher may be able to assign test problems to absentee students having the same degree of difficulty as the standard test but which may have different number values of the variables of the problems to avoid the possibility of copying answers from a student who took the test. In an illustrative example, a student may retake a test and always be presented with new problem variable values and solutions. Also, a student may take a practice test that is fundamentally the same as the actual test but has different variable values.

The methods and systems described herein may comprise instructions that may create randomized assignments for different users, such as students, automatically and without needing server-side support. In an illustrative and non-limiting example, a teacher may want to provide each student with different variations on an assignment to solve (similar assignments with differences in variables, distractor choices, and the like). The present methods and systems may comprise instructions using a problem description language for generating unique assignments from the same stem (base question or function) but different variable values and distractors. In an example, the teacher may be interested in having students determine the speed of a dog when the dog runs X distance in T minutes. The problem description language may be used for building different assignments for each student. That is to say, using the program description language, each student may get the same assignment of speed determination but each student may get different values of distance X and time T. In an example of an e-Book deployment with limited network access, the encapsulated e-Book may be configured to email assignments of such nature to the students.

Figure 14:
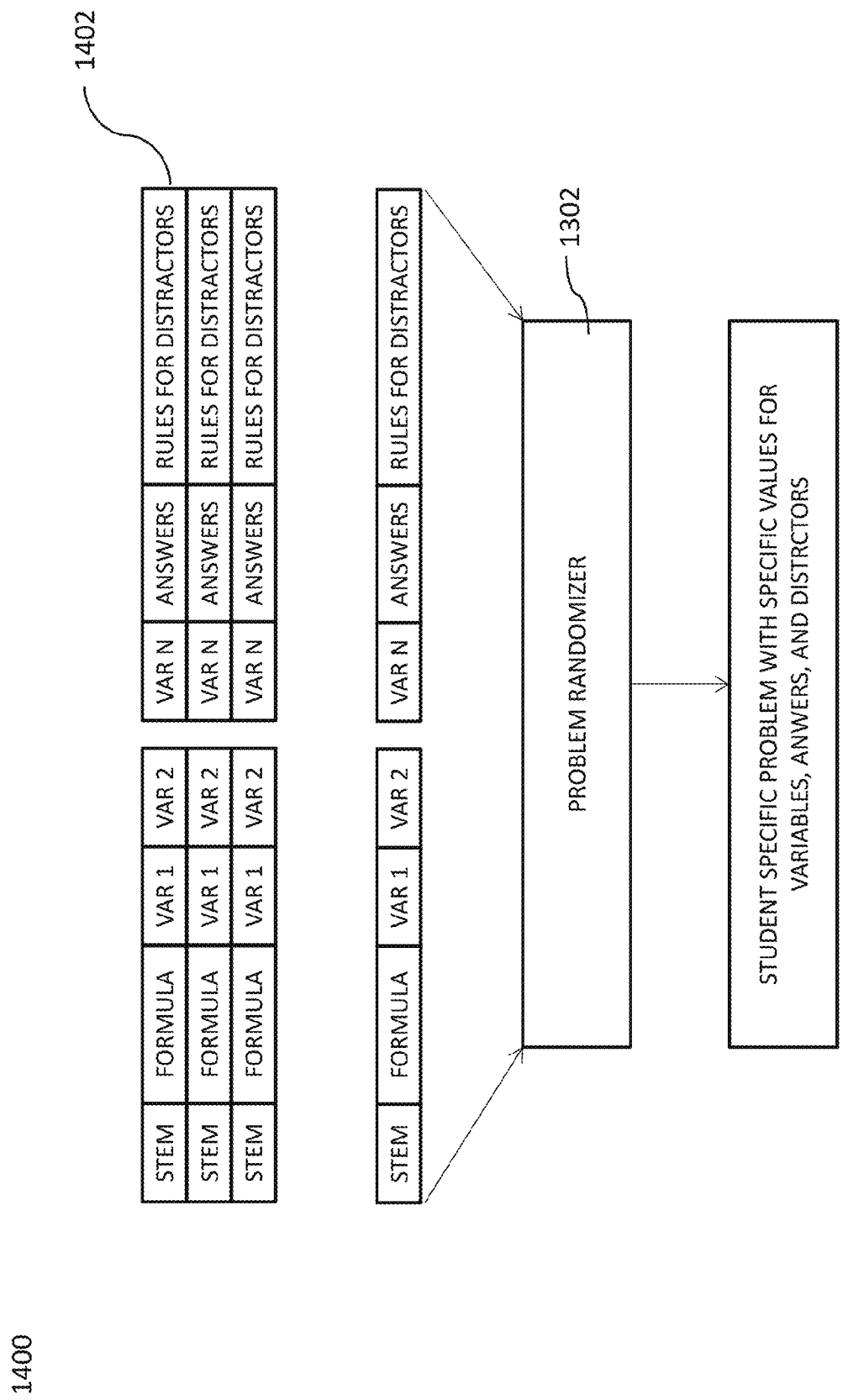
FIG. 14 depicts a problem randomizer for generating student-specific problems.

FIG. 14 illustrates an embodiment of the encapsulated e-Book that may be adapted to generate student specific problems for evaluating different students on a particular topic. In embodiments, the methods and systems described herein may be configured to comprise instructions that may create randomized problems for different students automatically and without needing server-side support. The teacher may want to provide each student a different assignment to solve (same assignment with different criteria). The present methods and systems may be configured to develop instructions using a problem description language for generating unique problems with the same basic questions or stem (functions) but variable values and distractors.

In an example, the teacher may be interested in evaluating students ability to determine the speed of a dog given the information that the dog runs X distance in T minutes. The problem description language may be used for building different assignments or variations for each student. That is to say, using the program description language, each student may get the same assignment of determining the speed of the dog but with each student being given different values of distance X and time T. In embodiments, an e-Book having limited network access may be configured to email assignments of such nature to the students.

In embodiments, the problem description language may be configured to generate values for a plurality of question parameters through the problem randomizer. In embodiments, for each question that may be sent to the users the problem description language may define parameters such as formula, a plurality of variables such as van 1 through varN, answers for the question based on these variables and rules for distractors. Thus, in this embodiment, facilitating evaluation of student performance on a particular topic. Variables may be defined as dependent or independent. A formula may define a functional relationship between the parameters (e.g., distance X and time T) of the question, thus the formula may be used to generate different answers using different variable or parameter values. The rules for distractors may be used when the students are given multiple-choice questions. In multiple choice questions the students may be presented with a correct answer and a plurality of distractor answers and the student asked to select the correct answer for the question. In embodiments, the rules for distractors may comprise different formulas for different distractors, error checking to ensure no duplication of answers in the multiple-choice list, and the like. In embodiments, the encapsulated e-Book may be adapted to utilize the problem description language for defining these parameters for a plurality of the questions and/or assignments for the particular topic. Referring to FIG. 14, a high level diagram 1400 is shown comprising a set of programmed problems 1402, which have been created using the problem description language, which are may be used by the problem randomizer 1302 to generate student specific problems. The problem randomizer of the encapsulated e-Book may be configured to select among the programmed questions 1402. In an example, the problem randomizer 1302 may select student specific problems with specific values for variables, answers, and distractors and thereby the encapsulated e-Book may be adapted to deliver these to the students through emails or other communication channels.

In embodiments, an assessment engine may be embedded within an e-Book for facilitating assessment of student performance. In embodiments, an assessment may be embedded at different points in the e-Book and may facilitate a direct connection between the curriculum and feedback to students using the e-Book. In embodiments, an assessment engine may provide for emailing of homework to the students where the homework sent to the students may be customized to provide questions of different levels of difficulty for different students. In embodiments, the assessment engine may grade the homework completed by the students and present the graded results to the student and send the graded results back to the teacher.

Figure 15:
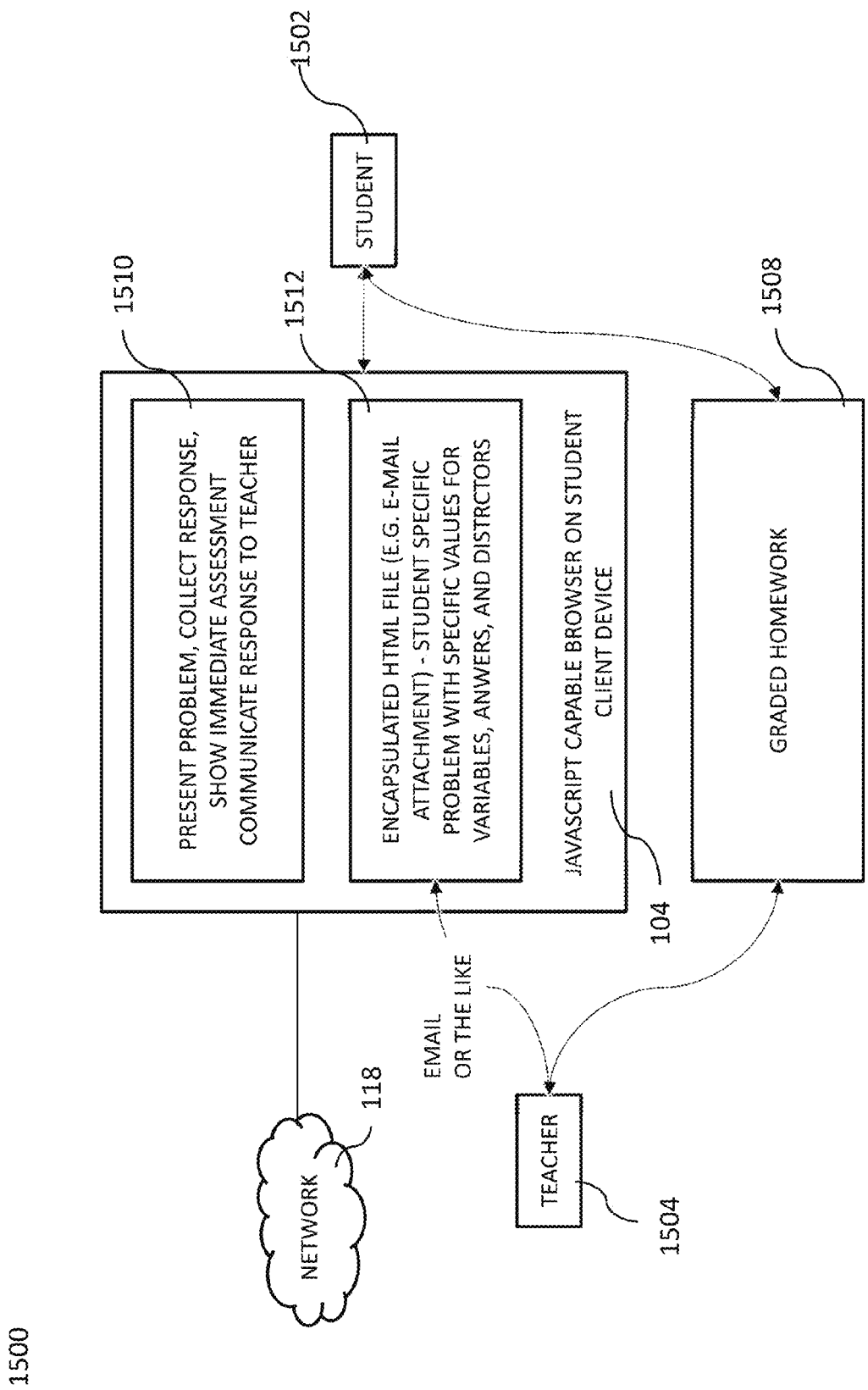
FIG. 15 depicts a elements and flow of an assessment engine for encapsulated e-Book teaching.
Figure 16:
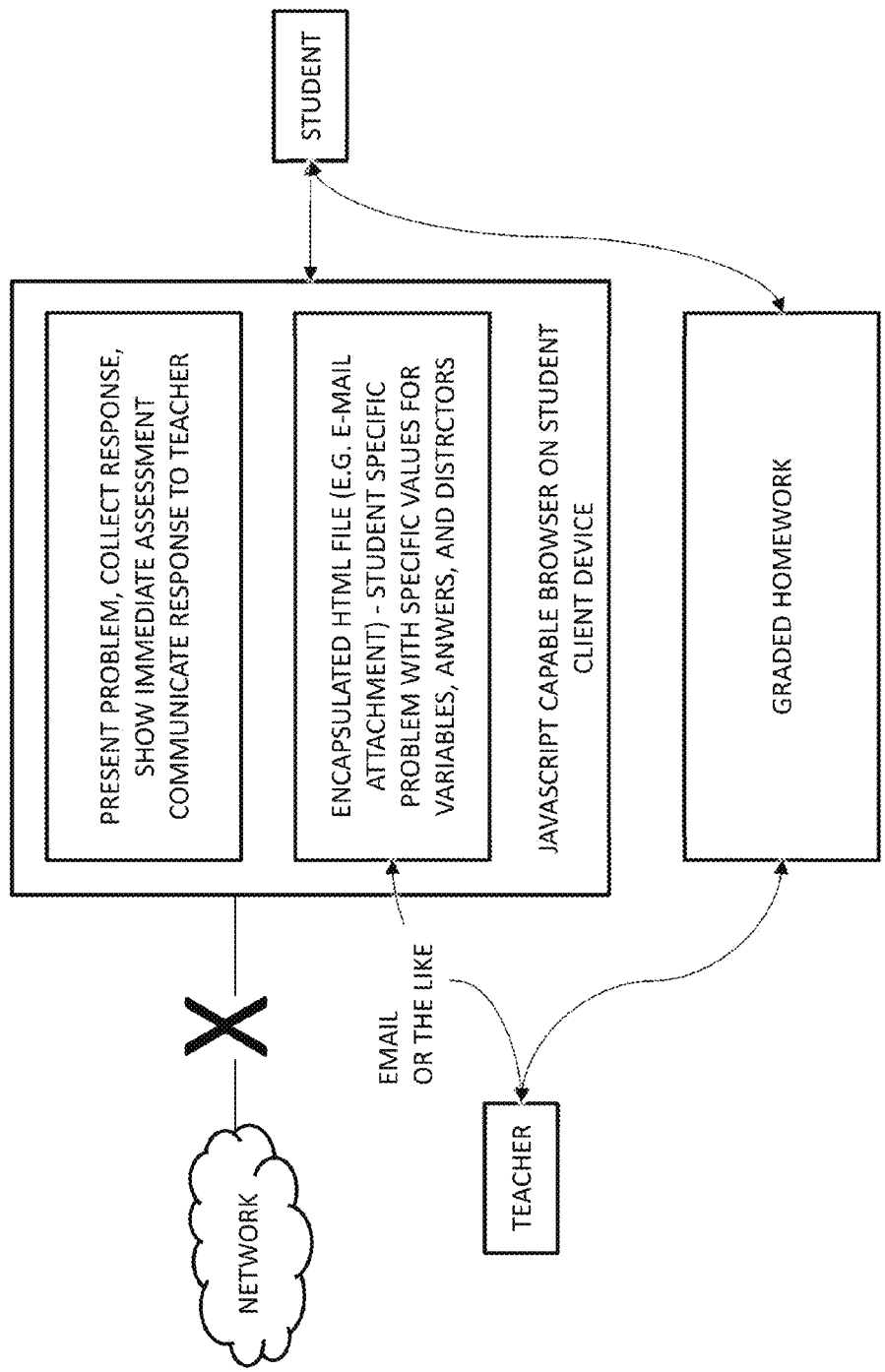
FIG. 16 depicts an encapsulated e-Book with embedded assessment capabilities.

Referring to FIG. 15 and FIG. 16, both illustrate an embodiment of an assessment engine that may be incorporated within an encapsulated e-Book. Referring to FIG. 15, a high level diagram of an assessment system having a network connection 1500 is shown comprising a student 1502, a teacher 1504, an encapsulated HTML file comprising student specific problems 1512 which the teacher 1504 may send to the student 1502 where it may be presented to the student for their input 1510, the student responses may be assessed and the resulting graded homework 1508 may be shared with the teacher 1504. FIG. 15 shows an assessment engine on a computer comprising access to a networked computer system such as private intranet, the internet, and the like. FIG. 16 shows a high level diagram of an assessment system having no network connection 1600. In embodiments, an assessment engine for facilitating assessment of student performance may be embedded within an e-Book. An assessment may be embedded at a plurality of locations within the e-Book facilitating direct connection between the assessment, the curriculum and feedback to the students using the e-Book. In embodiments, as shown in FIG. 15, an assessment engine may enable a teacher to email homework to students as an encapsulated HTML file. Further, the homework sent to students may be customized to select questions of different levels of difficulty for different students. The homework may be generated using the problem randomizer as described in FIG. 14 of the description. In an illustrative and non-limiting example, the homework may comprise a set of student specific problems with specific values for variables, answers, and distractors. On receiving the homework, the student may analyze the problems and complete the homework by appropriately providing responses for each of the problems that may be presented to the students. In embodiments, the assessment engine may be configured to collect the responses from the students and may display immediate assessment results to the students. In addition, the assessment engine may communicate the assessment of each student to the teacher so that teacher may evaluate student comprehension and assure delivery of a quality education to each student for a given topic. In embodiments, the assessment engine may be programmed to generate graded homework for the students. Students may submit their responses to an assessment engine that may be configured to generate graded results after finalization of the assessment of the graded homework. The assessment engine may present graded results to the student, and send a report back to the teacher.

In embodiments, an assessment engine may be embedded within an e-Book for providing assessment of student performance. An assessment may be embedded at the point of use and allow for direct connection to the curriculum and feedback to students using the e-Book. In embodiments, an assessment engine may provide for emailing of homework to the students. The homework sent to students may be customized to select different levels of question difficulty for different students. As the students complete the homework the assessment engine grades it and the graded results are presented to the student and sent back to the teacher.

Figure 17:
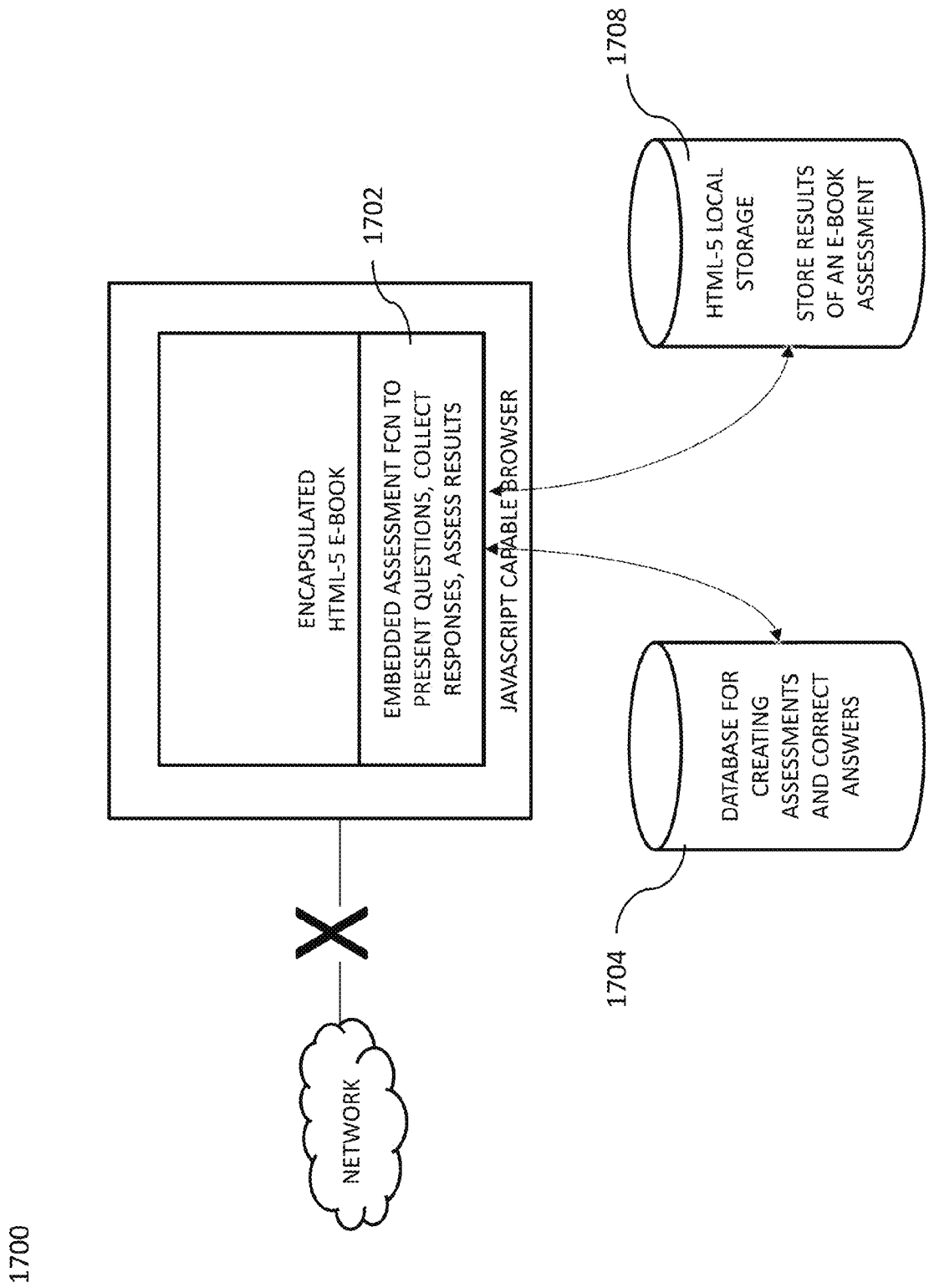
FIG. 17 depicts an assessment engine on a computer having no network access.

Referring to FIG. 17, a high level diagram 1700 is shown, illustrating an embodiment of an encapsulated e-Book embedded with an assessment function 1702 that may be configured to assess the learning capabilities of the students on a particular topic taught by the teacher. As shown, the assessment function may be configured to interact with the database for creating questions and their corresponding answers 1704 that may be used for the assessment of the students. In an example, the problem randomizer may be used for creating randomized problems for different students of a class. The embedded assessment function may be configured to present each user, such as a student, one or more questions and collect from each student their response for each question. Further, the assessment function may be configured to assess the results by comparing the responses of the users with the answers of the corresponding questions. In addition, the assessment function may also be configured to store the results of the assessment in the form of HTML-5 local storage 1708 that may be available on the computing device of the user.

An encapsulated e-Book may be configured to include an annotation feature that may allow the users to annotate a particular portion of the encapsulated e-Book while accessing the content of the encapsulated e-Book. For example, the annotation feature may include features such as a text highlighter, commenter and the other annotation tools so that users can utilize the encapsulated e-Book in a way similar to the utilization of a physical book.

An encapsulated e-Book may be configured to allow the users such as the students to take notes (i.e., make annotation within the encapsulated e-Book) while accessing the content of the encapsulated e-Book. In embodiments, the present methods and systems may comprise a means such as instructions, interfaces and the like, for storing annotation elements that may be used by the users for annotating portions of the encapsulated e-Book. In embodiments, the encapsulated e-Book may comprise annotation features such as: a page marker to expand or explore; modules that may allow making margin notes; and the like. In embodiments, the encapsulated e-Book may comprise a tagging scheme describing where to store a note and where to display a note. In embodiments, the encapsulated e-Book may comprise a language to define the data, types of annotation, and links to where it would be active in the encapsulated e-Book. In an example, the encapsulated e-Book may be configured to utilize the tagging scheme with a feature of HTML 5 that may allow the user to create a file that may be accessed by multiple pages.

Figure 18:
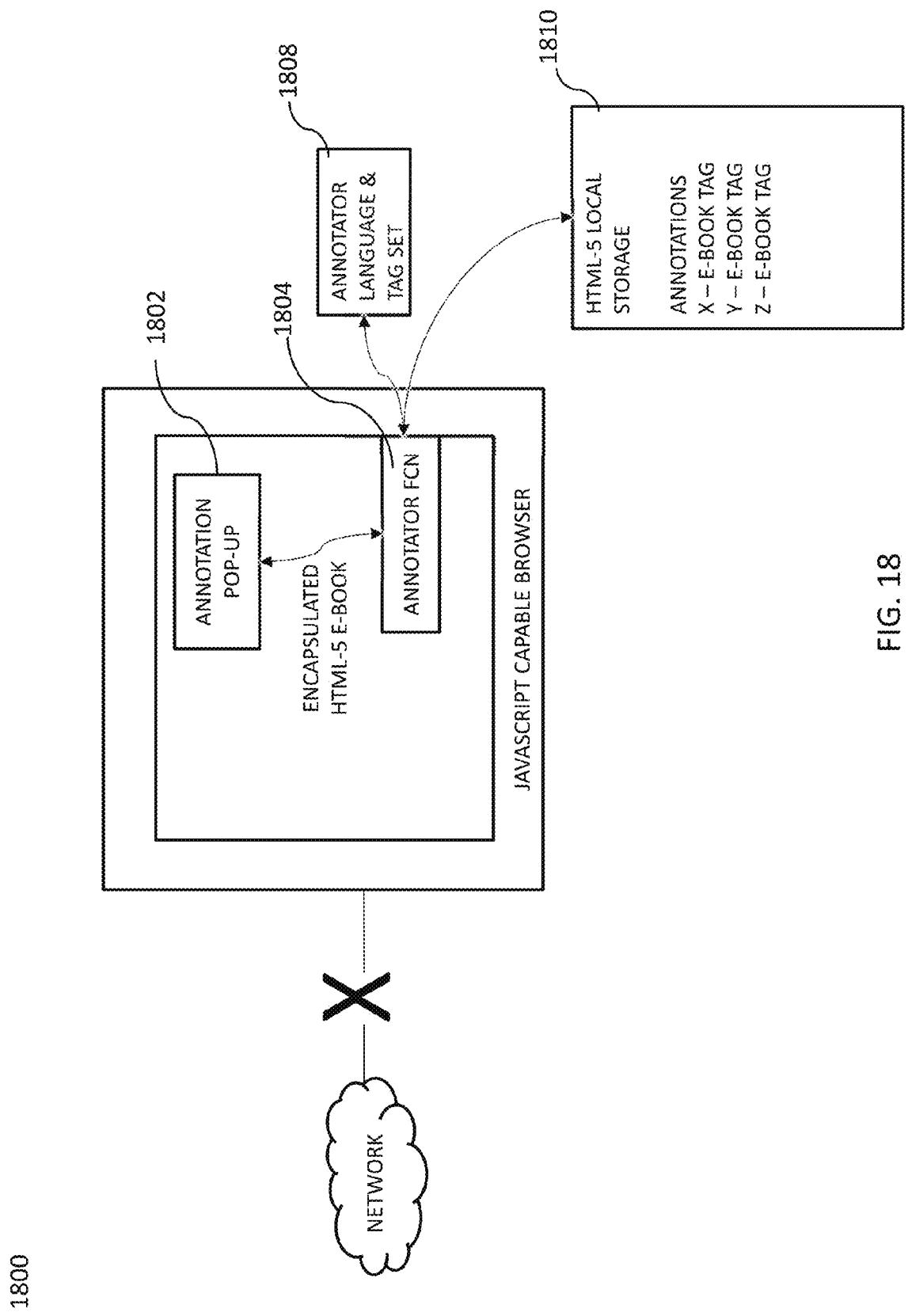
FIG. 18 depicts an annotation capable encapsulated e-Book.

Referring to FIG. 18, a high level diagram 1800 is shown comprising an annotator function 1804, an annotation pop-up 1802, an annotator language and tag set 1808, and storage comprising a plurality of annotation tags 1810. In embodiments, there may be an annotator function 1804 embedded within the encapsulated e-Book to allow the users, such as the students, to take notes (i.e., make annotations within the encapsulated e-Book) while accessing the content of the encapsulated e-Book. In embodiments, the annotator function 1804 may be configured to store annotation tags 1810 used by the users for annotating the portions of the encapsulated e-Book. As shown, one or more annotation tags (e.g., tags such as X, Y and Z for the e-Book) 1810 may be stored in an HTML-5 local storage that may be available on the computing device of the user. In other examples, the annotation tags may be stored in the cookies as included in the HTML-5 language or in permanent local storage.

In embodiments, the annotator function may interact with the annotator language and tag set 1802 to provide various annotation features to a user accessing the encapsulated e-Book for content. The users, such as students, may be interested in taking notes while accessing the content of the e-Book. The annotator language may be configured to develop one or more annotation features so that the students may easily make notes and tag various portions of the encapsulated e-Book. In embodiments, the annotator language may be used to develop features such as: a page marker to expand or explore; modules that may allow making margin notes; text highlighter; commenter; and other annotation tools; so that users may utilize the encapsulated e-Book in a way similar to the utilization of a physical book.

In embodiments, the encapsulated e-Book may comprise a tagging scheme describing where to store a note and where to display the note. In embodiments, the annotator language may comprise features to facilitate defining the data, types of annotation, and links to where it would be active within the encapsulated e-Book. In an example, the encapsulated e-Book may be configured to utilize a tagging scheme, which leverages a feature of HTML 5 that may allow the user to create a file that may be accessed by multiple pages. Taking notes on the computer may require writing (i.e., typing) and storing information associated with the notes in the computing device. In embodiments, the annotator language may comprise margin notes that may enable tagging of specific portions such as a paragraph, an image or other specific sections of the content that may be accessed by the user.

In embodiments, the annotator language may be configured to define data structures indicating the type of annotation, location of the tag, tagging scheme (what is it tagged to), and reference to the annotation content as selected by the user. In embodiments, a user may annotate a specific portion of the encapsulated e-Book using an "Add a note" feature. The user may click on the page to annotate (e.g., insert comments) on the specific content of the e-Book and the annotator language may define a storage type for such type of annotation. As illustrated, once the content is annotated, the annotator function may be configured to display the annotation separately such as in an annotation pop-up 1802 and the like. In embodiments, a user may select a button to annotate a particular page of the encapsulated e-Book and the activation of the button may bring a transparent overlay on that page. The user may start writing on it (e.g., scribble on a tablet, type on the tablet and the like) keeping the tag associated with that page. Pages that contain annotations may be tagged and noted so the user knows which pages have been annotated. The user may have the ability to clear annotations at the page level or globally within the entire e-Book.

Figure 19:
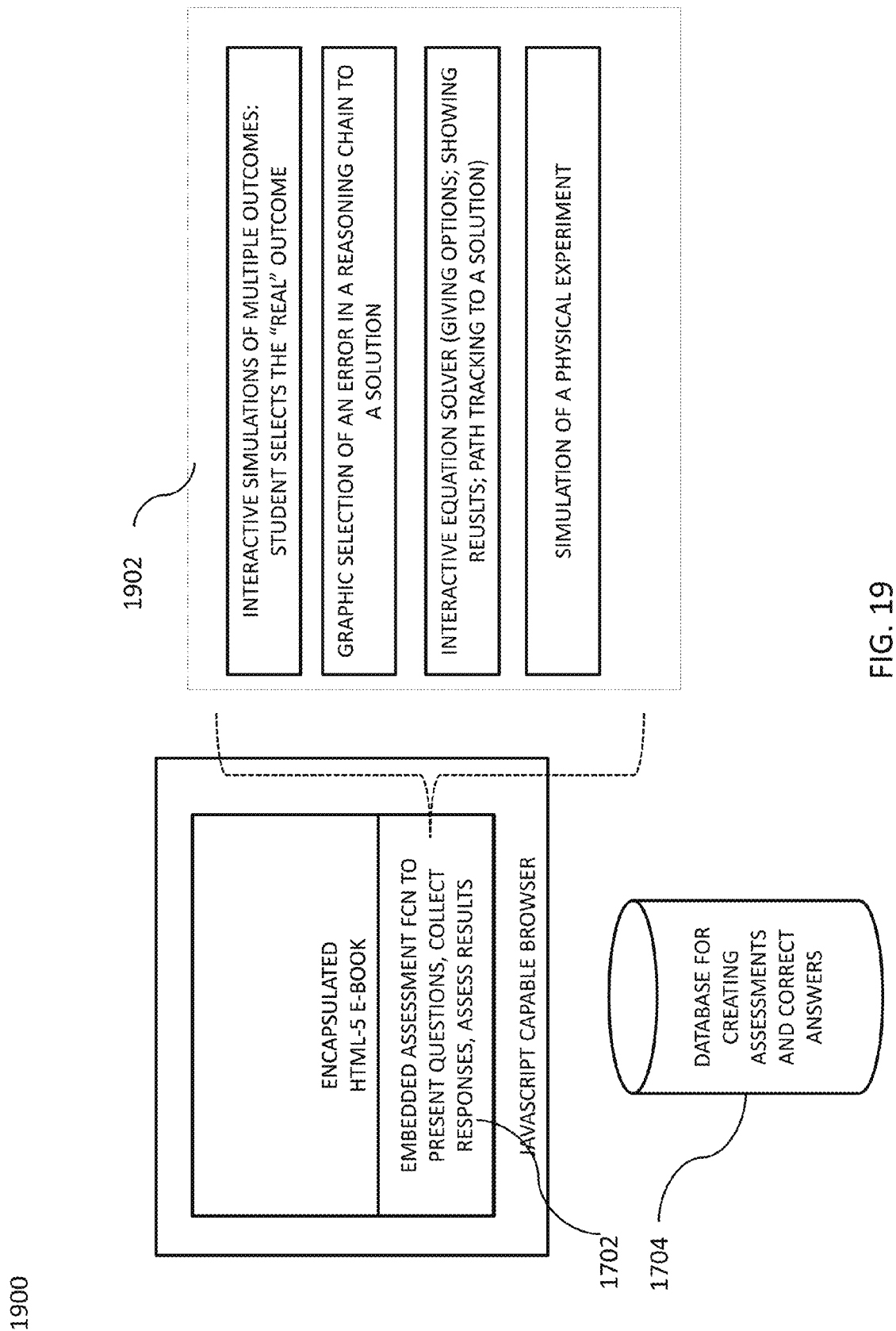
FIG. 19 depicts various performance assessment techniques.

In embodiments, an assessment engine providing embedded assessment may provide feedback to the curriculum within an encapsulated e-Book. The assessment engine may enable machine-scorable measures of student learning that address higher level skills. The students may be provided with visual, graphical and interactive methods to assess their understanding of the curriculum. In embodiments, the assessment may be done in a way that does not require reading on the part of the student. In embodiments, the assessment engine may direct students to specific pages and topics for review and study based on their assessment performance. In an illustrative example, a student with difficulty in answering a specific question may be given feedback and directed to a specific location in the e-book relating to the topic of the question for further study. In addition, before being given a question with which a student had difficulty in the past, the student may be directed to solve additional problems building up to the problem with which the student previously had had difficulty. This type of adaptive assessment may be accomplished with specific tags embedded and programmed by the author. Referring to FIG. 19, a high level diagram 1900 is shown comprising an embedded assessment function 1702, which may access a database for creating assessments and correct answers 1704 to generate student specific questions using a plurality of different assessment methods 1902. The different assessment methods are designed to help maintain student focus, engagement and long-term retention of the curriculum. Further, the assessment may include a mix of techniques to interactively engage the student. These techniques may comprise: providing image, animation or video based multiple choice questions to the students; providing a reasoning chain for graphically choosing a mistake in a solution represented by a set of steps; providing interactive simulations and asking specific questions based on such simulations; and the like.

Figure 20:
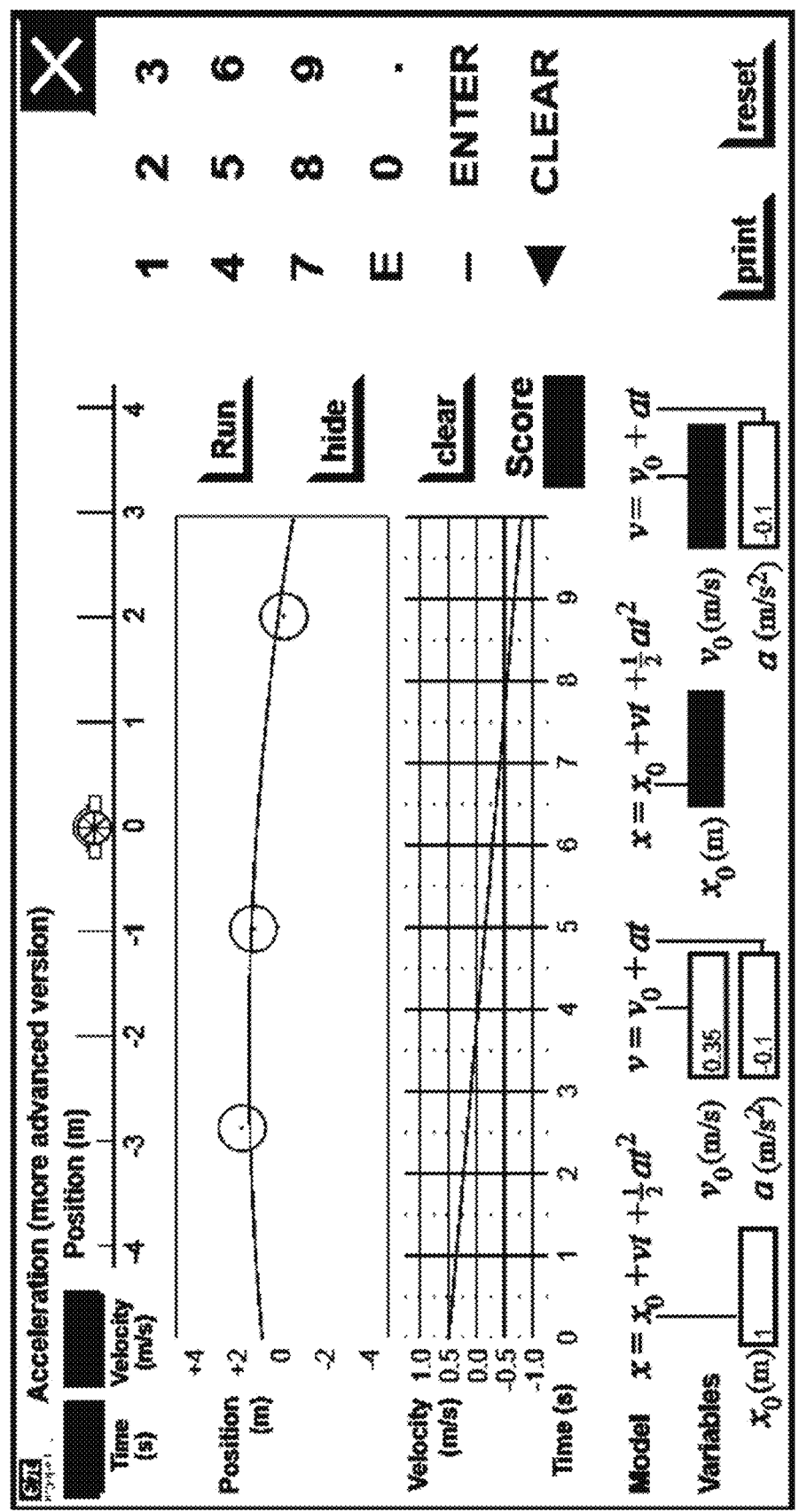
FIG. 20 depicts a screen shot for use of interactive simulations of multiple outcomes where the student selects the "real" outcome.

In embodiments, an assessment technique may use interactive simulations of multiple outcomes so that the student may select the 'right' outcome. The interactive simulations may use one or more of an image, an animation and a video. The student may be shown the simulation and then asked specific questions to help assess the student's understanding of some concept. In an illustrative example, a student may be shown an animated image of a ball exiting a curved ramp. The student may be shown three different trajectories that the ball may take and asked to pick the right trajectory. In another example, a student may be shown an animated video of a problem showing both right and wrong results and asked to pick the right result instead of passively watching the video. In another example, the student may be shown a series of steps that may solve a problem and asked to identify which are the right steps. Other such assessment techniques are contemplated and incorporated herein. Referring to FIG. 20, an illustrative example of a screen shot 2000 is shown comprising an interactive simulation showing the path taken by an object given initial conditions that may be set by a user such as a student. In this example, equations describing the trajectory or path of the object may be shown and user provided with an opportunity to vary some of the initial parameter values. The simulation may then be run and the trajectory or path plotted for the user.

Referring to FIG. 26, an illustrative example of graphic selection of an error 2600 is shown, comprising an initial equation 1602 and plurality of equivalent equations 1604A-D. In embodiments, an assessment technique may comprise asking a student to graphically select an error in a reasoning chain for a solution. In an illustrative and non-limiting example, the reasoning chain may comprise a portion of a solution to a math problem. In embodiments, the student may be asked to identify a region or portion of the chain that contains the error. In embodiments, the student may identify the region by selecting one of a plurality of graphical representations of a portion of a reasoning chain. In embodiments, the technique may be used to create graphical multiple-choice problems such that a student would make machine-scorable selections reflective of higher level learning skills.

Figure 21:
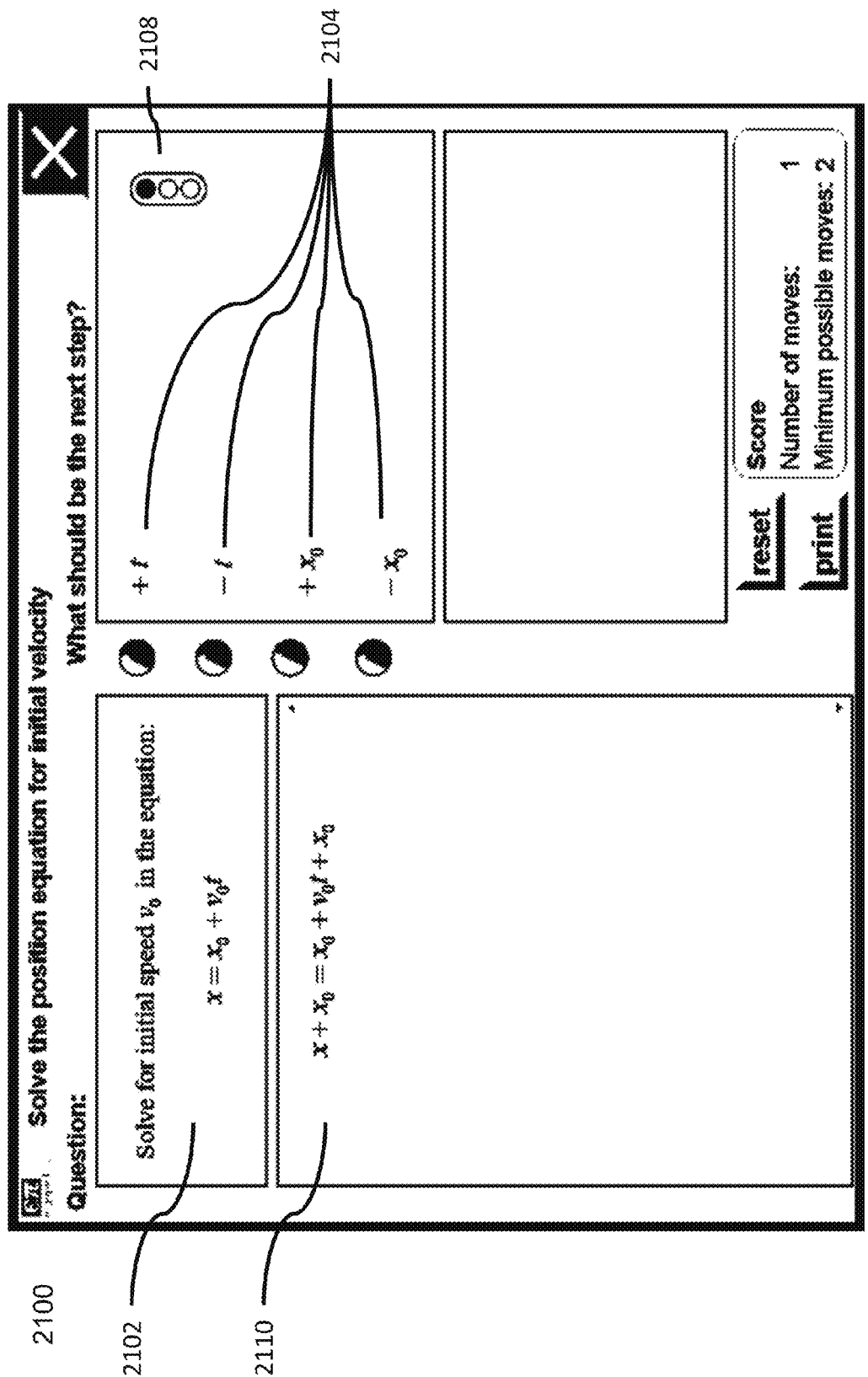
FIG. 21-23 depict screen shots for an assessment technique having multiple options and shows the results corresponding to a choice a student makes against a given option.
Figure 22:
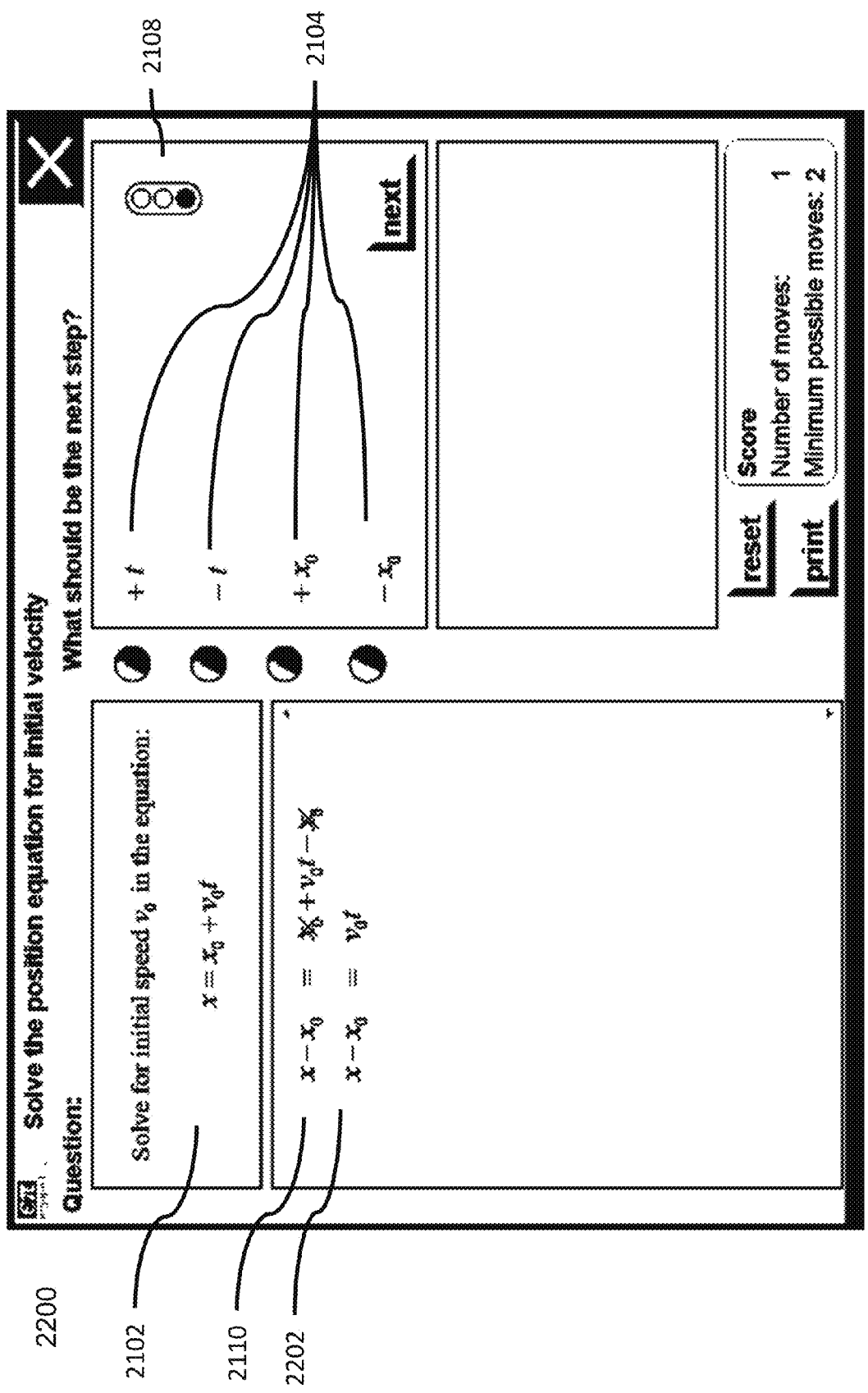
Figure 23:
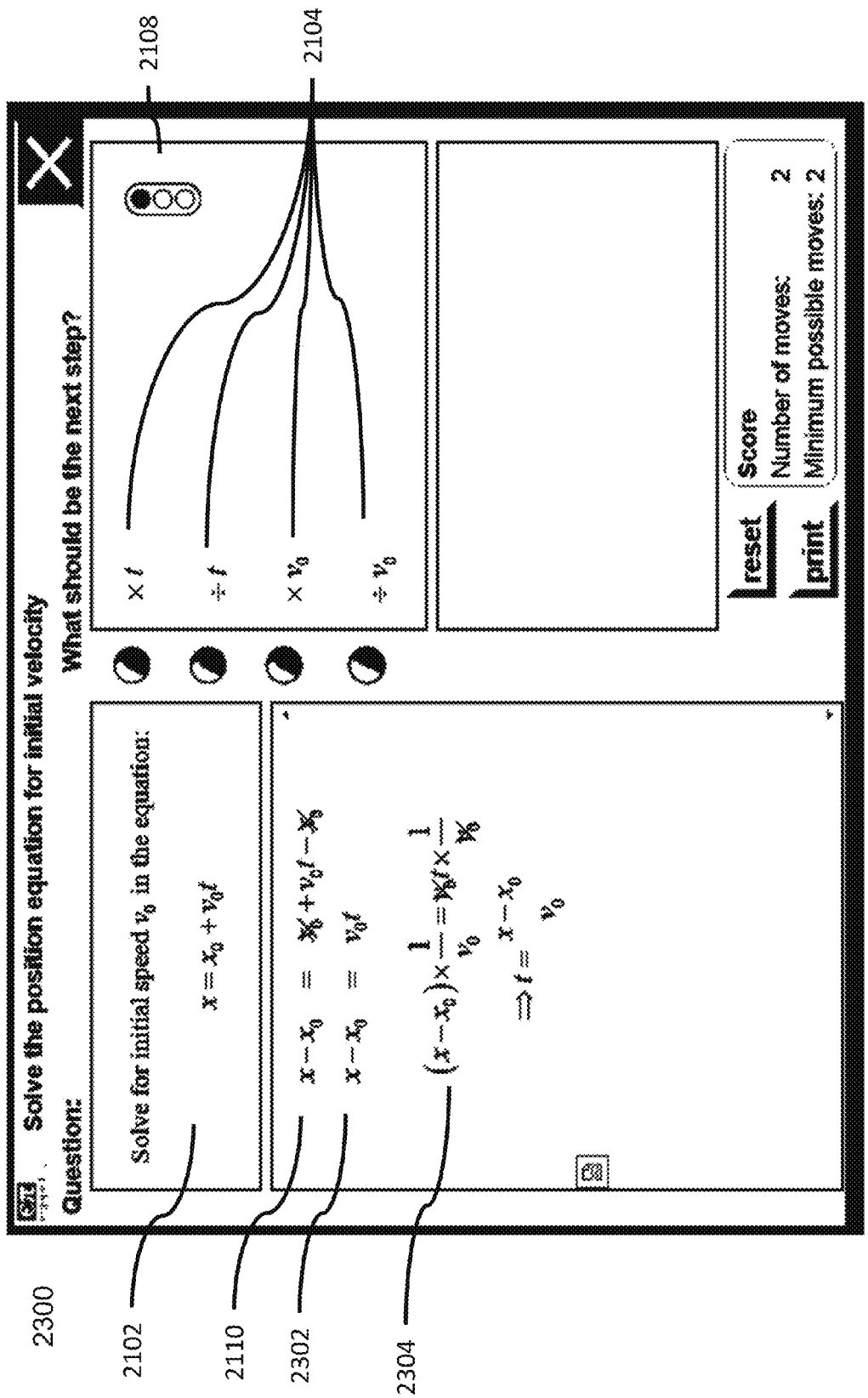

An assessment technique may provide an interactive equation solver that provides multiple options and shows the results corresponding to a choice a student makes against a given option. The sequence of options may lead to a final right answer and the student gets to track her performance based on the choices that she makes. Referring to FIGS. 21-23, illustrative and non-limiting examples of a series of screen shots are shown comprising a problem statement 2102, multiple options for next step 2104, and an indicator of answer correctness 2108. Once an option has been selected, the equation resulting from the user's choice 2110 may be shown together with a simplified version 2202. FIG. 21 shows an example where the incorrect next step was selected 2100. FIG. 22 shows an example where the correct next step was selected 2200. FIG. 23 shows an example of a follow-up to the correct selection of the initial step. The equation from the user's choice 2110 is shown together with the simplified version 2202 and the user is provided with new options for the next step 2104.

In embodiments, an assessment technique may comprise a simulation of a physical experiment. In an illustrative and non-limiting example, the student may be provided with a simulated experiment in which the student is asked to shoot a ball from a canon into a hole. The student may be given options, representative of real world parameters, to adjust in an attempt put the ball into the hole such as: change the angle of the shot; hit the ball harder; and the like. As the student adjusts the options in an attempt to put the ball into the hole, their performance may be scored and assessed. In another illustrative example, the student may be provided with a simulation depicting two circles on a graph and asked to define a line that intersects the center of both circles on the graph given options such as: changing slope of the line; changing starting position of the line; and the like. In this example, the lower the number of trials needed by the student to define such a line, the higher the score received for this assessment.

Figure 24:
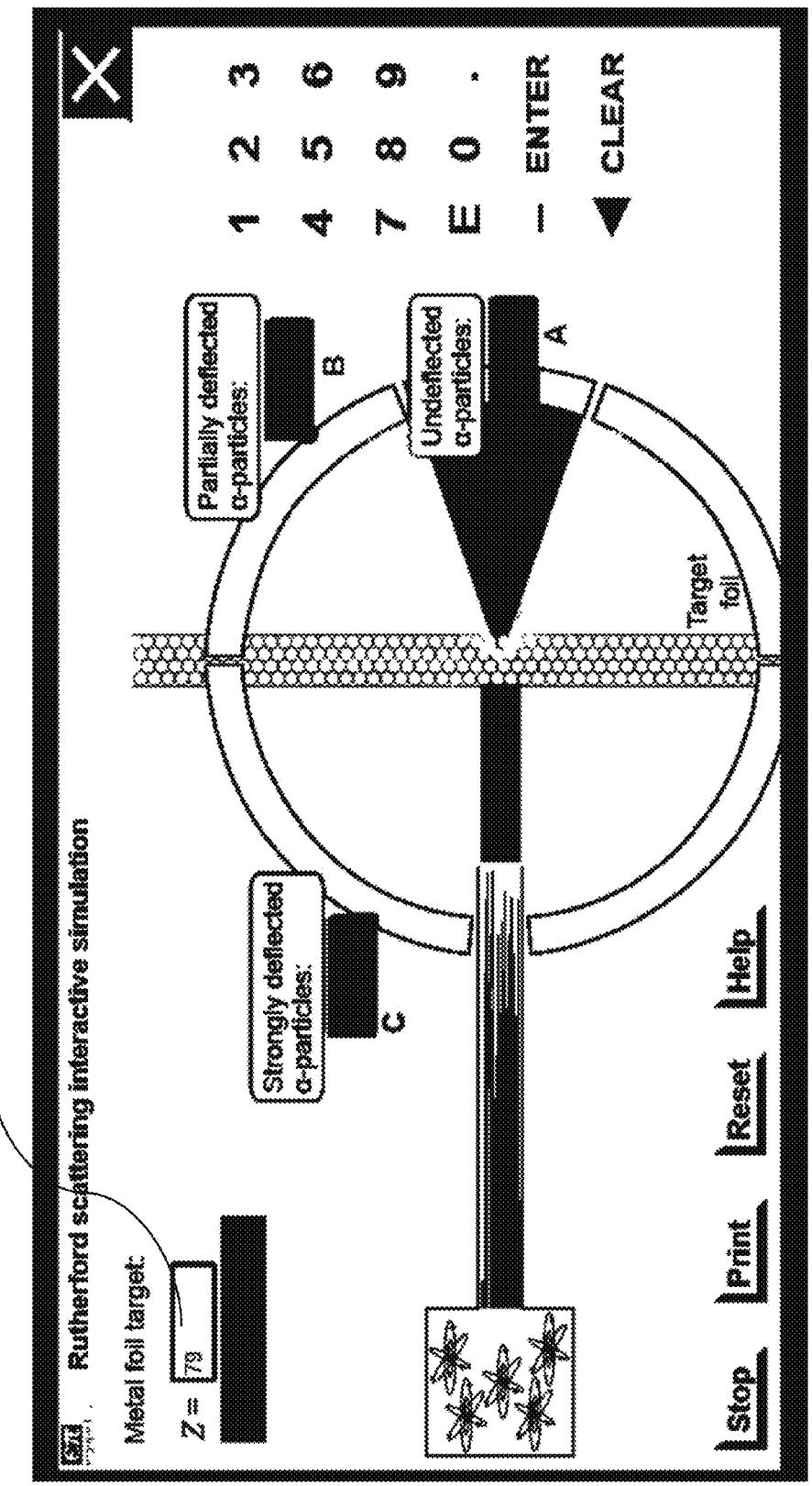
FIG. 24 depicts a screenshot where a user is given the option to specify the value of a parameter.
Figure 25:
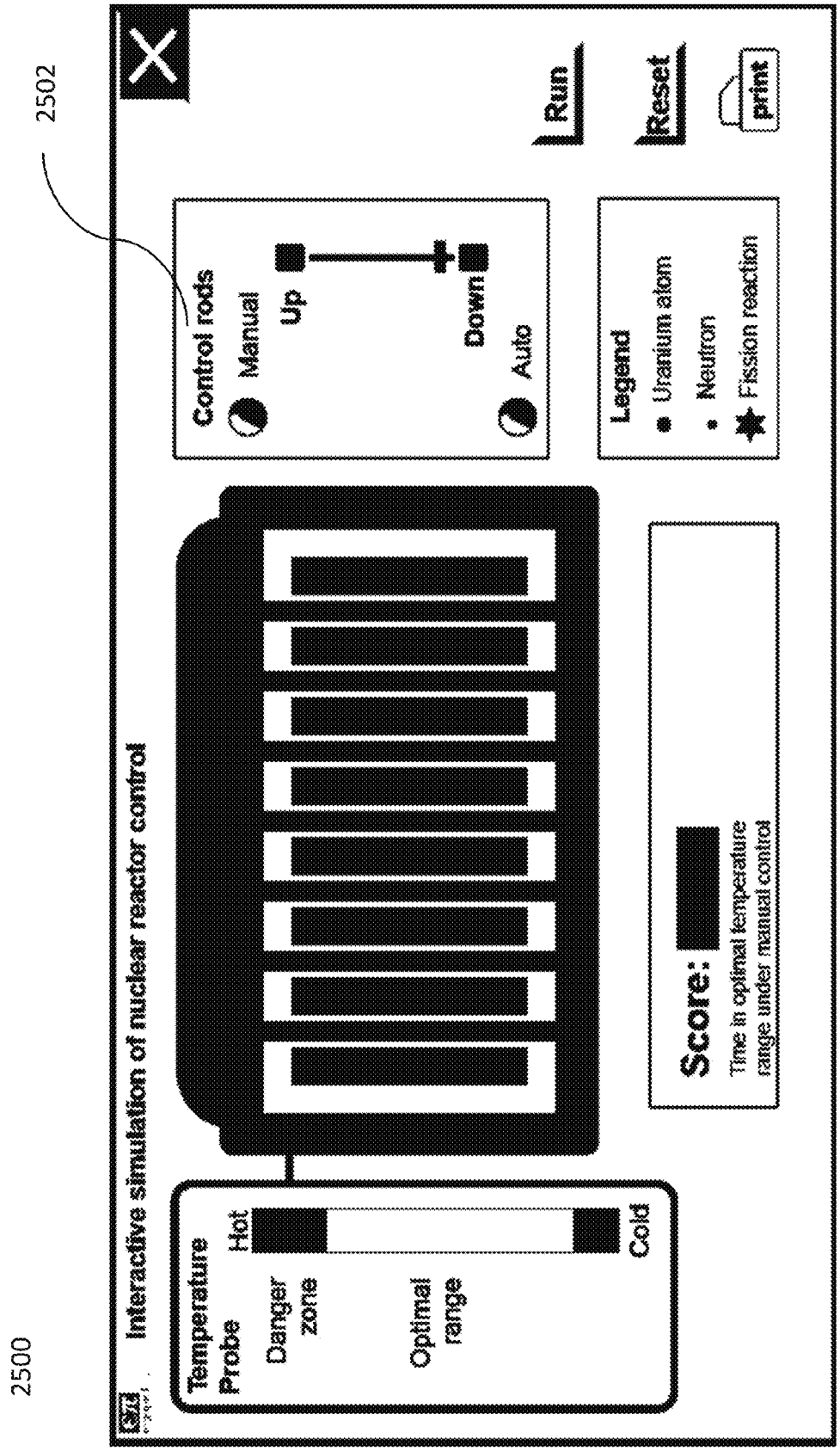
FIG. 25 depicts a screenshot where the user is provided with options, representative of real world parameters, to adjust.

Referring to FIG. 24, an illustrative example of a screenshot 2400 is shown where a user is given the option to specify the value of a parameter 2402, in this case the atomic number of the filter, and is shown the results, in this case the resulting Rutherford scattering. Referring to FIG. 25, another illustrative example of a screenshot 2500 is shown where the user is provided with options 2502, representative of real world parameters, to adjust. In this example the user may be asked to adjust the position of the cooling rods and assessed on the simulated results, in this example, the time under optimum temperature control.

In embodiments, as illustrated in FIG. 19, an encapsulated e-Book 102 may comprise an embedded assessment function where the assessment function may comprise a plurality of assessment techniques coupled with a feedback mechanism that may be employed by the assessment engine embedded in the encapsulated e-Book. The assessment engine may enable machine-scorable measures of student learning that address higher level skills. Such machine-scorable measures may comprise performance assessment techniques that may assess the users, such as the students or teachers, based on the performance of the users rather than the merely reading skills. The users may be provided with visual, graphical and interactive methods to assess their understanding of the curriculum in a way that may not require reading. In an illustrative example, the assessment engine may categorize the assessment of the users on a different level of skill evaluations. Higher level of skills evaluation may include configuring the assessment engine to evaluate user's capability to use his/her existing knowledge to make a decision about something else whereas lower level of skills evaluation may include configuring the assessment engine to evaluate the user's capability to memorize and recall educational content. Further, the assessment engine may be configured to employ various assessment techniques such as a formative assessment, a summative assessment, an applied assessment, a self assessment, a formal assessment, an adaptive assessment (wherein previous scores of each student can also be used in customization), a diagnostic assessment (wherein the users may be given assignments based on the result of diagnosis of learning capabilities of the users) and the like. In an example, the assessment engine may be configured to employ assessment techniques to assess higher cognitive levels of learning of the users.

In embodiments, different assessment methods may be designed to facilitate educational goals such as student focus, student engagement, long-term retention of the curriculum by the student, and the like. In embodiments, the assessment function may comprise a mix of techniques to interactively engage the student such as: providing image, animation or video based multiple choice questions to the students; providing a reasoning chain for graphically choosing a mistake in a solution represented by a set of steps; providing interactive simulations and asking specific questions based on such simulations; interactive simulations of multiple outcomes so that the student can select the 'right' outcome; and the like.

In embodiments, as illustrated in FIG. 19, the assessment engine may be configured to employ an assessment technique such as interactive simulations of multiple outcomes so that the student can select the 'right' outcome. In an illustrative and non-limiting example, an interactive simulation may use one or more of an image, an animation and a video. The student may be shown a simulation and then asked specific questions to assess the student's understanding of the simulated concept. In an illustrative example, the student may be shown an animated image of a ball exiting a curved ramp. The student may be shown three different trajectories that the ball may take and asked such questions as: select the right trajectory; determine the kinetic energies corresponding to the different trajectories; and the like. In other illustrative and non-limiting examples, a student may be shown an animated video of a problem together with right and wrong results. The student may be asked to pick the right result instead of passively watching the video. The student may be shown the steps to solve a problem and asked to identify which of the steps are the right steps. Other such assessment techniques are contemplated and incorporated herein.

In embodiments, the assessment engine may comprise an assessment technique that may enable users, such as students, to select an image or portion of an image to identify an error in a reasoning chain leading to a solution to a problem. In an illustrative and non-limiting example, the reasoning chain may be part of a solution to a math problem. The student may be asked to graphically identify a region in the reasoning chain that may include the error. Referring to FIG. 26, an illustrative example of a reasoning chain 2600 is shown comprising an initial equation 2602 and a series of equation steps 2604. The reasoning chain 2600 begins with an initial equation 2602 followed by a series of equation steps 2604A-D. To facilitate student evaluation, the assessment engine may have inserted an error in the reasoning chain 2600 such as equation step 2604B. Accordingly, a student may identify the step at which an error was introduced into the reasoning chain by selecting the error step, 2604B, while parsing the reasoning chain In embodiments, assessment techniques may comprise the creation of graphical multiple-choice problems where a student would need to make machine-scorable selections reflecting higher level learning skill.

In embodiments, the assessment engine may comprise an assessment technique that may provide an interactive equation solver to the students. The interactive equation solver may provide a problem, a plurality of options for the student to select as a next step, and display the results corresponding to the choice made by the student. The, progress of the student while solving the equation may be tracked using techniques such as: providing results after each action that may be performed by the student while solving the equation; recording the number of action that may be performed by the student to get the right result for the equations; and the like. Thus, with this assessment technique, a student may be able track his/her performance based on the choices that they made.

In embodiments, an assessment engine may be configured to employ an assessment technique based on a simulation of a physical experiment. In an illustrative example, the student may be provided with an experiment asking the student to shoot a ball from a canon into a hole. The student may be provided with options to change the angle of the shot or hit the ball harder to put it into the hole. As the student tries to put the ball into the hole, his/her performance may be scored and assessed. In another illustrative example, the student may be provided with two circles on a graph and asked to define a line that hits both circles on the graph in the center by changing slope and starting position. The lower the number of trials needed by the student to define such a line, the higher the score received in this assessment. In another illustrative example, on orbit simulator may be provided to the students.

The orbit simulator may allow an access to a plurality of features such as to zoom into the whole solar system, to determine orbital speed of Earth, and the like. The orbit simulator may allow the students to calculate the speeds that may be required to reach a particular planet using trial and error methods. Further, the orbit simulator may also provide interactive ways to determine amount of the fuel that may be required to reach to the particular planet making learning more real and interactive for the students. The various assessment techniques disclosed herein are merely exemplary techniques and other assessment techniques or modification of these assessment techniques may also be used in this education environment for evaluating the students.

In embodiments, a teacher may assess a plurality of students using an encapsulated HTML file. The teacher may prepare an assignment or test for students to assess their understanding of a particular topic. The assignment or the test may comprise a plurality of assessment techniques such as objective and subjective questions, depending on the nature of both the assignment and the student for whom the test or assignment is prepared. In embodiments, the teacher may also prepare an answer key corresponding to the assignment questions. In embodiments, the assignment or test may be adapted to be self-grading such that the assessment may be evaluated by comparing the answers provided with the corresponding answers as provided in the encrypted answer key. The test or the assignment may be graded accordingly based on the marks obtained from the comparison.

Figure 27:
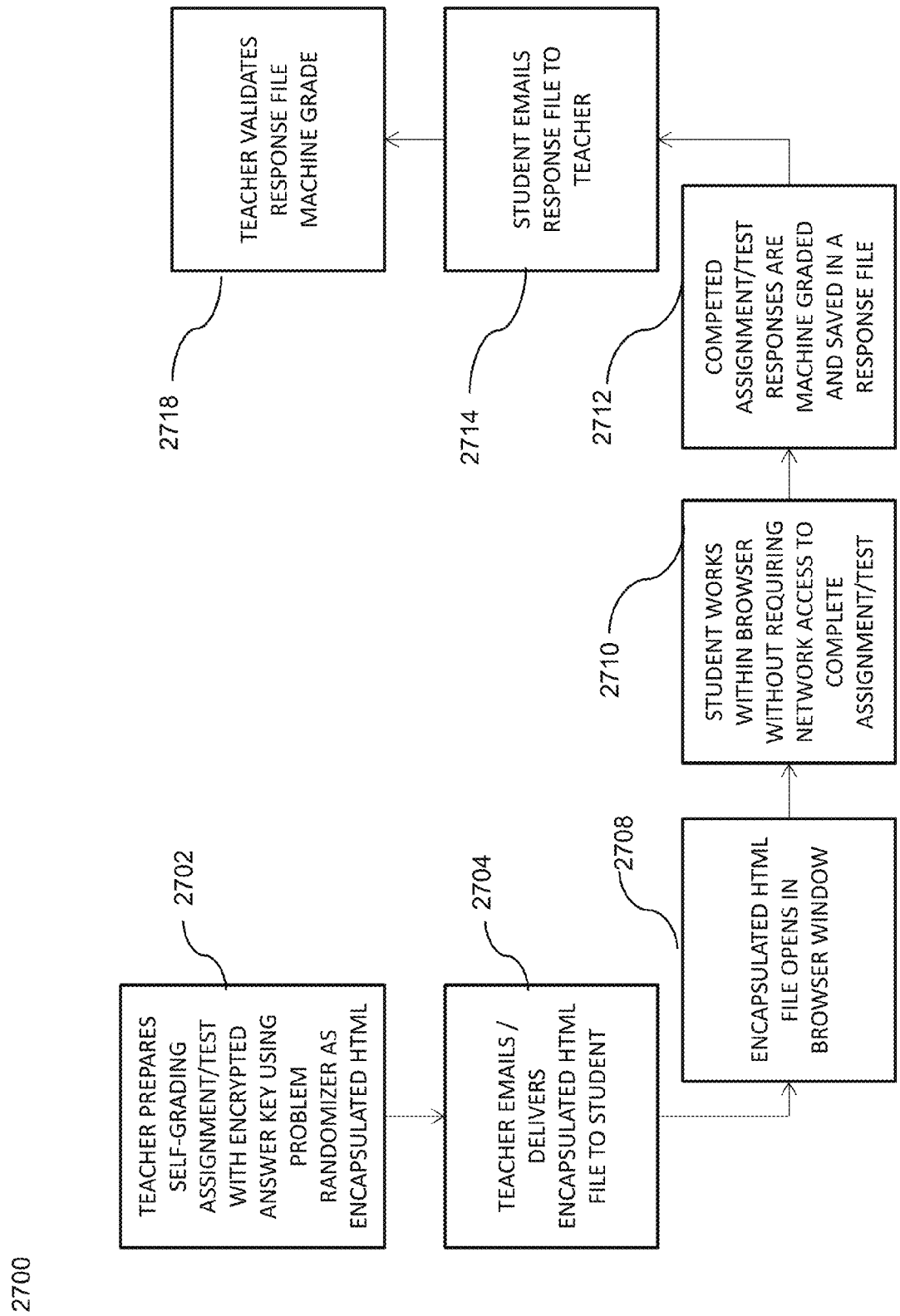
FIG. 27 depicts a teacher-student content triangle for student assessment.

The answer key may generally be kept encrypted by the teacher thus limiting viewing rights to such persons as the teacher, authorities such as a guardian or senior supervisor, investigators and the like while preventing the student from viewing the answer key. Referring to FIG. 27, a high level flow diagram 2700 is shown comprising the steps of: prepare self-grading assignment 2702; deliver encapsulated HTML to student 2704; open encapsulated HTML file in browser window 2708; complete the assignment 2710; grade the assignment 2712; email response to teacher 2714; and validate response file 2718.

In embodiments, the teacher may prepare assignment questions once and the randomizer may subsequently generate a plurality of assignments, respective questions and corresponding answer keys for specific students based on various factors. The problem randomizer may generate randomized problems by generating unique values for the variables in each version of the assignment. As discussed above, the problem randomizer may also generate answers, and distractors for the randomized problems that may be embedded within the encapsulated HTML file. The randomizer may be encapsulated as an HTML file that may be used independent of any network connection by the students for completion of the assignment or the test. In this manner, the teacher may evaluate the students of any particular class, or a particular topic group or a particular subject group with the use of the assignments through the encapsulated HTML file.

Once the encapsulated HTML file is generated, the teacher may send or deliver the encapsulated HTML file to the students. The encapsulated HTML file can be sent through email or any other mode of communication. Upon receipt of the encapsulated HTML file by the student, the student may open the file in a browser such as those discussed in conjunction with various figures above. The student may work on the assignment in the browser after retrieving and opening the file. After receipt of the encapsulated HTML file comprising the assignment, the student does not need any network connection or access to complete the assignment available in the encapsulated HTML file.

In embodiments, the completed assignment or test may be evaluated by comparing responses provided by the student with the corresponding answers as encrypted in the answer key. Accordingly, based on this evaluation, the assignment may be machine graded to provide a final credit or grade value to the student for the test or assignment. The grading data and the respective grade values may be saved in a separate file such as a response file. The student may then send the response file to the teacher through various means such as through emails and the like. In embodiments, the teacher may consider the grade value generated by the machine as a final grade value and may consider it for further assessment of the student as per requirements. In embodiments, the teacher may further validate the machine generated grade value by manually evaluating the assignment again. In case of any discrepancy between the manual evaluation and the machine evaluation, the teacher may alter the grade to a value that he may find more acceptable or accurate.

The methods and systems of educational-based e-Book curricula and automated assessment with feedback and customization may be configured for sending student-specific customized assignments with encrypted answer keys to facilitate automated grading remotely from the classroom while ensuring that the teacher and the student receive machine graded homework. In embodiments, all of the aforementioned steps (e.g. assignment execution, assessment, machine grading, automated assignment result reporting, and the like) may be accomplished within an encapsulated HTML e-Book. The encapsulated HTML may comprise the assignment questions and encrypted answers keys. In embodiments, an e-Book running in a JavaScript enabled web browser on a personal computing device of the user may enable the students to access the encapsulated assignment. In embodiments, student specific information may not be required for randomized problem/assignment generation to customize the encapsulated HTML file. In embodiments, student-specific details may be applied throughout the randomized problem/assignment generation as is appropriate for improved student comprehension and success. The randomized automated assignments that are captured in encapsulated HTML may comprise problems such as numerical, quantitative, qualitative, and multiple choice answer problems for the students. The embedded HTML may utilize the randomizing methods and systems described herein within a JavaScript enabled web browser for implementation of variations of the assignment without leaving the encapsulated HTML domain and independent of any network connectivity.

In embodiments, an assessment engine may utilize one or more methods of randomized problem generation to provide students with customized tests that allow an instructor to select different levels of difficulty for different students depending on their needs, as may be determined from assessment results. In an illustrative example, advanced students may be provided with more complex problems while beginner level students may be provided with less complex problems. In embodiments, the tests may be adapted dynamically based on the performance of a student during the test. Thus, a student that continually provides right answers to their problems may be provided with increasingly challenging problems while another student may be provided with more fundamental problems in response to consistently providing wrong answers. The wrong answers may also be used as a tool for diagnostic assessment. Based on the diagnostic assessment, the assessment engine may guide the student to specific pages and topics for review and additional instruction related to the concepts underlying the questions with which they had difficulty. In addition, the student may be directed to solve other specific problems before proceeding with the question with which he had difficulty solving. The capabilities of automated assessment, customization, differentiated instruction, as well as adaptive and diagnostic assessment may facilitate addressing the diverse learning capabilities of students while supporting maximum effectiveness of instructors.

Figure 28:
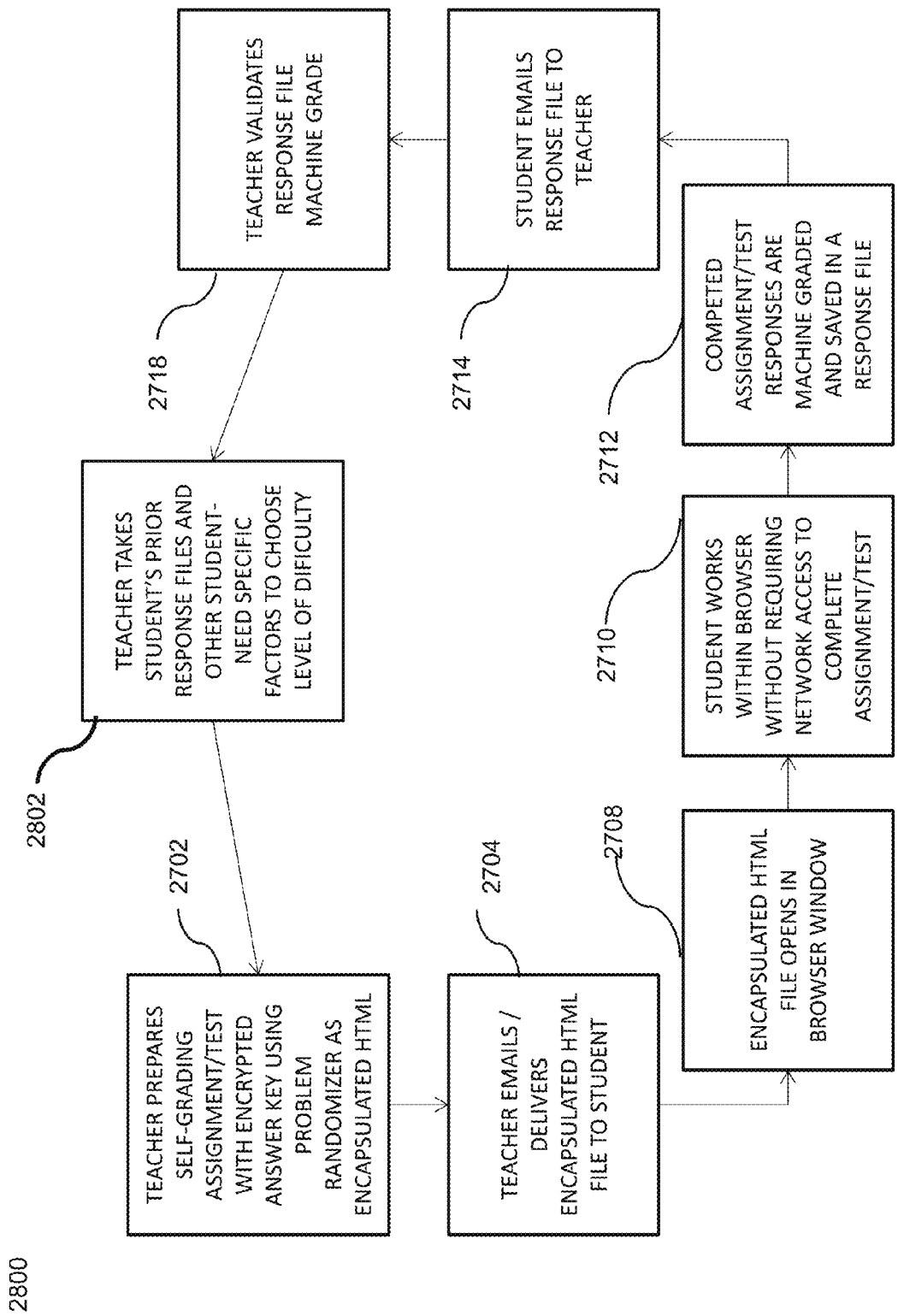
FIG. 28 depicts teach-student content triangle for student assessment with customizing of test difficulty based on assessment feedback.

In embodiments, a teacher may save and record the response files of each student to create an historical data record for each student to be used for generating customized tests. The customized tests may comprise problems of different levels of difficulty for different students, depending on their needs. In an illustrative example, advanced students may be provided with more complex problems while beginner level students may be provided with less complex problems. In embodiments, a teacher may consider student need specific factors when choosing the level of difficulty of the assignment such as: prior response files; level or standard of the student; experience of the student; key skills or capabilities of the student; and the like. Referring to FIG. 28, a high level flow diagram 2800 for generating customized tests for students depending on the skill level of the students. This high level flow diagram 2800 expands on that shown in FIG. 27 with the added step of the teacher taking into account student specific information 2802 such student's prior response files and the like when choosing the level of difficulty.

In embodiments, the tests may be adapted dynamically based on the performance of a student. Thus, a student that continually provides correct answers to their problems may be provided with increasingly challenging problems while another student may be provided easier problems upon providing an incorrect answer. In embodiments, an incorrect answer to a question may be used as a tool for diagnostic assessment and the student may be provided additional instruction related to the concepts underlying the question. This ability of the assessment engine for customization, differentiated instruction as well as adaptive and diagnostic assessment may help address the diverse learning capabilities of the students and may maximize the effectiveness of the instructors. Once the responses of the students and other skill levels of the students are identified as inputs for the generation of customized tests in an encapsulated HTML file, the evaluation of the students may follow the student evaluation method described in FIG. 27.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be executed on a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The server may execute the methods, programs or codes as described herein and elsewhere. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be a frequency division multiple access (FDMA) network or a code division multiple access (CDMA) network. The cellular network may include mobile devices, cell sites, base stations, repeaters, antennas, towers, and the like. The cell network may be a GSM, GPRS, 3G, EVDO, mesh, or other type network.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A system comprising:
   a plurality of remote data collection and control devices adapted to:
      transmit collected data by mimicking the output of a standard computer keyboard device, wherein the remote data collection devices transmit data in conformance with standard computer application interfaces; and
      receive and interpret data transmitted using standard computer I/O protocols and comprising audio data into device control function commands; and
   an electronic book operating within a web browser executing on a computing device, wherein the electronic book receives at least one of data values and commands for processing the data values via the web browser from at least one of the plurality of remote data collection and control devices, and generates the device control function commands.

2. The system of claim 1, wherein the transmitted data and the received data facilitate closed-loop control of at least one of the remote data collection and control devices by the electronic book.

3. The system of claim 1, wherein the remote data collection devices are further adapted to communicate with the computing device via BLUETOOTH wireless communication.

4. The system of claim 1, wherein the electronic book is adapted to communicate with an application programming interface of the computing device for receiving the collected data of the remote data collection devices via BLUETOOTH wireless communication.

5. The system of claim 1, wherein the electronic book is further adapted to communicate with an application programming interface of the computing device for sending at least remote data collection device functions via an interface of the computing device to the remote data collection devices.

6. The system of claim 1, wherein the electronic book interprets data received from the remote data collection devices into commands for processing the data and data values to be processed based on the commands.

7. The system of claim 1, wherein the electronic book communicates with at least one of the plurality of remote devices thereby maintaining a desired function of the at least one of the plurality of remote devices selected from a list of functions consisting of controlling a robotic device, controlling a sensed temperature or other physical parameter, and operating an active sensor device.

8. A system for automatically populating experimental data reports comprising:
   a remote data collection device adapted to:
      receive and interpret data transmitted using standard computer I/O protocols;
      transmit collected data by mimicking the output of a standard computer I/O device; and
      communicate with a computing device via BLUETOOTH wireless communication; and
   an electronic book operating within a web browser executing on the computing device, the electronic book comprising:
      an application programming interface capability for receiving the collected data of the remote data collection device and for transmitting data to the remote data collection device; and
      a report populating capability adapted to automatically populate an experimental data report with the collected data received from the remote data collection device, wherein the data report comprises manufacturing data that is received from the remote data collection device adapted to communicate collected manufacturing data by mimicking an output of a standard keyboard device.

9. The system of claim 8, wherein the remote data collection device mimics the output of a standard keyboard device without requiring an operative keyboard.

10. A method comprising:
    operating an electronic book within a web browser of a computing device;
    communicating via BLUETOOTH between the computing device and a plurality of remote data collection devices that are adapted to transmit collected data by mimicking key entries from a keyboard via an interface to a keyboard application programming interface of the computing device, wherein the remote data collection devices transmit data without requiring an operative keyboard, and receive and interpret audio data into device function commands;
    communicating between the electronic book and the keyboard application programming interface of the computing device to facilitate receiving the collected data of the remote data collection devices;
    communicating from the electronic book via an audio application programming interface of the computing device remote data collection device functions via an audio interface of the computing device; and interpreting key entries from the remote data collection devices into data processing commands and data values to be processed based on the commands.

11. The method of claim 10, wherein the electronic book comprises an electronic report.

12. The method of claim 10, wherein the electronic book comprises educational content.

13. The method of claim 10, wherein the electronic book facilitates operation of a business function.

14. The method of claim 10, wherein the remote data collection devices are deployed in a manufacturing environment.

15. The method of claim 10, wherein the remote data collection devices are further adapted to communicate with the computing device via a two-way BLUETOOTH wireless communication.

16. The method of claim 10, wherein the electronic book communicates with at least one of the plurality of remote devices, thereby maintaining a desired function of the at least one of the plurality of remote devices, the desired function selected from a list of functions consisting of controlling a robotic device, controlling a sensed temperature, and operating an active sensor device.

* * * * *

UNITED STATES PATENT AND TRADEMARK OFFICE
CERTIFICATE OF CORRECTION

PATENT NO. : 9,047,785 B2
APPLICATION NO. : 14/329186
DATED : June 2, 2015
INVENTOR(S) : Emmanouil A. Chaniotakis et al.

It is certified that error appears in the above-identified patent and that said Letters Patent is hereby corrected as shown below:

In the drawings

On sheet 14 of 31, in Figure 14, line 8, delete "DISTRCTORS" and insert -- DISTRACTORS --, therefor.

On sheet 15 of 31, in Figure 14, Box 1512, line 4, delete "DISTRCTORS" and insert -- DISTRACTORS --, therefor.

On sheet 16 of 31, in Figure 16, line 9, delete "DISTRCTORS" and insert -- DISTRACTORS --, therefor.

On sheet 28 of 31, in Figure 28, Box 2802, line 7, delete "DIFICULTY" and insert -- DIFFICULTY --, therefor.

In the specification

In column 8, line 30, delete "thr" and insert -- for --, therefor.

In column 9, line 9, delete "HTML," and insert -- HTML --, therefor.

In column 10 line 55, delete "HTML," and insert -- HTML --, therefor.

In column 10, line 67, delete "HTML," and insert -- HTML --, therefor.

In column 11, line 3, delete "HTML," and insert -- HTML --, therefor.

In column 16, line 7, after "encapsulated" insert -- HTML --.

In column 16, line 22, delete "such as" and insert -- such a --, therefor.

In column 16, line 44, delete "such as" and insert -- such a --, therefor.

In column 17, line 19, delete "such as" and insert -- such a --, therefor.

In column 18, line 26, delete "difficult" and insert -- difficulty --, therefor.

In column 22, line 48, delete "e.g." and insert -- (e.g. --, therefor.

In column 22, line 54, delete "in" and insert -- In --, therefor.

In column 23, line 56, delete "protocol" and insert -- protocol. --, therefor.

Signed and Sealed this
Twentieth Day of October, 2015

Michelle K. Lee
*Director of the United States Patent and Trademark Office*

CERTIFICATE OF CORRECTION (continued)
U.S. Pat. No. 9,047,785 B2

In the specification

In column 25, line 16, delete "cook" and insert -- e-Book --, therefor.

In column 25, line 27, delete "hind" and insert -- bind --, therefor.

In column 30, line 39, delete "118," and insert -- 118. --, therefor.

In column 36, line 27, delete "embodiment," and insert -- embodiments, --, therefor.

In column 36 line 27, delete "e-book," and insert -- e-Book, --, therefor.

In column 36, line 28, delete "entirely" and insert -- entirety --, therefor.

In column 36, line 28, delete "embodiment," and insert -- embodiments, --, therefor.

In column 36, line 33, delete "in" and insert -- In --, therefor.

In column 36, line 34, delete "eBook," and insert -- e-Book, --, therefor.

In column 36, line 35, delete "embodiment," and insert -- embodiments, --, therefor.

In column 36, line 39, delete "in" and insert -- In --, therefor.

In column 36, line 42, delete "the" and insert -- that --, therefor.

In column 36, line 47, delete "searched." and insert -- searched --, therefor.

In column 36, line 50, delete "typed" and insert -- typed. --, therefor.

In column 36, line 55, delete "he" and insert -- be --, therefor.

In column 36, line 57, delete "list" and insert -- list, --, therefor.

In column 36, line 57, delete "in." and insert -- in --, therefor.

In column 39, line 5, delete "Book" and insert -- e-Book --, therefor.

In column 39, line 22, delete "user," and insert -- user. --, therefor.

In column 46, line 17, delete "van 1" and insert -- var1 --, therefor.

In column 52, line 36, delete "chain" and insert -- chain. --, therefor.